United States Patent [19]
Hanaoka et al.

[11] Patent Number: 6,144,519
[45] Date of Patent: *Nov. 7, 2000

[54] LIBRARY APPARATUS WITH A PLURALITY OF ACCESSORS

[75] Inventors: Yasuhiko Hanaoka, Kawasaki; Kazuhiko Nishizawa, Kamiminochi-gun; Shinobu Sasaki, Kawasaki; Hiroshi Shimada, Kato-gun; Masaki Takeuti, Kamiminochi-gun, all of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/550,867

[22] Filed: Oct. 31, 1995

[30] Foreign Application Priority Data

Feb. 20, 1995 [JP] Japan ................................... 7-030327
Feb. 23, 1995 [JP] Japan ................................... 7-035708

[51] Int. Cl.⁷ ............................ G11B 15/68; G11B 17/22
[52] U.S. Cl. .................................. 360/92; 369/34
[58] Field of Search ................................. 369/34; 360/92

[56] References Cited

U.S. PATENT DOCUMENTS

| | | | |
|---|---|---|---|
| 4,566,087 | 1/1986 | Kraft | 369/34 |
| 4,864,511 | 9/1989 | Moy et al. | 360/92 |
| 4,907,889 | 3/1990 | Simone | 360/92 |
| 5,226,779 | 7/1993 | Yeakley | 414/753 |
| 5,242,259 | 9/1993 | Yeakley | 414/751 |
| 5,285,333 | 2/1994 | Barr et al. | 360/92 |
| 5,429,470 | 7/1995 | Nicol et al. | 360/92 |
| 5,479,581 | 12/1995 | Kleinschnitz | 395/82 |
| 5,513,156 | 4/1996 | Hanaoka et al. | 369/34 |
| 5,703,843 | 12/1997 | Katsuyama et al. | 369/34 |

FOREIGN PATENT DOCUMENTS 63-225968 9/1988 Japan ..................................... 369/34

*Primary Examiner*—David Davis
*Attorney, Agent, or Firm*—Greer, Burns & Crain, Ltd

[57] ABSTRACT

A library apparatus in which a plurality of cell drums are divided into two groups respectively placed on the left and right side of a recording/reproducing unit placed in a central part thereof. In this library apparatus, rails are placed in a direction along which the cell drums and the recording/reproducing unit are arranged. The conveying of media, which are contained in the cell drums placed on the left side of the recording/reproducing unit, is assigned to an accessor placed on the left side thereof. Simultaneously, the conveying of media, which are contained in the cell drums placed on the right side of the recording/reproducing unit, is assigned to an accessor placed on the right side thereof. A robot hand of each of the accessors is opened and closed by a turn of a motor. At that time, a power supply is turned off. Moreover, the robot hand is prevented by a locking mechanism from popping out of the accessor. Furthermore, ordinary cartridges are discriminated from cleaning cartridges.

11 Claims, 63 Drawing Sheets

FIG. 18

| ASSIGNED ACCESSOR | MOVING COMMAND | | |
|---|---|---|---|
| | NO. | ORIGIN ADDRESS | DESTINATION ADDRESS |
| 12-1 | #1 | F21 | T21 |
| 12-2 | #2 | F22 | T22 |
| — | — | — | — |

80

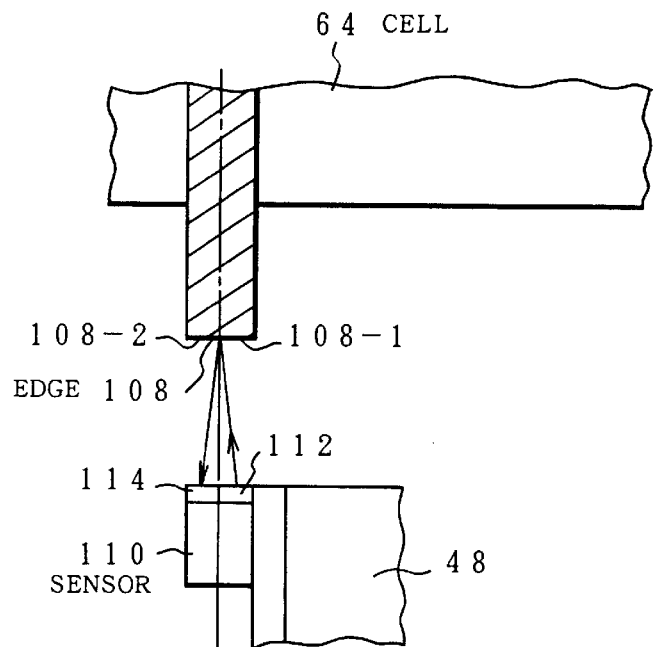
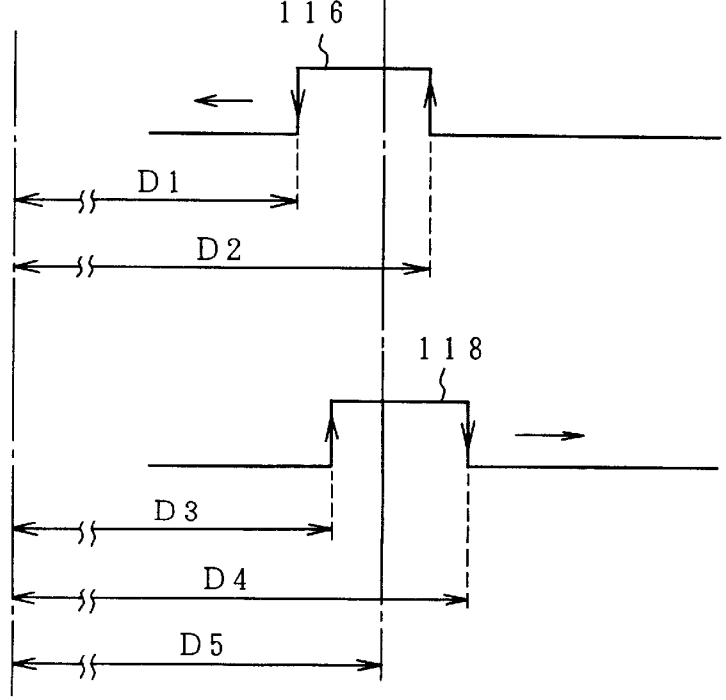

FIG. 26
FIG. 27
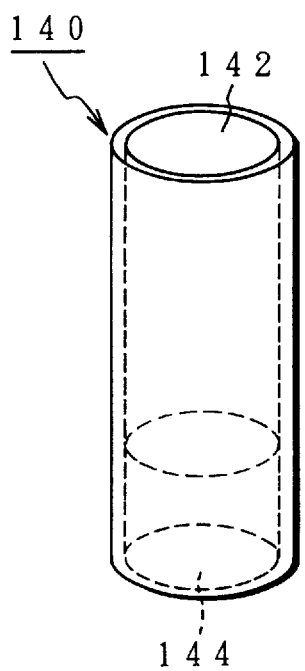
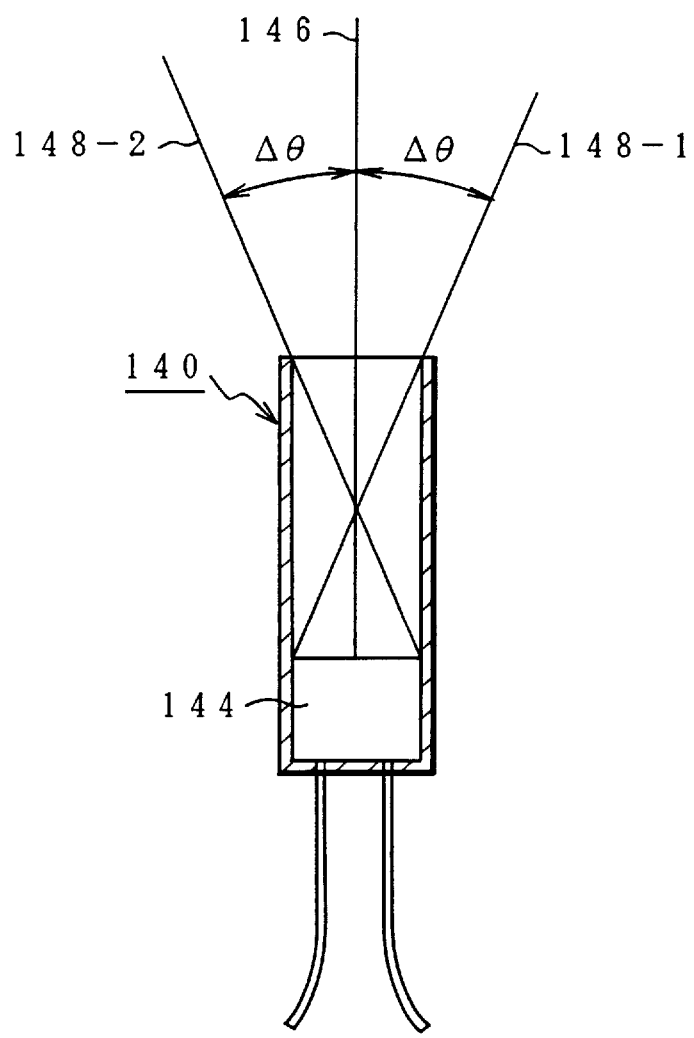

F I G. 4 9
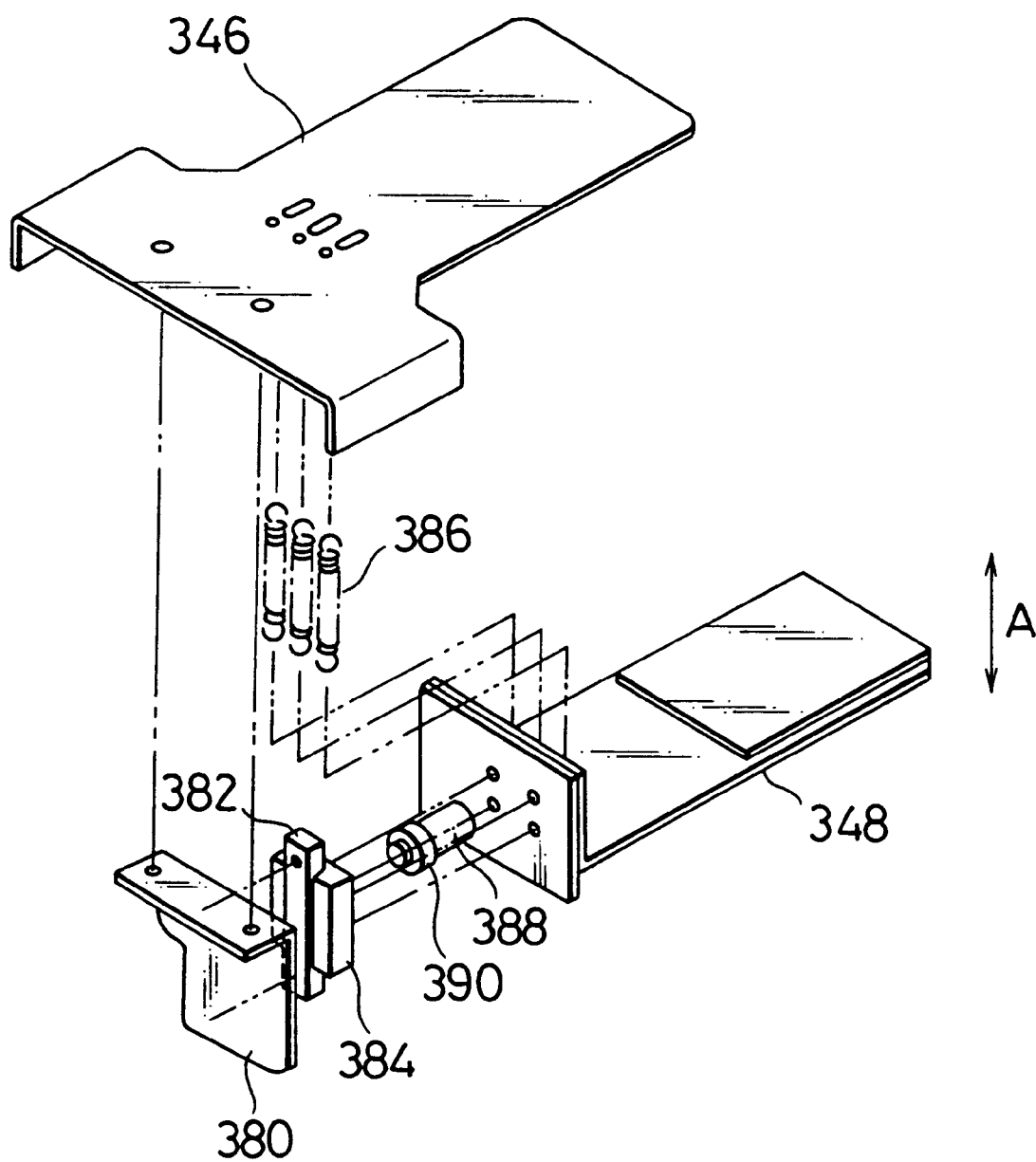

LIBRARY APPARATUS WITH A PLURALITY OF ACCESSORS

BACKGROUND OF THE INVENTION

1. Field of the Invention

The present invention generally relates to a library apparatus employing a magnetic tape cartridge or an optical disk or the like as a storage medium, and more particularly to a library apparatus in which a plurality of cell drums are placed along running rails and further the medium is conveyed between the cell drum and a deck unit by two accessors.

2. Description of the Related Art

In recent years, with increase in the number of media used in an external storage such as a magnetic tape unit (MTU), an optical disk or the like, the enhancement of the efficiency in operation, the maintainability and the reliability of a computer system have been required. With this end in view, there has been provided a library apparatus for keeping media and for performing an automatic operation of conveying a medium to an external storage.

FIG. 1 is a schematic perspective view of a conventional library apparatus. This library apparatus is partitioned into a plurality of frames. Conversely, the library can be constituted by combining these frames with one another. Further, a cell block 1000 having a large number of cells for keeping media is placed in the library apparatus. For example, a large number of medium cartridges, each of which contains magnetic tape, are accommodated therein. The positions of the cells of the cell block are defined as cell addresses. Moreover, in each of the frames, rails 1014 are laid on the bottom surface thereof from the left side to the right side thereof. Furthermore, accessors 1012-1 and 1012-2, which are robots, move on the rails 1014. Further, deck units 1016-1 and 1016-2 and control units 1018-1 and 1018-2 are placed across the rails 1014 from the cell block 1000. Moreover, a plurality of recording/reproducing units are provided in each of the deck units 1016-1 and 1016-2. The recording/reproducing units are loaded with the cartridges conveyed by the accessors 1012-1 and 1012-2 from the cell block 1000 and are operative to read data therefrom and write data thereto. Additionally, a medium inlet/outlet port 1015, from which the cartridges are taken in and out, is provided in a front portion of the frame of the library apparatus.

However, in the case of such a conventional library apparatus, the medium cartridges are enclosed in each of the cell blocks. Thus, to increase the number of the cartridges accommodated in the apparatus, the cell blocks are aligned along the rails. However, there is a limit to a space in which the cell blocks are placed. Consequently, there has been a problem in that the conventional library apparatus can not fully cope with the increase in number of the cell blocks to be accommodated therein. Moreover, in the case where the number of accommodated cartridges is increased by aligning the cell blocks, the running distance of the accessor becomes long and it takes time to convey the cartridge. This results in causing a problem in that the speed-up of the conveying of cartridges is hindered. Furthermore, in the case where the medium is conveyed by using the two accessors in the library apparatus, the medium conveying operation of one of the accessors should be controlled by retreating and making the other of the accessors wait if the moving ranges of the accessors overlap with each other. Thus, it takes time more for that to perform the processing. Regarding this problem, in the case where a cell drum is placed instead of the cell block, the accessor is sometimes made to wait while the cell drum is rotated until an indicated cell face a position from which the accessor can take the cartridge. Further, the time, during the accessor waits the rotation of the cell drum, should be minimized.

Additionally in the cases of the library apparatuses developed in recent years, the density of cells is increased with increase in amount of contained media. As a result, the accuracy of positioning at the time of taking a medium in and out of a cell by means of the robot hand of the accessor should be improved. For this purpose, it is desirable to improve the detection precision of a sensor for detecting the position of a cell, which is mounted on the robot hand. The position of a cell is detected by irradiating the cell with light issued from a light emitting portion and using a photodetector for detecting light reflected by the cell. The photodetector, however, is operative to detect feeble scattering light. Therefore, the sensitivity of the sensor should be heightened considerably, with the result that the signal-to-noise ratio (S/N) thereof is degraded. Accordingly, there has been a problem in that the sufficient detection precision of the sensor can not be obtained. Further, the position of a cell is sensed by detecting a cell edge by use of an optical sensor while moving the accessor in a direction. Thus, there has been another problem in that a steady-state error occurs. Moreover, the sensitivity of the sensor mounted on the robot hand should be regulated in a state in which the accessor has been moved to the front of a cell. It is, therefore, very troublesome to regulate the sensitivity of the sensor. Furthermore, in the case where the cell drum is used instead of the cell block, the drum is rotated only by an angle corresponding to a place, on which a cell is provided, in the cylindrical surface of the drum. However, there is a difference between a designed angle of rotation and the angle of rotation, at which the cell is actually placed, in front of the accessor. Thus, there has been the fear that the medium cartridge may not be well taken in and out of the cell by use of the robot hand.

The controller of the accessor has a table for translating a cell address, which is indicated by a moving command issued by a host computer, into X- and Y-coordinates of the accessor. Values contained in this translation table are actually measured in a measuring operation of the accessor and are then stored in a read-only memory (ROM). Simultaneously, such values are stored in a floppy disk or the like as backup data. Further, when performing a power-on starting, the value serving as reference data, which is stored in the floppy disk, is compared with that stored in the ROM. If not matched, the re-acquisition of the value of the cell address should be performed by conducting a measurement thereof by use of the accessor as an operation to be performed when data exception occurs. Thus, there has been a problem in that it takes time to start up the apparatus.

In the case of the accessor used in the conventional library apparatus, only one running motor is mounted in a rail running portion thereof. Thus the accessor has reached the limits to the speed-up of the speed at which the medium is conveyed. Moreover, when a failure occurs in the running motor, the accessor does not work at all. Therefore, there has been a problem in that in such a case, the library apparatus falls into an unoperatable condition.

Meanwhile, the accessor of the conventional library apparatus for containing magnetic tape or the like horizontally moves along horizontal guide rails. Further, the accessor is provided with a robot hand mechanism which can move vertically along guide rails formed in a vertical column. Moreover, the robot hand mechanism has a hand unit provided with upper and lower hands for holding a cartridge. The hand unit requires performing operations of opening and closing (namely, joining and unjoining) the upper and lower hands and an operation of sliding back and forth. The lower hand is movably attached to the upper hand. Further, the recording medium cartridge is held by the upper and lower hands. Moreover, the lower hand is pushed by a plurality of springs in a direction in which the lower hand comes closer to the upper hand, namely, in a direction in which the upper and lower hands are closed or joined. A conventional hand opening/closing mechanism comprises a reversible motor, a first gear fixed to the output shaft or axis of the motor, a second gear which meshes with the first gear, and a roller rotatably mounted on a shaft displaced from the axis of rotation of the second gear. The roller is brought into abutting engagement with a lower-hand pushing-down face. When the motor is turned in a direction, the roller moves eccentrically to the first gear to thereby push down the lower hand. Thus the hands are opened or unjoined. When the motor is reversed, the lower hand is made to come close to the upper hand by the force of the springs. As a result, the hands are closed or joined. Namely, in the case of the conventional hand opening/closing mechanism opens and closes (that is, joins and unjoins) the hands by rotating the motor in normal and reverse directions, respectively.

The conventional hand opening/closing mechanism, however, requires controlling the motor in such a manner as to rotate the second gear about 80 degrees and then hold the second gear at such a position, thereby pushing down the lower hand to a predetermined position. Thus, the positioning accuracy should be sufficiently high to such an extent that the roller can be turned to the predetermined position and then be held thereat. Consequently, there have been problems in that it is difficult to control the motor in such a way as to prevent the roller from being pushed up by the springs and that the conventional apparatus is susceptible to variations in quality or accuracy of components.

If running the library apparatus for a long time period, the head of the drive unit becomes contaminated. Accordingly, the head needs to be cleaned. The cleaning of the head is performed by causing the accessor to insert a cleaning cartridge into the drive unit. In the case of the conventional library apparatus, the cleaning of the head is performed as follows. Namely, the host computer connected thereto first identifies a cell which contains a cleaning cartridge. Then, in response to an instruction issued from the host computer, the accessor conveys the cartridge to the drive unit. Subsequently, an operation of cleaning the head is carried out. The accessor, however, is not provided with a mechanism for discriminating between an ordinary cartridge and a cleaning cartridge. Thus, the accessor inserts a cartridge into the drive unit whereupon the kind of cartridge is identified. Alternatively, a cartridge is conveyed to a separately provided cartridge discriminating mechanism which identifies the kind of cartridge. Accordingly, there has been a problem in that it takes time to discriminate a cleaning cartridge from an ordinary cartridge. Moreover, in the case of the conventional apparatus, the host computer should preliminarily identify a cell which contains a cleaning cartridge. This has caused an increase in load on the host computer.

Furthermore, in the case of the conventional library apparatus, the bottom plate of each cell is upwardly inclined only by a predetermined angle in order to prevent a cartridge, which is contained in each cell, from popping out therefrom. In the case of such a library apparatus, the base and the hand unit of the accessor are also tilted according to the angle of inclination of the cell. Thus, there has been a fear that when a power supply for supplying electric power to a motor for moving the hand unit back and forth is shut down by some cause while the accessor moves, the hand unit might pop out to the front of the accessor owing to its own weight and interfere with peripheral equipment or the like and consequently, the hand unit and/or the peripheral equipment might be damaged.

SUMMARY OF THE INVENTION

In accordance with an aspect of the present invention, there is provided a library apparatus which uses a cell drum instead of a cell block to thereby effectively utilize an installation space and accommodate a large number of medium cartridges without increasing the running distance of an accessor.

This library apparatus of the present invention comprises: a storage/reproduction unit (hereunder sometimes referred to as a recording/reproducing unit) for reading data from and writing data to a portable storage medium; an inlet/outlet unit through which a storage medium is inputted from and outputted to the exterior of the apparatus; a plurality of rotatable cell drums, on the cylindrical surface of each of which a plurality of cells respectively used for containing storage media are provided; and at least two accessors, each of which is used for picking up a storage medium and for conveying the storage medium between the cell drum and the storage/reproduction unit and between the inlet/outlet unit and the cell drum. Moreover, this apparatus of the present invention is further provided with a queuing table for storing medium conveying information for a control operation, which contains an origin address and a destination address (namely, the addresses of a movement origin and a movement destination) received in response to a moving command issued from a host unit or computer. Additionally, this apparatus of the present invention further comprises: an accessor controller for instructing the cell drum according to the origin address and the destination address of a moving command, which is dequeued from the queuing table, to rotate and for instructing the accessor to convey a medium; a drum controller for turning a cell, which is located at an indicated address on the cell drum, to an accessor take-out position according to a rotation instruction issued from the accessor controller; and a machine controller for moving the robot hand to a position having coordinates according to a conveying instruction issued from the accessor controller. Further, in this apparatus of the present invention, a plurality of cell drums are divided into two groups to be aligned on the left and right side of a recording/reproducing unit, respectively. Further, rails are placed in a direction along which the cell drums and the recording/reproducing unit are arranged. The conveying of media, which are contained in the cell drums placed on the left side of the recording/reproducing unit, is assigned to an accessor placed on the left side thereof. Simultaneously, the conveying of media, which are contained in the cell drums placed on the right side of the recording/reproducing unit, is assigned to an accessor placed on the right side thereof.

As the result of placing the cell drums instead of the cell blocks, the number of accommodated media per unit area can be increased considerably. Moreover, the moving distance of the accessor does not increase. Furthermore, the conveying of the media can be efficiently achieved by simultaneously operating two accessors, as the result of placing the recording/reproducing unit in a central part of the apparatus and further arranging the cell drums on both sides of the recording/reproducing unit and assigning the cell drums placed on the left and right sides of the recording/reproducing unit to the two accessors, respectively.

Further, in accordance with another aspect of the present invention, there is provided a library apparatus which efficiently controls the conveying of a medium by minimizing an accessor waiting time. In order to reduce the accessor waiting time, the accessor controller of this apparatus schedules the execution priorities of a plurality of moving commands contained in a queuing table. Further, concurrently with the execution of a current moving command, the accessor controller instructs the drum controller to rotate a cell drum according to the next moving command to be executed. Practically, when the accessor finishes picking up a medium from the cell drum in response to the moving command which is currently being executed, the accessor controller instructs the drum controller to rotate a cell drum on the basis of the moving command to next be executed. Further, in order to solve the retreat waiting problem of the accessor, in the case where among the plurality of moving commands contained in the queuing table, there are two or more of the moving commands, which are able to be executed by one of the accessors, corresponding to another one of the moving commands, which is executed by the other of the accessors, the accessor controller selects the moving commands in such a manner that when the selected moving commands are executed, the movement loci of the media conveyed by the simultaneous operations of the processors (namely, the accessors) overlap with each other. Further, in the case where there are the commands, which can be simultaneously executed by the two accessors, respectively, in the queuing table, the accessor controller causes the two accessors to simultaneously operate in a range in which the movement loci of the media do not overlap with each other. Practically, in the case where the commands, which can be respectively executed by the two accessors at the same time, are those for conveying the media to the recording/reproducing unit from the cell drums assigned to the two accessors, respectively, and the movement loci of the media do not overlap with each other at the location of the recording/reproducing unit, the two accessors are simultaneously moved to the medium taking-out positions of the cell drums respectively assigned thereto.

Thus, as the result of rotating the drum in advance according to the next command in a waiting state where an operation of taking the medium out of the cell drum according to the current command is finished, the time period, during which the accessor waits for the rotation of the drum, can be shortened or eliminated. Moreover, as the result of avoiding the selection of the commands, by which the accessors interfere with each other, when the commands are simultaneously executed by the two accessors, the two accessors can be simultaneously operated as much as possible. Thereby, the medium mounting efficiency of the apparatus can be increased considerably.

Moreover, in accordance with a further aspect of the present invention, there is provided a library apparatus, which is adapted to suitably meet needs for achieving the high density of the cells, by improving the accuracy of positioning the cell with respect to the accessor. In the case of this apparatus, a photodetector, whose a light emitting portion and a light receiving portion are placed in a front part thereof, for detecting the positions of a plurality of cells, which are formed on the cylindrical surface of a cell drum, from the edge of a wall partitioning the adjoining cells is mounted in a robot hand in such a manner that the optical axis of the light emitting portion is inclined only by an infinitesimal angle to a direction in which the edge of the wall partitioning the cells is detected. Thus, sufficient reflection light can be obtained. Consequently, the detection sensitivity is enhanced. The measurement of the position of the edge used for detecting light is performed as follows. When the robot hand is positioned at an indicated cell, the position of the edge is measured by making the photodetector pass the edge from the left side of the edge. Moreover, the position of the edge is measured again by making the photodetector pass the edge in a reverse direction, namely, from the right side of the edge. The average of the measured two values of the edge position is determined as an actually measured value of the position of the edge. Furthermore, an error is eliminated therefrom. Further, in order to permit the robot hand of the accessor to singly regulate the sensitivity of the photodetector, a reflection member having a reflection face to be located in front of the photodetector when picked up by the robot hand is provided in a jig of the same cartridge shape as of a storage medium. The photodetector of the robot hand can be regulated by using this jig. Moreover, a cell drum measuring portion for measuring an angle of rotation, by which the cell drum is rotated so as to move each of the cells thereof to a medium taking-out position determined correspondingly to the accessor, is provided in the accessor controller. This apparatus is further provided with a light emitting portion, which is attached to a cell to be measured, for irradiating light whose optical axis (or ray) drawn from the center of rotation of the drum to the center of a cell opening portion, and with a measuring photodetector that has a light receiving portion which is placed in a cylindrical member thereof in such a manner that the cell drum is oriented toward the center of the robot hand. In this case, the position of the cell drum is measured as follows. Namely, the cell drum is rotated counterclockwise by an infinitesimal angle $\delta\theta$ at a time from the position thereof corresponding to an angle $\delta$ of rotation of the cell. Simultaneously, in response to this, the accessor is moved by an infinitesimal distance $\delta L$ at a time in synchronization with the rotation of the cell drum. Thus, an angle $\Delta\theta1$ of rotation of the cell drum, at which the photodetector comes to obtain no reception signal, is measured. Similarly, the cell drum is rotated clockwise by an infinitesimal angle $\delta\theta$ at a time from the position thereof corresponding to an angle $\delta$ of rotation of the cell. Simultaneously, in response to this, the accessor is moved by an infinitesimal distance $\delta L$ at a time in synchronization with the rotation of the cell drum. Thus, an angle $\Delta\theta2$ of rotation of the cell drum, at which the photodetector comes to obtain no reception signal in this case, is measured. Finally, the angle $\theta$ of rotation of the cell is corrected on the basis of the angles $\Delta\theta1$ and $\Delta\theta2$. Thereby, an angle of rotation of the cell, at which the cell is faced to the front of the robot hand of the accessor, is measured. The angle e of rotation of each cell, which has been measured by this cell drum measuring portion, is stored in the translation table which uses the cell address indicated by the accessor controller as an entry.

In this way, the light reflected from the cell edge is securely received by the sensor. Consequently, the detection sensitivity thereof is enhanced. Moreover, the operations of scanning the cell edge from the left and right sides thereof are performed by the photodetector. Thereafter, the values measured as the result of these operations are averaged. Thereby, a detection error is eliminated. Furthermore, the sensitivity of the photodetector can be easily achieved by making the jig of the cartridge type and providing such a jig in the robot hand. In addition, the measurement of the angle of rotation of each cell for the purpose of correctly positioning each cell against the accessor is performed by providing the light emitting portion in a cell to be measured and by further providing the photodetector, whose light receiving portion is contained in the cylindrical member, in the robot hand of the accessor, and by then finding angles, at which the photodetector does not receive light, in both of the counterclockwise and clockwise directions thereof while the cell drum and the accessor are moved by an infinitesimal amount at a time, and by actually measuring an error and finally correcting the prescribed angle of rotation on the basis of the measured error. Thus, the accurate angle of rotation of each cell is obtained. Consequently, the accuracy of positioning of each cell by the rotation of the cell drum can be improved.

Furthermore, in accordance with still another aspect of the present invention, there is provided a library apparatus which is adapted to suitably perform a processing in the case where an abnormal value is contained in the translation table when performing a power-on starting, without performing an actual measurement. The translation table contains the angle of rotation of the cell drum and two dimensional coordinates representing the positions of the moving accessors by using cell addresses as entries. Further, the values thereof actually measured by the accessors are stored in this translation table. Moreover, in this translation table is stored in the ROM of the accessor controller and is further loaded or developed in a random-access memory (RAM) when performing a power-on starting. On the other hand, the translation table containing the actually measured values is stored in a floppy disk as an original used for performing a backup operation. When turning on the power supply tilting, the value contained in the translation table of the floppy disk is compared with that contained in the translation table of the ROM correspondingly to each cell address. If not matched, the actually measured value should be obtained again by performing an measuring operation of the accessor. Thus, in the case of this apparatus of the present invention, if not matched, a mismatch message is displayed or indicated to the exterior of the apparatus and the values contained in the table of the floppy disk are made according to a selection instruction inputted from an external system or an operator to be available. For example, a message indicating the mismatch between the values contained in the tables is displayed on a maintenance panel. Then, values contained in the translation table, which is stored in the floppy disk, are used in accordance with a selection instruction inputted by operating a selection switch provided on the maintenance panel.

Values actually measured by the accessor at the stage of installing or setting of the apparatus are used and stored in a floppy disk as the values to be contained in the translation table for translating the cell addresses into the angle of rotation of the drum and the values of the movement coordinates of the accessors. Therefore, in the case where the original value stored in the floppy disk is not matched with the corresponding value stored in the ROM, the former value stored in the floppy disk is selected. Thereby, time and trouble, which are required for actually measuring a value by using the accessor each time when a mismatch occurs, can be saved.

Additionally, in accordance with yet another aspect of the present invention, there is provided an accessor for use in a library apparatus, by which the efficiency of mounting a storage medium is increased by increasing the speed of conveying the storage medium and can work continuously even when the failure of a running motor occurs. In the case of this accessor for use in the apparatus of the present invention, two running motors, the maximum or top speeds of which are different from each other, are provided in a running portion which runs on rails. Further, one of the two motors is selected and the running operation of the selected is controlled by the machine controller. Here, the two running motors are motors having the same performance. Each of the two motors has a pinion gear for making the running portion run by being meshed with and rotated by a gear rack formed on the rails. The pinion gears are different in gear ratio of the number of teeth of each pinion gear to that of the rack gear from each other. Further, the machine controller has a speed table which contains data concerning the speed of each of the two motors. Moreover, the machine controller switches one of the motors to or from the other thereof if necessary, and performs a control operation so as to use the motors optimally. For example, in the case where a first one of the two motors is a high-torque low-speed motor, which has high torque but a low top speed, and a second one thereof is a low-torque high-speed motor, which has low torque but a high top speed, the machine controller selects the first motor and performs an acceleration control operation during starting. Furthermore, if the speed of the first motor reaches a first prescribed speed Vref1 during the acceleration using the first motor, the machine controller selects the second motor and performs an acceleration control operation. Thereafter, if the speed of the second motor reaches a second prescribed speed Vref2, the machine controller performs a constant-speed control operation. Subsequently, when the accessor reaches a speed reduction starting position before a target position, the machine controller chooses the first motor again and performs a speed reduction control operation. In this case, the accessor can move to the target position in a shortest period time by setting the top running speed of the first motor as the first prescribed speed Vref1 and by moreover setting the top running speed of the second motor as the second prescribed speed Vref2, respectively. Further, in the case where the distance between a current position of the accessor and the target position is short, the accessor does not have a sufficient time for acceleration and deceleration. Thus, the first and second prescribed speeds are set according to the distance to be moved. Additionally, when a failure occurs in one of the two motors, the machine controller selects the normally operating one of the motors so as to perform a control operation.

In this way, the two motors, which are different in top speed from each other, are provided in the accessor. Moreover, a speed control operation is performed by selectively using these motors. Thereby, a time required for moving to the target position can be reduced. Furthermore, an operation of the apparatus can be prevented from being stopped owing to an occurrence of a failure in the motor.

Further, in accordance with an additional aspect of the present invention, there is provided a library apparatus which can open and close the robot hand with high accuracy by controlling simple mechanism and motor. The robot hand mechanism of the present invention comprises: a vertically movable first base; a second base mounted on the first base in such a manner as to be able to pivotally move around a horizontal axis thereof; a tilting mechanism for inclining the second base toward the first base between a first tilting position and a second tilting position; a hand unit mounted on the second base in such a way as to be able to move between an advancing position and a retreating position, which has a first hand and a second hand capable of moving with respect to the first hand between a closing position for grasping a recording (or storage) medium cartridge and an opening position for releasing the cartridge; a first drive mechanism for moving the hand unit between an advancing position and a retreating position; and hand opening/closing means for moving the second hand between the opening position and the closing position. Preferably, the hand opening/closing mechanism comprises: a pushing member for pushing the second hand toward the first hand; a roller rotatably attached to the second hand; a motor having an output shaft or spindle; and an eccentric cam fixed to the output shaft of the motor in such a manner as to be put into abutting engagement with the roller. With such a configuration of the hand opening/closing mechanism, the robot hand can be opened and closed by simply rotating the motor in a direction. The amounts of opening and closing the robot hand depend on the precision of the eccentric cam. The amounts of opening and closing the robot hand with good accuracy can be realized.

In addition, in accordance with a further additional aspect of the present invention, there is provided a library apparatus which can lock a hand unit so as to prevent the hand unit from sliding to the front thereof owing to its own weight, even when the power supply for moving the hand unit back and forth is interrupted by some cause. To this end, the robot hand mechanism is further provided with a lock mechanism for locking the hand unit when the power supply is interrupted, thereby preventing the hand unit from sliding. Thereby, the hand unit can be prevented from sliding and touching peripheral equipment when the power supply is interrupted.

Besides, in accordance with another aspect of the present invention, there is provided a library apparatus which can discriminate an ordinary cartridge from a cleaning cartridge. For this purpose, the robot hand mechanism is provided with a medium discriminating mechanism for discriminating an ordinary recording medium cartridge from a cleaning cartridge which has a notch. Thereby, the accessor can recognize which of an ordinary cartridge and a cleaning cartridge a cartridge inserted into the library apparatus is. A load on the host computer for controlling the library apparatus can be reduced. Further, the accessor can discriminate an ordinary cartridge from a cleaning cartridge, so that the accessor does not require conveying a cartridge to the separate medium discriminating mechanism provided in the library apparatus differently from the conventional library apparatus. Consequently, a time required to discriminate a medium can be shortened.

Other features, objects and advantages of the present invention will become apparent from the following description of a preferred embodiment with reference to the drawings in which like reference characters designate like or corresponding parts throughout several views.

BRIEF DESCRIPTION OF THE DRAWINGS

FIG. 18 is a diagram for illustrating a queuing table that contains a command, the execution of which results in the movement locus of a storage medium as illustrated in FIG. 16;

FIGS. 22A to 22C are diagrams for illustrating a cell edge position measuring operation to be performed according to the present invention;

FIG. 26 is a diagram for illustrating a photodetector of FIG. 25;

FIG. 27 is a sectional view of the photodetector of FIG. 25;

FIG. 49 is an exploded perspective view of a hand opening/closing mechanism of this library apparatus;

DETAILED DESCRIPTION OF THE PREFERRED EMBODIMENT

Hereinafter, the preferred embodiment of the present invention will be described in detail by referring to the accompanying drawings.

System Configuration And Mechanism

Figure 1:
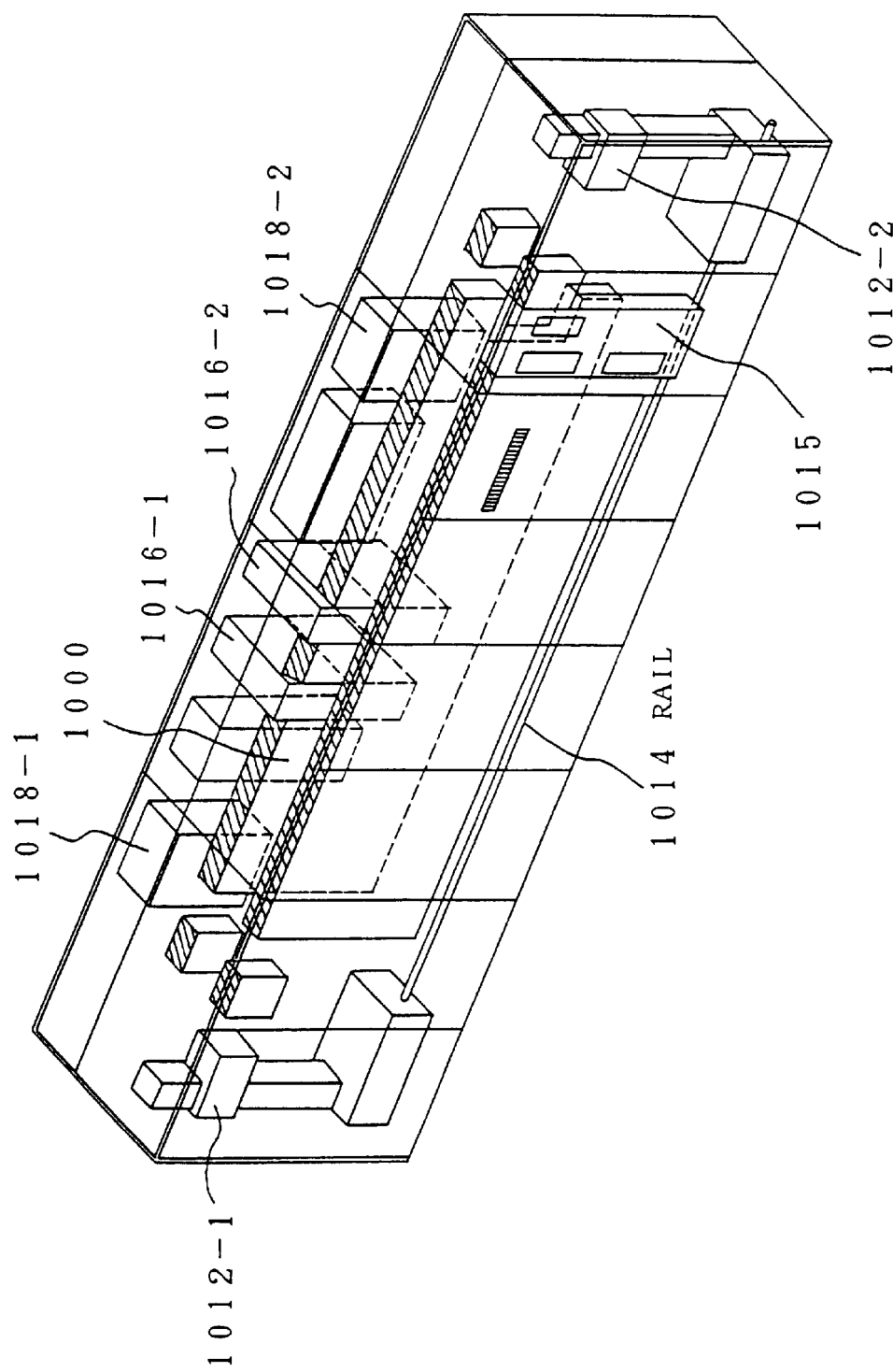
FIG. 1 is a diagram for illustrating the frame configuration of the conventional library apparatus.
Figure 2:
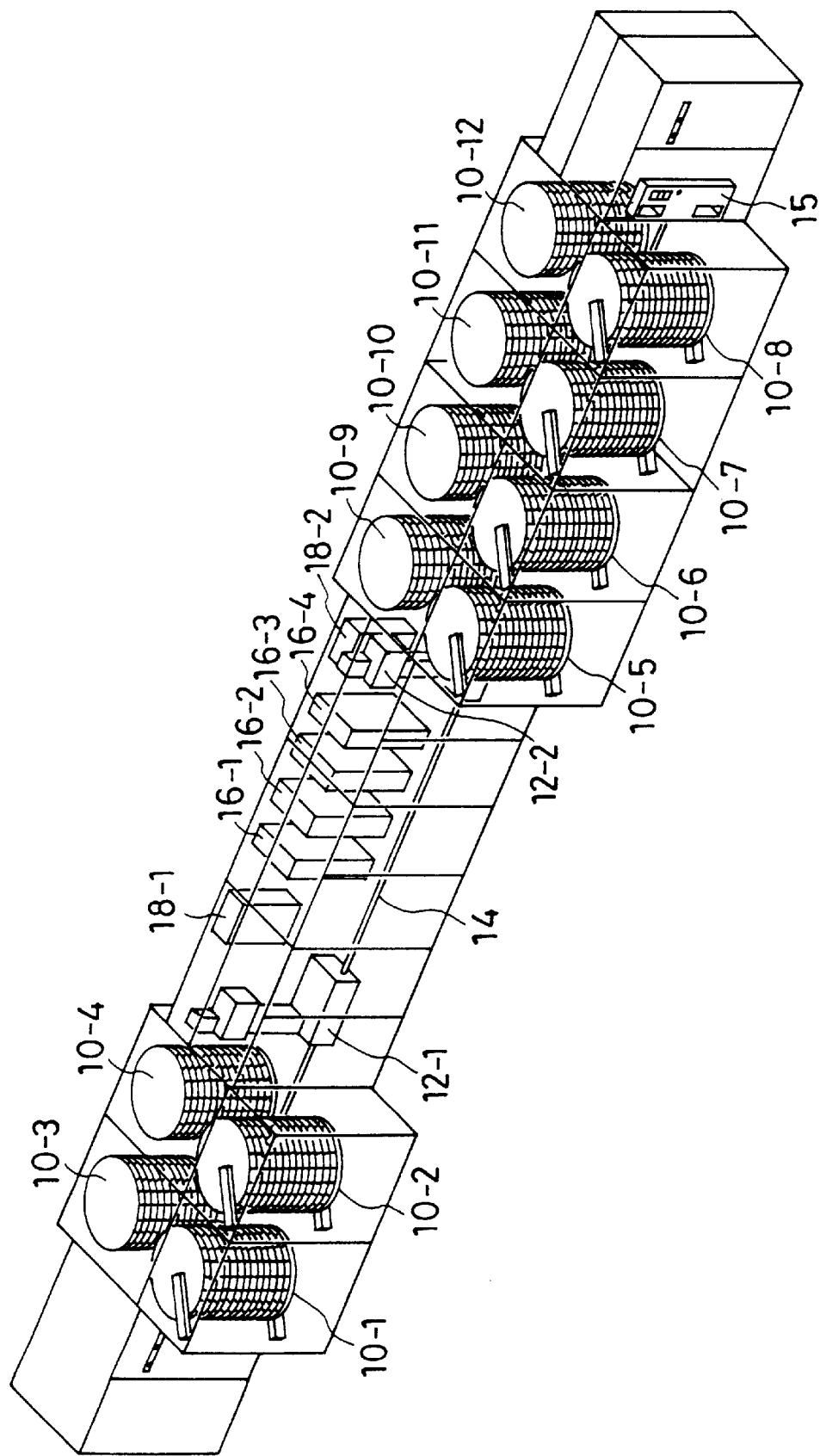
FIG. 2 is a diagram for illustrating the frame configuration of a library apparatus of the present invention.

FIG. 2 is a perspective diagram for illustrating the frame configuration of a library apparatus embodying the present invention. This library apparatus is divided or partitioned into a plurality of frames. Thus, the library apparatus can be constituted by combining these frames with one another. In the library apparatus, a plurality of cell drums 10-1 to 10-12 are provided as media storage units. Further, a large number of medium cartridges, each of which contains, for example, magnetic tape, are contained in each of the cell drums 10-1 to 10-12. In the case of this embodiment, the cell drums 10-1 to 10-12 are separated into a group of the four left-side cell drums 10-1 to 10-4 and another group of the eight right-side cell drums 10-5 to 10-12. Moreover, the cell drums of each of these groups are placed in two lines. A place or position, at which a cartridge is contained, is designated as a cell. The position of each cell is defined in terms of a cell address. Moreover, in each of the frames, rails 14 are laid from the left side to the right side thereof. Furthermore, accessors 12-1 and 12-2 serving as conveying robots, are movably put on the rails 14. Further, the rails 14 are placed between the cell drums 10-1 to 10-12 of two lines arranged separately on the left and right sides thereof. Therefore, the accessors 12-1 ad 12-2 can run on the rails 14 to thereby move to the positions of a given one of the cell drums 10-1 to 10-12. In the case of this apparatus of the present invention, the conveying of a medium cartridge from the cell drums 10-1 to 10-4 placed on the left side of the rails is assigned to the accessor 12-1 placed on the left side thereof as viewed in this figure. Moreover, the conveying of a medium cartridge from the cell drums 10-5 to 10-12 placed on the right side of the rails is assigned to the accessor 12-1 placed on the right side thereof. Further, control units 18-1 and 18-2 and deck units 16-1 and 16-2 are placed in the frame placed in a central part of the apparatus. Moreover, a plurality of recording/ reproducing units are provided in each of the deck units 16-1 and 16-2. The recording/reproducing units are loaded with the cartridges conveyed by the accessors 12-1 and 12-2 from the cell drums 10-1 to 10-12 and are operative to read data therefrom and write data thereto. Additionally, a medium inlet/outlet port 15, from which the cartridges are taken in and out, is provided in a front portion of the frame placed at the right end of the library apparatus, as viewed in this figure.

Figure 3:
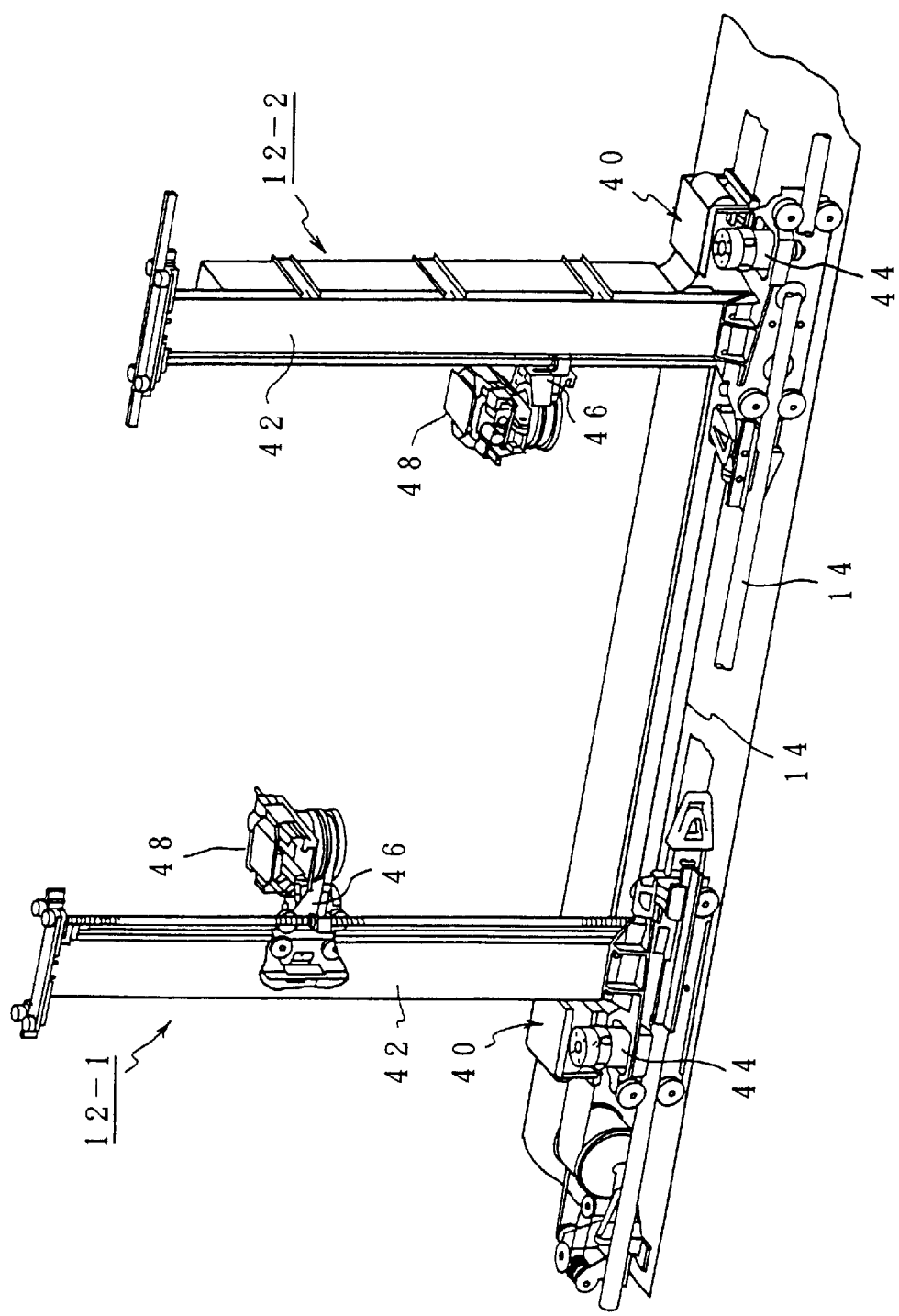
FIG. 3 is a diagram for illustrating accessors of FIG. 2.

FIG. 3 illustrates the accessors extracted from FIG. 2. The accessors 12-1 and 12-2 are operative to run on two lines of the rails 14 by means of a motor 44. Namely, a pinion gear 45 is mounted on the shaft of rotation in a lower portion of the motor 44. Further, each of the accessors meshes with a rack gear (not shown) provided on the side surface of a corresponding one of the rails 14 to thereby run thereon. A column 42 is erected on each of running portions 40, and a robot hand 48 is provided in each of lift portions 46 which can vertically move along the corresponding column 42.

Figure 4:
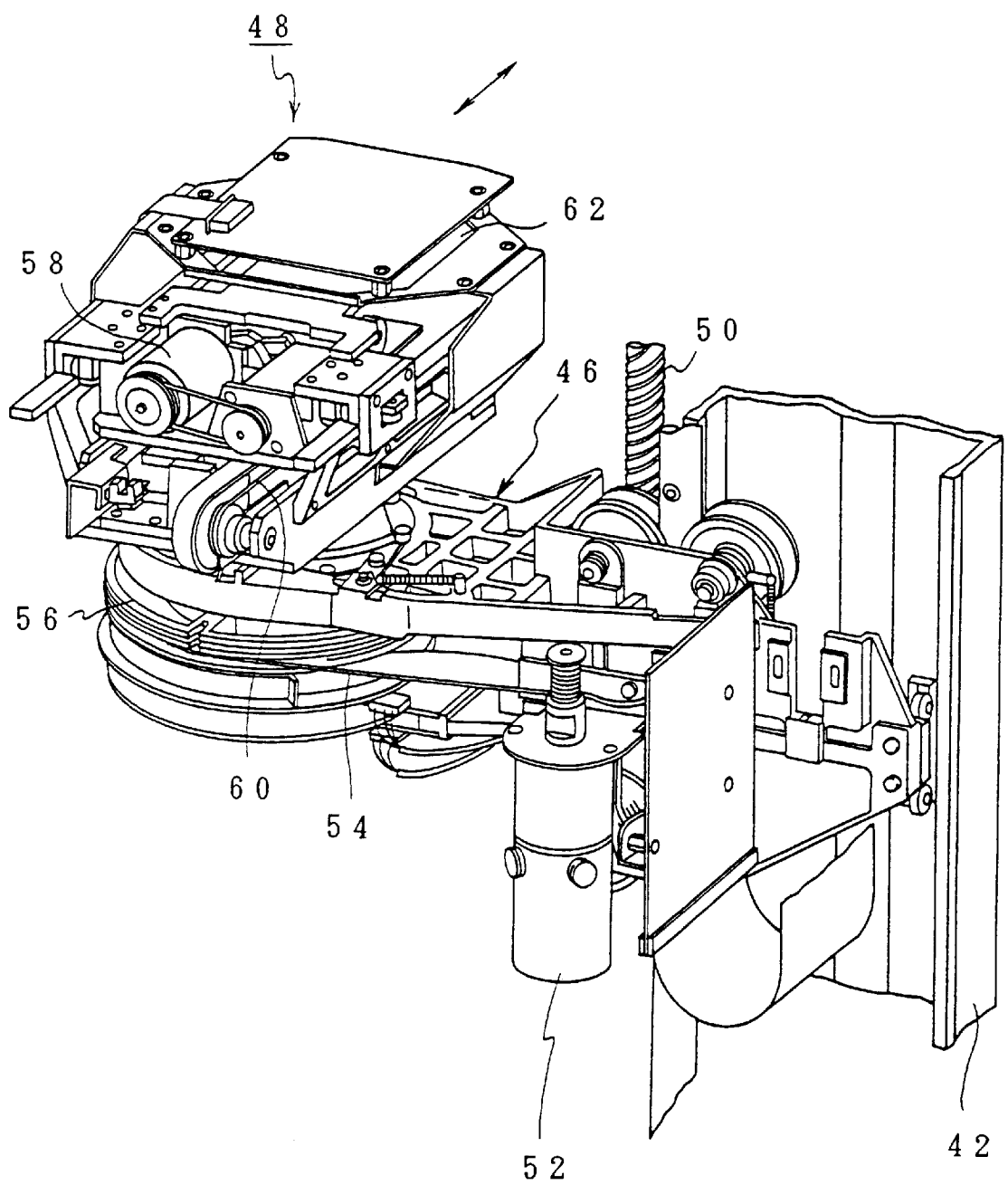
FIG. 4 is a diagram for illustrating a robot hand of FIG. 3.

FIG. 4 illustrates the robot hand 48 in detail. The robot hand 48 is mounted on the lift portion 46. Further, operations of moving up and down the robot hand 48 along the lift portion 46 are performed by rotating a threaded shaft 50. A revolving pulley 56 is provided in the lift portion 46. Thus the rotation of a motor 52 for revolving is transmitted thereto through a wire belt 54, so that the robot hand 48 is rotated in a horizontal plane. Moreover, a picker portion 62 for holding a medium is provided in a revolving part of the robot hand 48. The picker portion 62 is driven through a wire belt 60 by a motor 58 for sliding and thus can horizontally move from the position thereof illustrated in FIG. 4 to the front thereof. In a state in which the picker portion 62 is horizontally moved forward in this way, the cartridge of the cell drum can be taken thereinto and out therefrom by being put between upper and lower plates of the picker portion 62.

Figure 5:
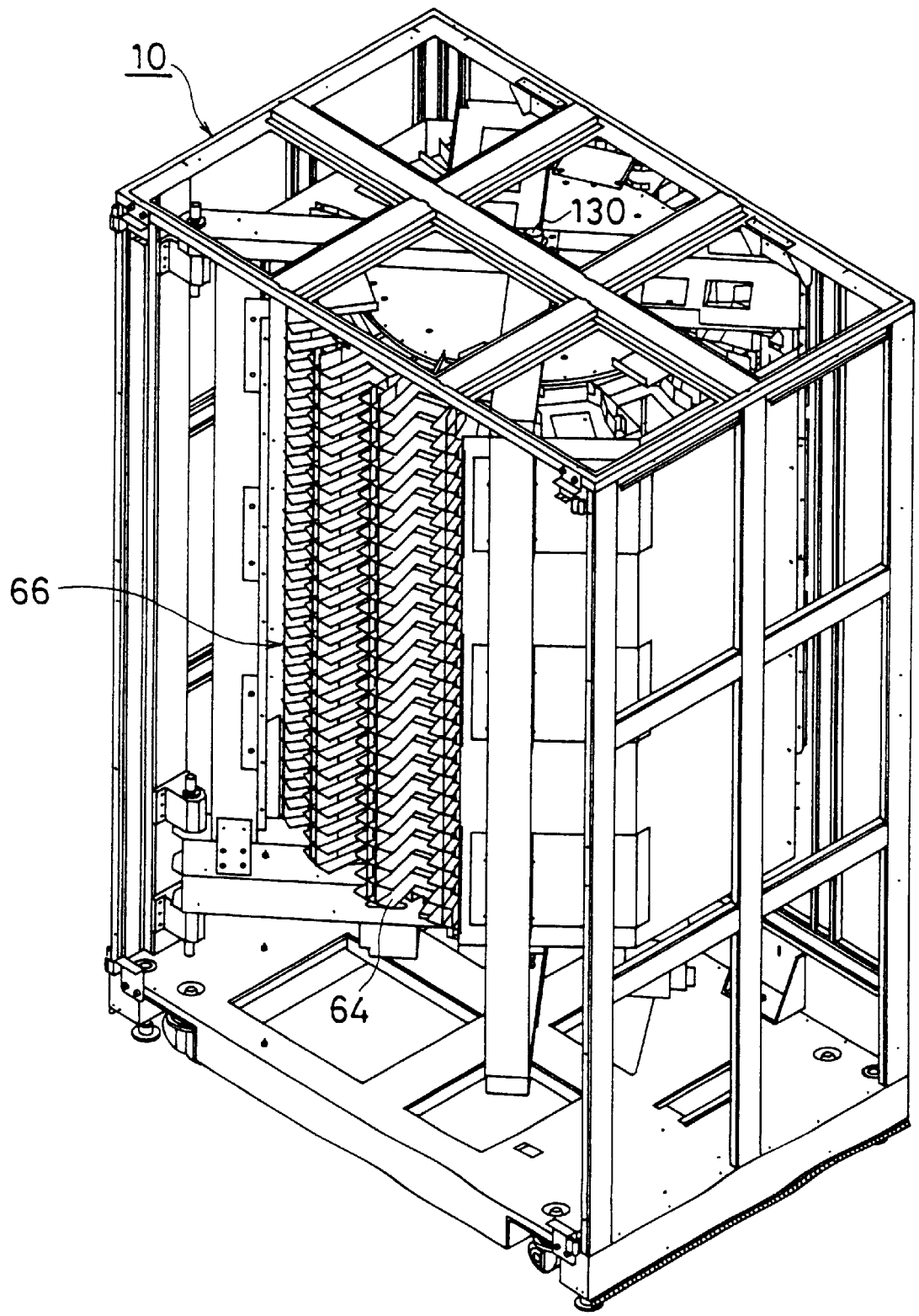
FIG. 5 is a diagram for illustrating a cell drum of FIG. 2.

FIG. 5 illustrates the cell drum used in the apparatus of the present invention in detail. In the case of the cell drum 10, the body 66 thereof is attached to the frame through a shaft 130 of rotation thereof in such a manner as to be able to be rotated by a motor (not shown). In the case of this embodiment, 27 cells 64 are placed on the body 66 of the drum in the longitudinal direction thereof. Moreover, the cells 64 are located at 12 places obtained by dividing the circumference of the body 66 of the drum at a constant interval of 30 degrees. Thus, the total number of the cells 64 is 324. The embodiment of FIG. 2 has 12 pieces of such cell drums. Consequently, 3888 cells are secured in the apparatus.

Hardware And Functions

Figure 6:
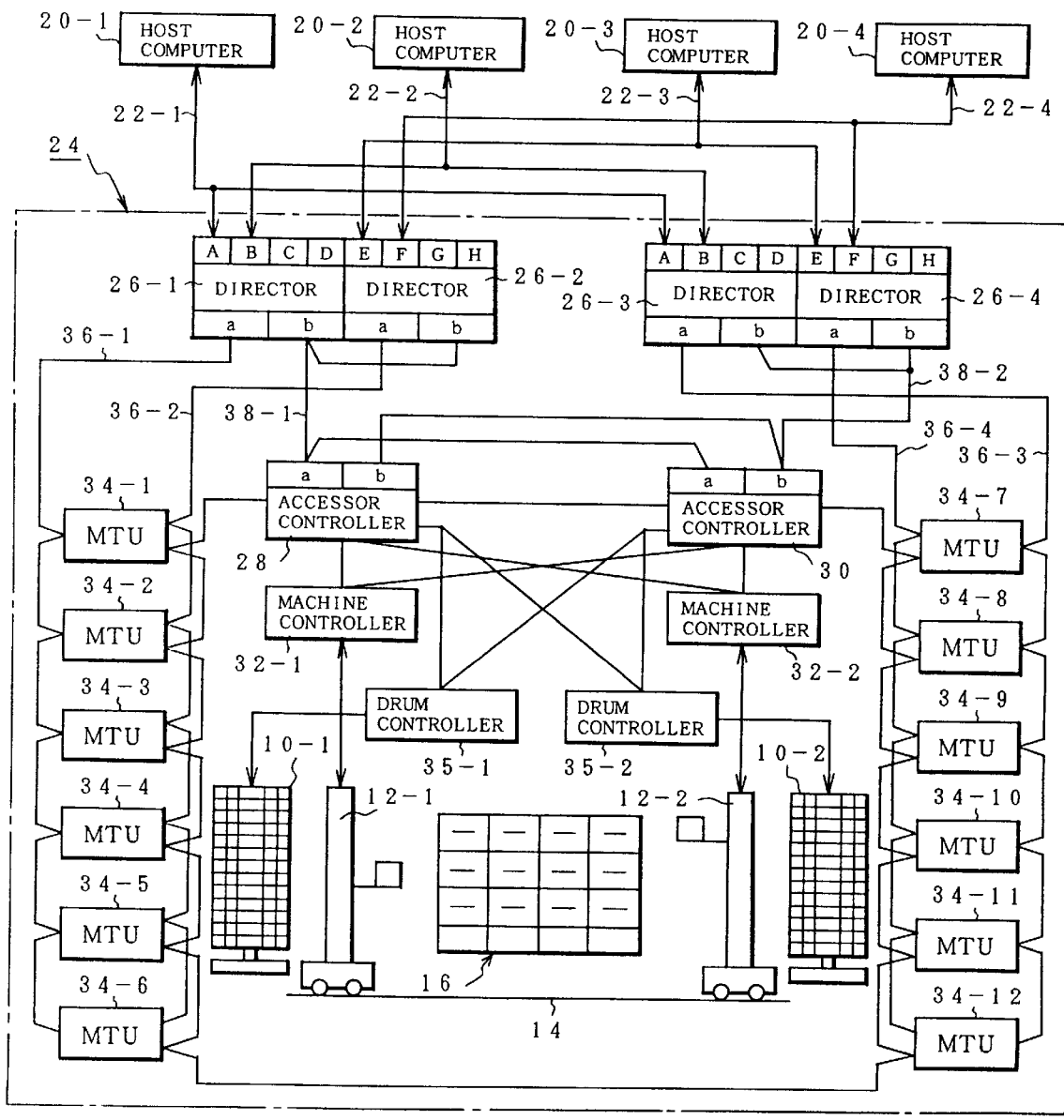
FIG. 6 is a block diagram for illustrating the configuration of hardware of a library apparatus of the present invention.

FIG. 6 is a block diagram for illustrating the configuration of an example of hardware of the library apparatus of the present invention. In the case of this embodiment, namely, the library 24, four host computers 20-1 to 20-4 are provided as host or primary units. The host computers 20-1 to 20-4 are connected to the library apparatus 24 through channel interface buses 22-1 to 22-4, respectively. For example, block multiplexer channel interfaces or small computer system interfaces (SCSI) are used as the channel interface buses 22-1 to 22-4. For instance, four directors 26-1 to 26-4 are placed in the library apparatus 24. Each of the directors 26-1 and 26-3 has channels A, B, C and D. On the other hand, each of the directors 26-2 and 26-4 has channels E, F, G and H. Incidentally, each of the directors 26-1 to 26-4 can have 6 channels at the maximum. A channel interface bus 22-1 from the host computer 20-1 is connected to the channel A of each of the directors 26-1 and 26-3. Further, a channel interface bus 22-2 from the host computer 20-2 is connected to the channel B of each of the directors 26-1 and 26-3. Moreover, a channel interface bus 22-3 from the host computer 20-3 is connected to the channel E of each of the directors 26-2 and 26-4. Furthermore, a channel interface bus 22-4 from the host computer 20-4 is connected to the channel F of each of the directors 26-2 and 26-4. Incidentally, the channels C and D of the directors 26-1 and 26-3 and the channels G and H of the directors 26-2 and 26-4 are not used in the case of this embodiment.

On the other hand, two channels a and b are provided at the terminal side of each of the directors 26-1 to 26-4. Further, the channel a is used for recording and reproducing signals, and the channel b is used for controlling the accessors. The directors 26-1 and 26-2 share six recording/reproducing units 34-1 to 34-6 provided in a left-side part of the apparatus and are connected thereto from the channels a through device buses 36-1 and 36-2, respectively. Therefore, the directors 26-1 and 26-2 can write data to and can read data from the left-side recording/reproducing units 34-1 to 34-6 through the channels a. Moreover, the directors 26-3 and 26-4 share six recording/reproducing units 34-7 to 34-12 provided in a right-side part of the apparatus and are connected thereto from the channels a through device buses 36-3 and 36-4, respectively. Therefore, the directors 26-3 and 26-4 can write data to and can read data from the right-side recording/reproducing units 34-7 to 34-12 through the channels a. Incidentally, in each of the left-side and right-side parts of the apparatus, 16 recording/reproducing units can be contained at the maximum. A device interface bus 38-1 drawn out of the channel b of each of the directors 26-1 and 26-2 is connected to the channel a of an accessor controller 28. Moreover, a device interface bus 38-2 drawn out of the channel b of each of the directors 26-3 and 26-4 is connected to the channel b of the accessor controller 28. An accessor controller 30 is a reserve machine and has a channel a connected to the device interface bus 38-1 drawn from the channel b of each of the directors 26-1 and 26-2 and further has a channel b connected to the device interface bus 38-2 drawn from the channel b of each of the directors 26-3 and 26-4. The accessor controllers 28 and 30 accept instructions from one of the directors 26-1 to 26-4 and performs a processing. Machine controllers 32-1 and 32-2, which are respectively used to control the accessors 12-1 and 12-2, and drum controllers 35-1 and 35-2, which are respectively used to control the cell drums 10-1 and 10-2, are provided in such a manner as to work under the accessor controller 28. Incidentally, for brevity of description, only two cell drums are provided in the apparatus. The machine controllers 32-1 and 32-2 and the drum controllers 35-1 and 35-2 are connected to the accessor controller 30 serving as a reserve machine. Normally, these controllers receive instructions from the accessor controller 28. The host computers 20-1 to 20-4 designate logical device addresses in response to the occurrence of input/output requests to the library apparatus 24, which is attend by the execution of a job, and issue a moving command, which serves as an input/output starting instruction, to the directors 26-1 and 26-2 from the channels assigned thereto. When obtaining a normal reception acknowledgement from the director in response to this moving command, the host computer next transfer a data byte (namely, a command parameter) serving as medium conveying information. This data byte contains an origin address and a destination address and is stored in a queuing table provided in the accessor controller 28. Thereafter, when the accessor controller 28 knows that the accessor 12-1 or 12-2 is idle, this controller dequeues or fetches data representing the origin address and the destination address of the moving command from the queuing table. Further, this controller instructs the machine controller 32-1 or 32-2 to cause the accessor 12-1 or 12-2 to move. Moreover, if necessary, this accessor controller instructs the drum controller 35-1 or 35-2 to cause the cell drum 10-1 or 10-2 to rotate. In this case, the accessor controller 28 refers to each of the origin address and the destination address of the translation table. Then, data referred to is converted into an angle θ of rotation of the cell drum and accessor coordinates (X, Y). Furthermore, the accessor controller 28 instructs the rotation of the cell drum only by the angle θ and the movement of the accessor to the position having the coordinates (X, Y).

Accessor Controllers

Figure 7:
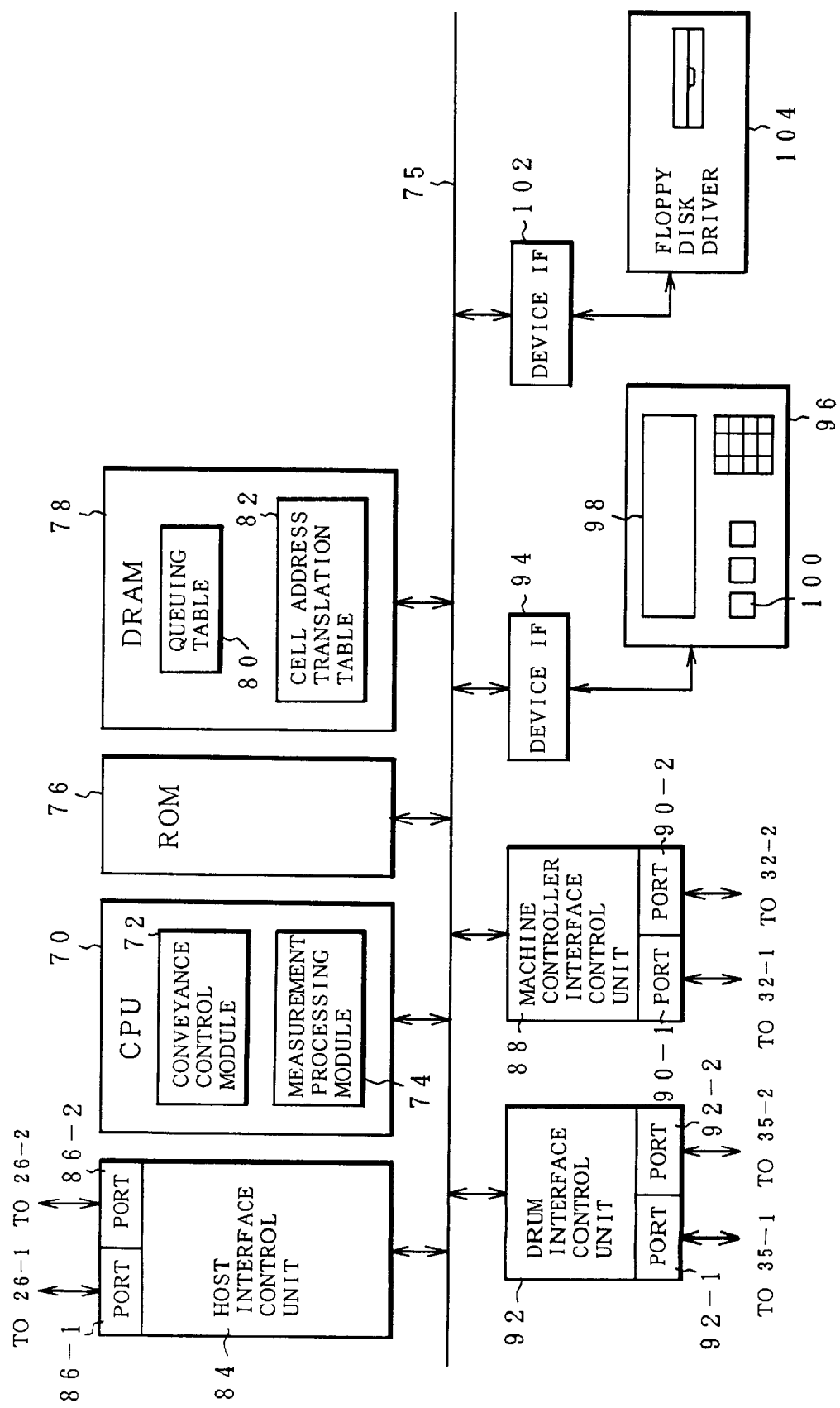
FIG. 7 is a block diagram for illustrating the configuration of an accessor controller of FIG. 6.

FIG. 7 illustrates the configuration of the accessor controller 28. As shown in this figure, a ROM 76, a dynamic RAM (DRAM) 78, a host interface control unit 84, a machine controller interface control unit 88, a drum interface control unit 92 and device interfaces 94 and 102 are connected to a bus 75 for a central processing unit (CPU) 70. Moreover, a conveyance control module 72 and a measuring operation module 74, which are realized under program control, are contained in the CPU 70. Furthermore, a queuing table 80 and a cell address translation table 82 are provided in the DRAM 78. In addition, a moving command received from the host computer through the director is stored in the queuing table 80. Further, the angle e of rotation of the cell drum and the coordinates (X, Y) are stored in the cell address translation table 82 by using the cell address as an entry (incidentally, X-axis and Y-axis are employed as representing reference directions which determine the horizontal range and the vertical range of the movement of the accessor). Here, a cell address is, for instance, a four character hexadecimal number. Further, cell address A000 and A001 are assigned to the robot hands of the accessors 12-1 and 12-2, respectively. Moreover, a cell address B000 is assigned to the medium inlet/outlet port 15. Cell addresses C000 to CFFF are assigned to the cells of the cell drums 10-1 to 10-12, respectively. Furthermore, cell addresses D000 to D00D are assigned to the recording/reproducing units 34-1 to 34-12 of FIG. 6. Additionally, the angle θ of rotation of the cell drum and the coordinates X and Y correspondingly to the cell addresses C000 to CFFF assigned to the cells of the cell drum in the cell address translation table 82 as (table) values to be stored therein. Regarding each of the cell address B000 assigned to the medium inlet/outlet port and the cell addresses D000 to D00D assigned to the recording/reproducing units, only the coordinates X and Y are stored therein. Further, regarding the cell addresses A000 and A001 assigned to the robot hands, only the coordinates X and Y, the values of which are updated to those of a current position at all times, are stored therein. Values actually measured by using the measuring operation module 74 of the CPU 70 by use of the accessors and the rotation of the cell drum are used as the table values stored in the cell address translation table 82. Further, the translation table, which contains the actually measured values, is stored in the ROM 76 and is loaded into the DRAM as the cell address translation table 82 when performing a power-on starting. Moreover, the translation table, which contains the actually measured values, is stored in a floppy disk for a backup operation by using a floppy disk unit 104. The measurement of actual table values by means of the measuring operation module 74 is performed by using a customer engineer (CE) panel 96 upon completion of installation of the library apparatus. The CE panel 96 has a display unit 98. Further, an FD selection switch 100, which is used for indicating the selection of the table values stored in the floppy disk in the case where there is a mismatch between the table values respectively stored in the ROM and the floppy disk when performing a power-on starting, is provided on the panel 96. The conveyance control module 72 of the CPU 70 fetches or dequeues the byte data of the moving command, namely, the cell addresses of the origin and the destination from the queuing table 80. Moreover, the module 72 finds the angle θ of rotation of the cell drum and the coordinates X and Y in the cell address translation table 82. Then, the module 72 instructs the drum controllers 35-1 and 35-2 and/or the machine controllers 32-1 and 32-2 to perform drive operations.

Figure 8:
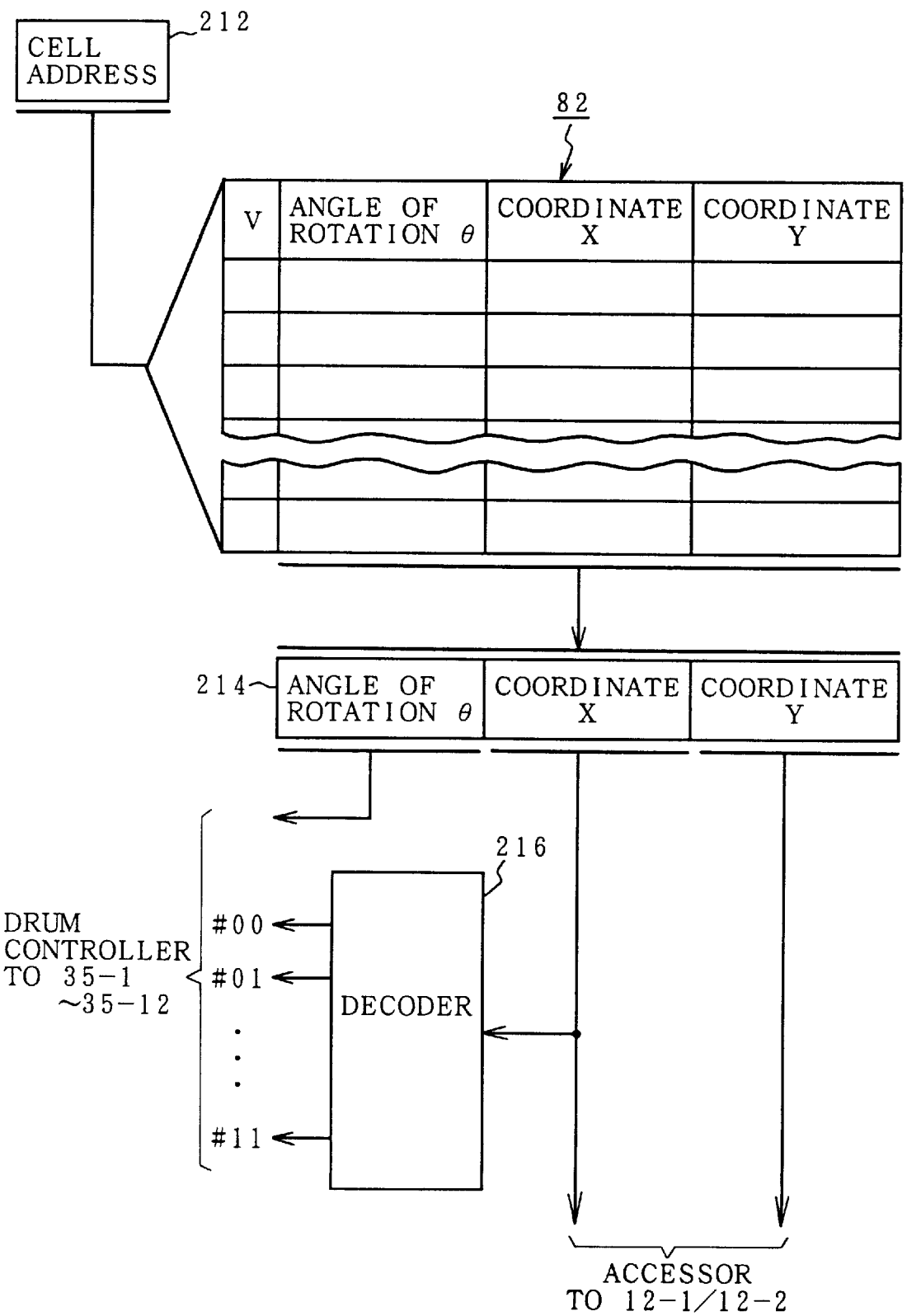
FIG. 8 is a diagram for illustrating a cell-address translation to be performed by the accessor controller.

FIG. 8 is a diagram for illustrating the cell-address translation function of the conveyance control module 72. Namely, the cell address fetched from the queuing table 80 is set in a register 212. Then, a cell-address change table 82 is referred to by using the set cell address as an entry. Thus the corresponding table value is read out to a register 214. Further, the angle θ of rotation of the cell drum and the coordinates X and Y, which are obtained from the cell address corresponding to a given cell of the cell drum, are stored in the register 214. A decoder 216 decodes the horizontal position of the cell drum, which is obtained from the coordinate X stored in the register 214, and generates a decoded output of one of the device numbers #00 to #12 of the cell drums. Hereupon, if the drum controllers 35-1 to 35-12 are provided respectively corresponding to the cell drums, the drum controller corresponding to the cell drum having the number designated by the output of the decoder 216 is instructed to rotate the drum by the angle θ. Simultaneously, the coordinates X and Y stored in the register 214 are given to one of the machine controller 32-1 and 32-2 as instructions to move the accessor 12-1 or 12-2.

Figure 9:
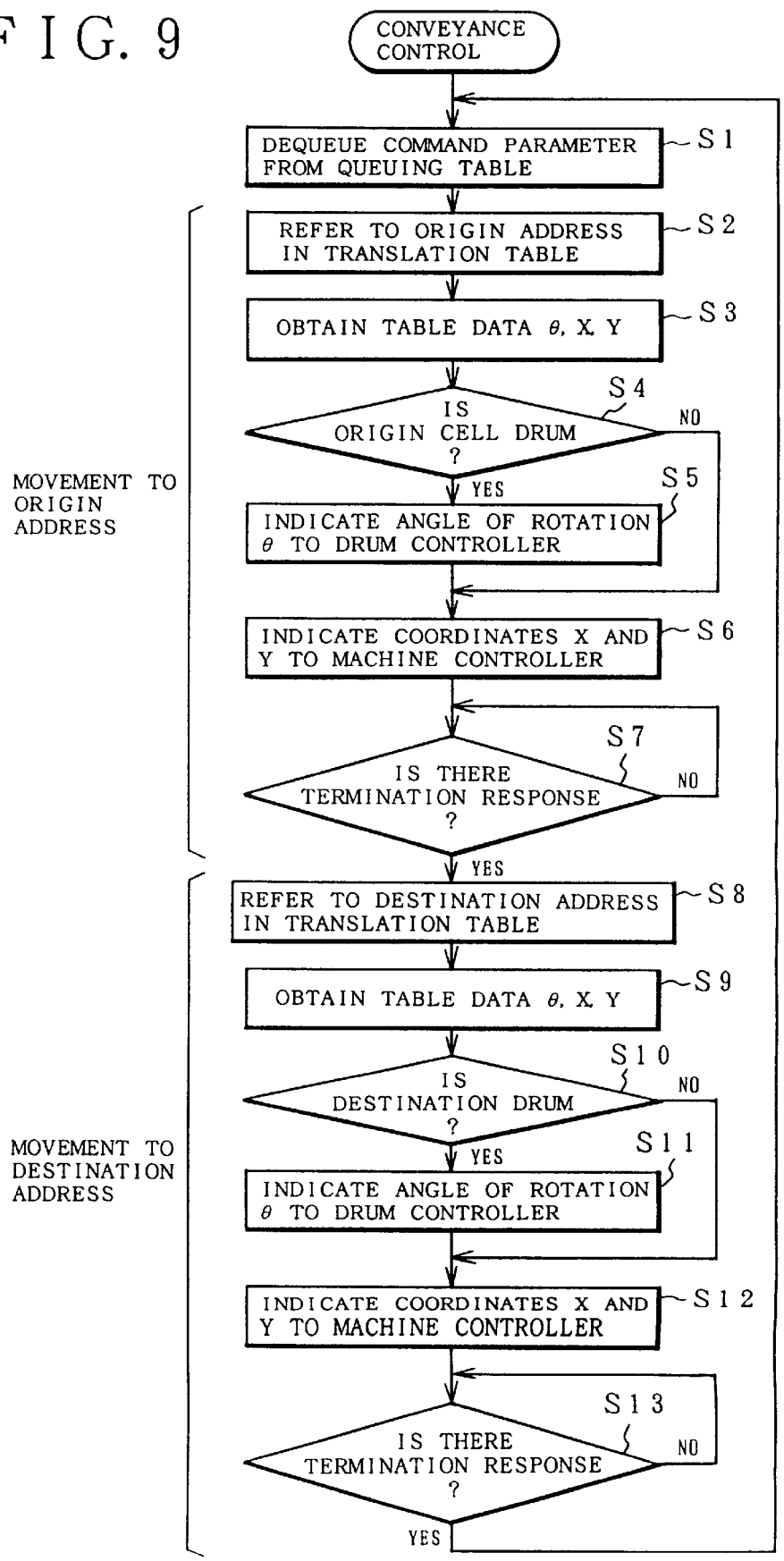
FIG. 9 is a flowchart for illustrating a medium conveying operation to be performed by the accessor controller.

FIG. 9 is a flowchart for illustrating a medium conveying operation to be performed by the accessor controller 30. First, in step S1, an origin address and a destination address acting as command parameters are dequeued or fetched from the queuing table 80. In the subsequent sequence of steps S2 to S7, the origin address is processed. Namely, in step S2, the cell address translation table 82 is referred to. Then, the angle θ of rotation of the cell drum and the coordinates X and Y are obtained in step S3. Next, in step S4, it is checked whether the origin of the movement of the accessor is the cell drum. If so, this accessor controller instructs the drum controller in step S5 to rotate the drum by the angle θ. Subsequently, in step S6, this accessor controller gives the coordinates X and Y to the machine controller, and instructs the machine controller to move the accessor to the origin address. Thereby, the cell drum performs the positioning of the cell of the origin by turning this cell to an accessor taking-out position thereof. Simultaneously, the accessor moves to the taking-out position of the cell drum. Thereafter, when a medium is picked up by using the robot hand, termination response is outputted. If the termination response or notification from this accessor is identified, this program advances to a destination address processing to be performed in steps S8 to S13. Namely, the cell address translation table 82 is referred to by using the destination address in step S8. Then, the angle θ of rotation of the cell drum and the coordinates X and Y are obtained in step S9. Next, in step S10, it is checked whether the origin of the movement of the accessor is the cell drum. If so, this accessor controller instructs the drum controller in step S11 to rotate the drum by the angle θ. Subsequently, in step S12, this accessor controller gives the coordinates X and Y to the machine controller, and instructs the machine controller to move the accessor to the origin address. Thereby, for instance, the accessor having picked up a medium moves to the position of a magnetic tape unit, the address of which is the destination address. Then, when loading the medium by using the robot hand, this accessor outputs a termination response. If the termination response from this accessor is identified in step S13, the execution of a moving command is finished. Further, in response to a status command issued from the host computer, a device end response or notification is issued. Further, this program returns to step S1 again and then starts executing the next command.

Figure 10:
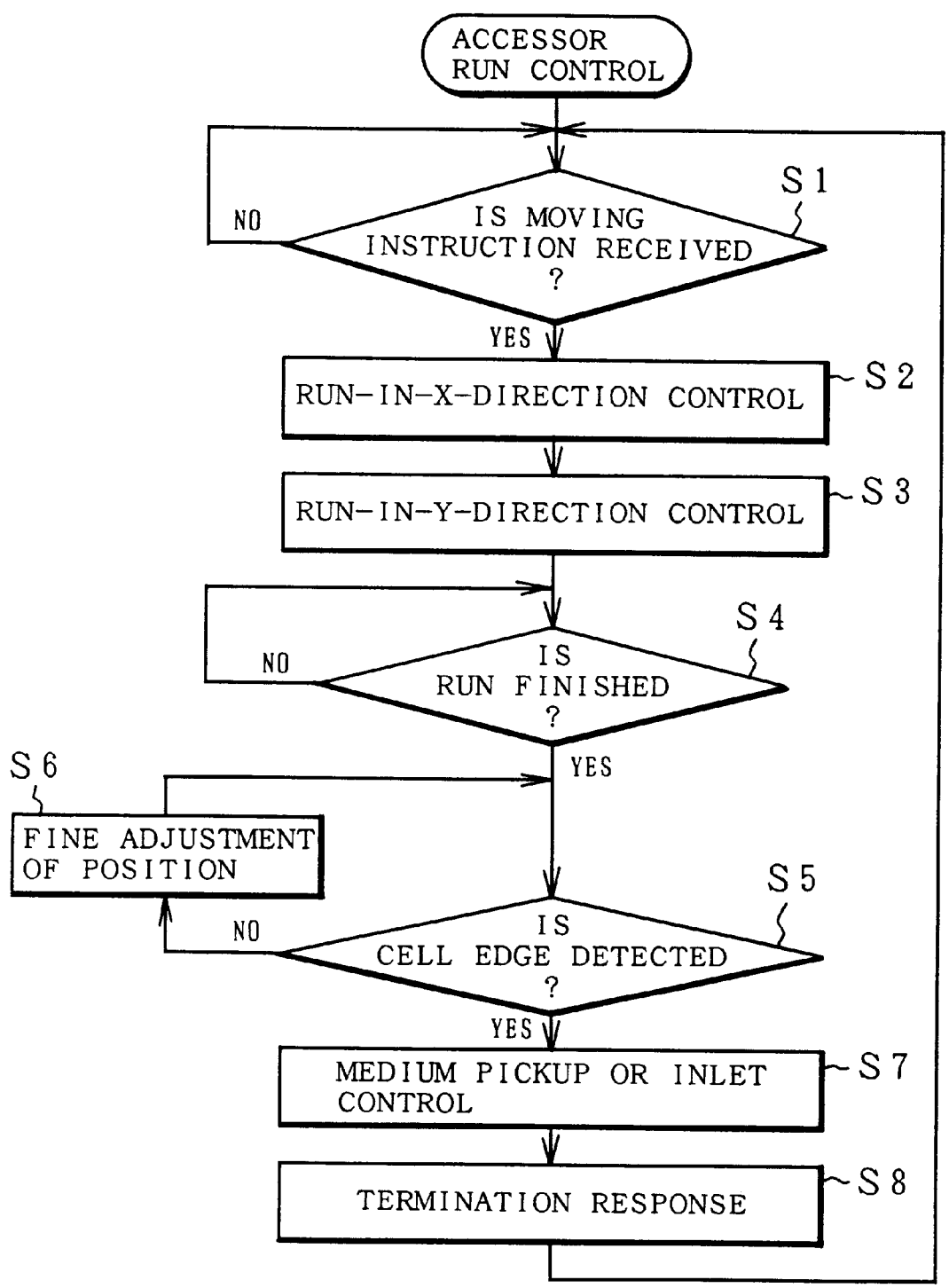
FIG. 10 is a flowchart for illustrating an accessor driving control operation to be performed by a machine controller.

FIG. 10 is a flowchart for illustrating an accessor driving control operation to be performed by the machine controller 32 of FIG. 6. If a moving instruction, which uses the coordinates X and Y as parameters, is received from the accessor controller 30 in step S101, an X-direction running control operation is commenced in step S102. Then, a Y-direction running control operation for moving up and down the robot hand is started in step S103. During the X-direction and Y-direction running control operations, the accessor is moved to a target position by controlling the speed of the motor according to an acceleration pattern, a constant-speed pattern and a deceleration pattern. When the accessor reaches the target position, a positioning control operation is started. If the running of the accessor is finished in step S104, it is judged in step S105 whether or not an edge of the cell drum can be detected by the photodetector provide in the picker of the robot hand. If the cell edge is detected, the designated cell is correctly positioned with respect to the accessor. If the edge of the cell is not detected, a fine adjustment of the position of the accessor is performed in step 106. Consequently, the position, at which the cell edge is detected, is found. If the cell edge can be normally detected, a medium is taken out of the cell or the conveyed medium is inserted into the cell by using the robot hand in step S107. Subsequently, a termination response is outputted to the accessor controller 30 in step S108. Finally, this program returns to step S1 whereupon the apparatus waits for the next instruction.

Drum Rotation Advanced Control Operation

Figure 11A:
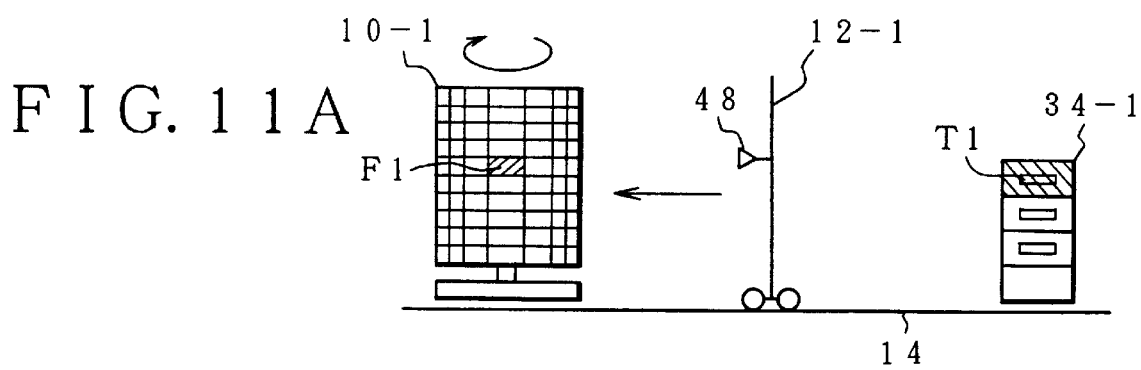
FIGS. 11A to 11C are diagrams for illustrating a drum rotation advanced control operation of the present invention.
Figure 11B:
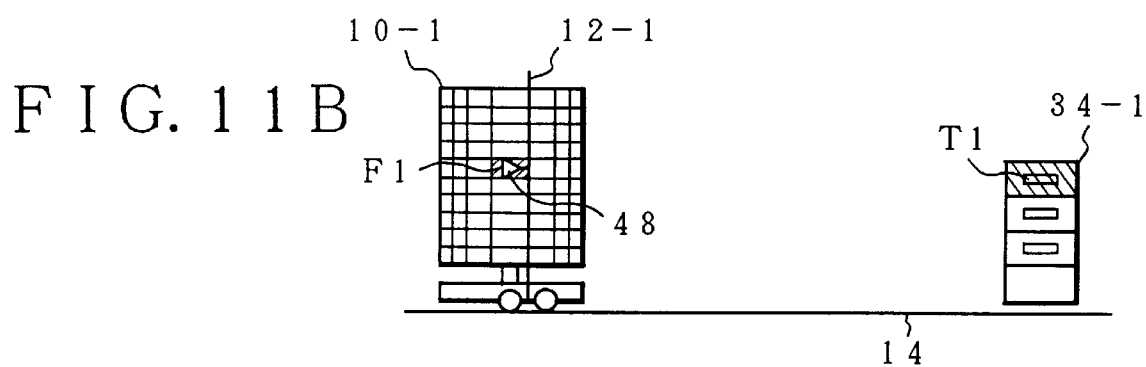
Figure 11C:
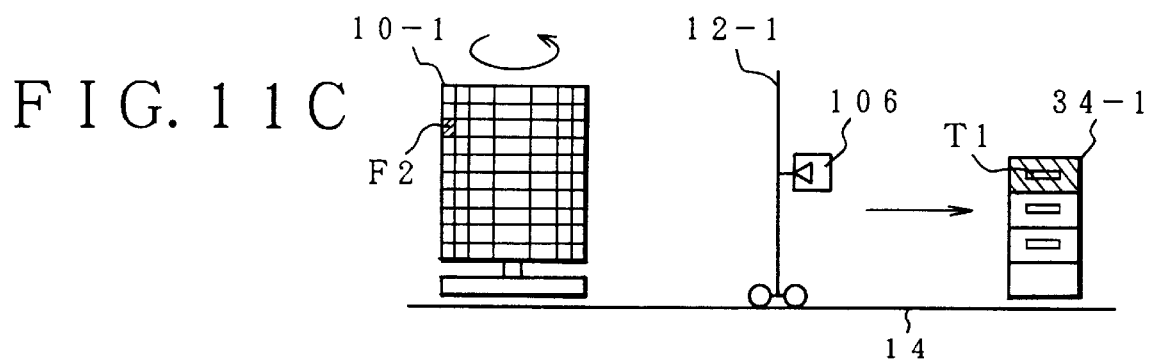
Figure 12:
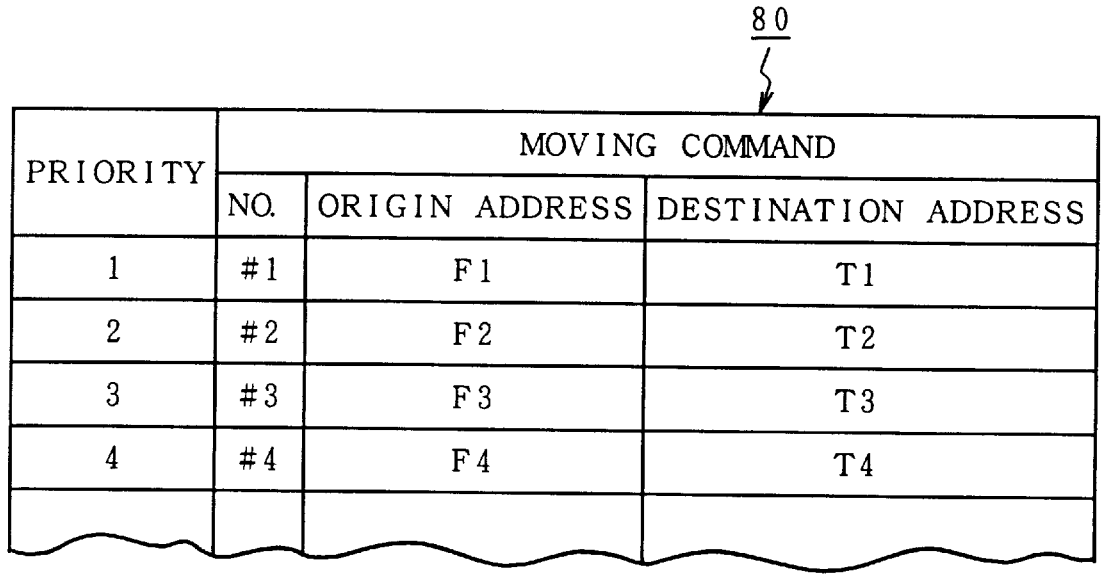
FIG. 12 is a diagram for illustrating a queuing table to be used in the drum rotation advanced control operation.

FIGS. 11A to 11C illustrate a drum rotation advanced control operation to be performed by the conveyance control portion or module 72 provided in the CPU 70 of the accessor controller 30. Hereinafter, a case where a storage medium is conveyed by the accessor 12-1 between the cell drum 10-1 and the magnetic tape unit 34-1 will be described by way of example. First, it is assumed that moving commands are stored in the queuing table 80 as illustrated in FIG. 12. In this figure, the moving commands are designated by command numbers such as #1, #2, #3 and #4. Each of these moving commands has an origin address and a destination address as parameters. A scheduling operation for establishing priorities, which are used to determine the order of executing such moving commands, in the queuing table 80 as illustrated in this figure is preliminarily performed.

FIG. 11A illustrates how the moving command #1 of FIG. 12 having a priority of 1 is executed. This moving command #1 is a command to take out a storage medium from an origin address F1 of the cell drum 10-1 and then convey this storage medium to the magnetic tape unit 30-1 corresponding to the destination address T1. When executing this moving command #1, the rotation of the cell drum 10-1 and the movement of the accessor 121 to the cell drum 10-1 is performed on the basis of the origin address F1 as illustrated in FIG. 11A. When turning the cell designated by the origin address on the cell drum 101 to the accessor taking-out position, the accessor 12-1 is moved to the taking-out position on the cell drum 10-1. Further, the robot hand 48 is positioned at the cell corresponding to the origin address F1 as illustrated in FIG. 11B. Subsequently, a storage medium is picked up by the robot hand 48 from the cell drum 10-1. When picking up the storage medium from the cell drum 10-1, the accessor 12-1 conveys the storage medium 106 picked up by the robot hand 48 to the magnetic tape unit 34-1 and puts this storage medium thereinto as illustrated in FIG. 11C. If the accessor 12-1 picks up a storage medium from the cell drum 10-1 in a state illustrated in FIG. 11, a control operation base on the currently executed command is not performed on the cell drum 10-1 thereafter. Thus, the cell drum 10-1 comes to wait for the execution of the next command #2. At that time, concurrently with the execution of the moving command #1 by the accessor 12-1, a rotation of the drum is performed in advance so as to turn or move the cell corresponding to the destination address F2 of the command #2, which will next be executed, to the taking-out position of the accessor 12-1 as illustrated in FIG. 11C. As a result, the accessor 12-1 puts the storage medium 106 into the magnetic tape unit 34-1 corresponding to the destination address T1. Thus the current execution of the moving command #1 is finished. When this accessor returns to the cell drum 10-1 according to the origin address F2 of the next moving command #2, the rotation of the cell drum 101 has been finished. Moreover, the cell corresponding to the origin address F2 has been turned to the accessor taking-out position. Therefore, immediately, the accessor 121 can take out a storage medium from the cell corresponding to the origin address F2 of the next moving command #2 and can convey the storage medium to the position corresponding to the destination address F2.

Figure 13:
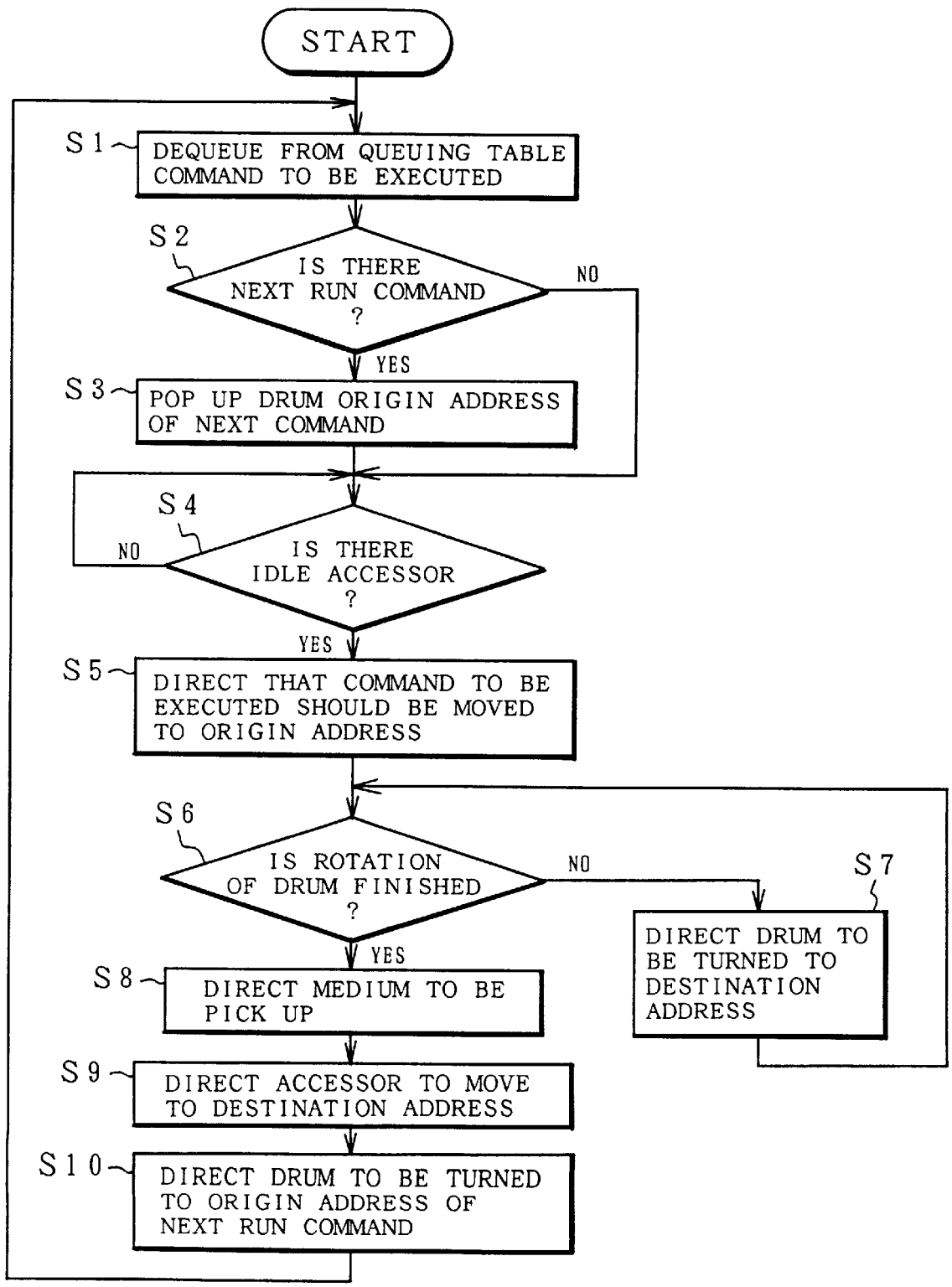
FIG. 13 is a flowchart for illustrating the drum rotation advanced control operation of the present invention.

FIG. 13 is a flowchart for illustrating the drum rotation advanced control operation of FIGS. 11A to 11C. First, in step S131, a (first) command to be executed is taken out of the queuing table 80, the scheduling of which has been finished as illustrated in FIG. 12. Then, if it is judged in step S132 that there is a command to next be executed, the origin address of the next command is taken out in step S133. Subsequently, it is checked in step S134 whether or not the accessors are idle. If there is an idle one of the accessors, this program advances to step S135 whereupon the accessor is instructed to move to the position corresponding to the origin address of the command taken out from the queuing table in step S131. Subsequently, it is checked in step S136 whether or not the rotation of the drum has been finished. When performing the first command, the rotation of the drum is performed simultaneously with the movement of the accessor. Thus the rotation of the drum has not been finished. Therefore, in step S137, the rotation of the drum to the origin address is instructed. If it is detected in step S136 that the rotation of the drum has been finished, the picking-up of a storage medium is instructed in step S138 after the movement of the accessor to the drum taking-out position is finished. If the picking-up of the medium from the cell drum is finished in step S138, the accessor is instructed to move to the position corresponding to the destination address in step S139. Subsequently, the rotation of the drum to the destination address of the command to next be executed is instructed in step S140. Thereby, the drum rotation advanced control operation of controlling the rotation of the drum in advance is performed.

Accessor Optimum Control Operation

Figure 14:
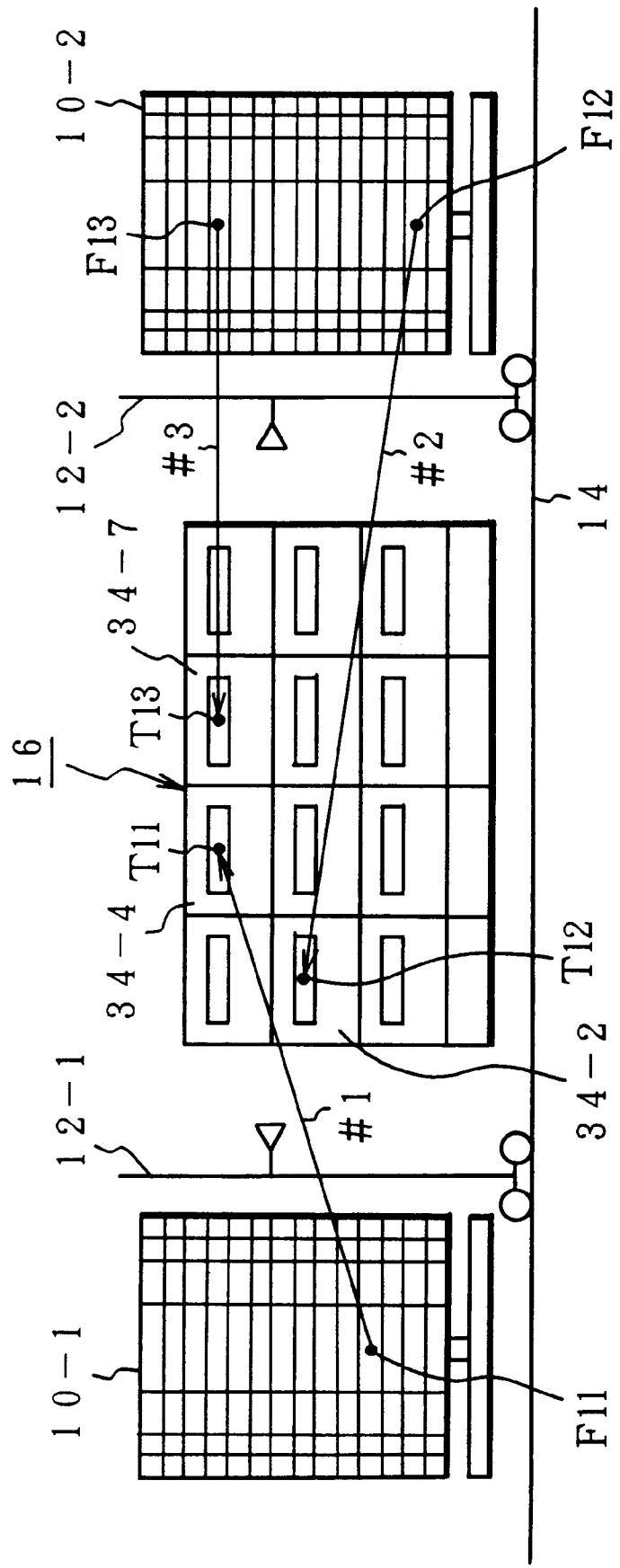
FIG. 14 is a diagram for illustrating an accessor simultaneous control operation of the present invention.
Figure 15:
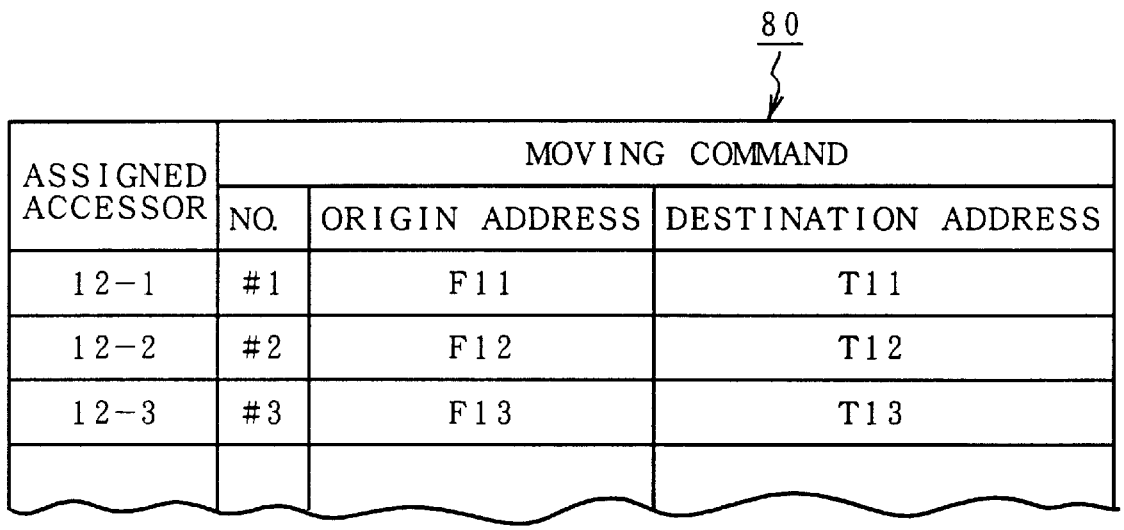
FIG. 15 is a diagram for illustrating a queuing table that contains a command, the execution of which results in a movement locus of a storage medium as illustrated in FIG. 14.

FIG. 14 is a diagram for illustrating an accessor optimum control operation of simultaneously driving the two accessors 12-1 and 12-2, which is performed by the conveyance control portion 72 provided in the CPU 70 of the accessor controller 30 of FIG. 7. Here, it is assumed that there are three moving commands in the queuing table 80 of FIG. 15 and that the scheduling has been performed in such a manner that the moving command #1 is assigned to the accessor 12-1 and the moving commands #2 and #3 are assigned to the accessor 12-2. The movement loci of storage media, which are respectively obtained by executing the three moving commands #1 to #3, are illustrated in FIG. 14. First, the moving command #1 is a command to convey a storage medium from the origin address F11 on the cell drum 10-1 to the magnetic tape unit 34-4 corresponding to the destination address T11, which is provided in the deck unit 16. Further, the moving command #2 is a command to convey a storage medium from the origin address F12 on the cell drum 10-2 to the magnetic tape unit 34-2 corresponding to the destination address T12, which is provided in the deck unit 16. Moreover, the moving command #3 is a command to convey a storage medium from the origin address F13 on the cell drum 10-2 to the magnetic tape unit 34-7 corresponding to the destination address T13, which is provided in the deck unit 16. Here, note that among the moving command #1 to be executed by the accessor 12-1 and the moving commands #2 and #3 to be executed by the accessor 12-2, the movement locus of the storage medium corresponding to the moving command #2 overlaps with that of the storage medium corresponding to the moving command #1. Therefore, the moving commands #1 and #2 can not be executed at the same time. In contrast with this, the movement locus of the storage medium corresponding to the moving command #3 does not overlap with that of the storage medium corresponding to the moving command #1.

Therefore, the moving commands #1 and #3 can be executed at the same time. In such a case, the accessor controller 30 selects the moving command #3, by the execution of which the corresponding storage medium follows the movement locus that does not overlap with the movement locus of the storage medium corresponding to the moving command #1, from the two moving commands #2 and #3 to be executed by the accessor 12-2. The selection of such a moving command #3 enables the simultaneous control of the accessors 12-1 and 12-2 as much as possible.

Figure 16:
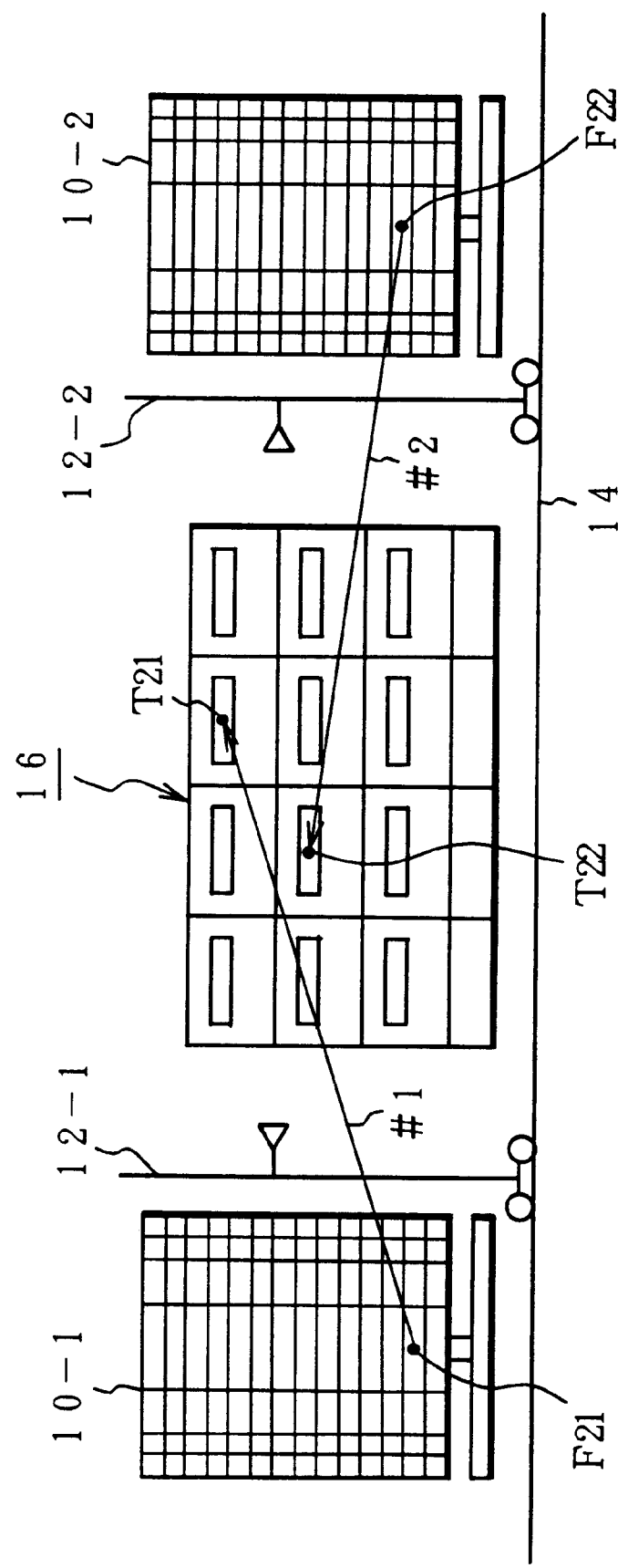
FIG. 16 is a diagram for illustrating the accessor simultaneous control operation which requires the retreat of an accessor.
Figure 17:
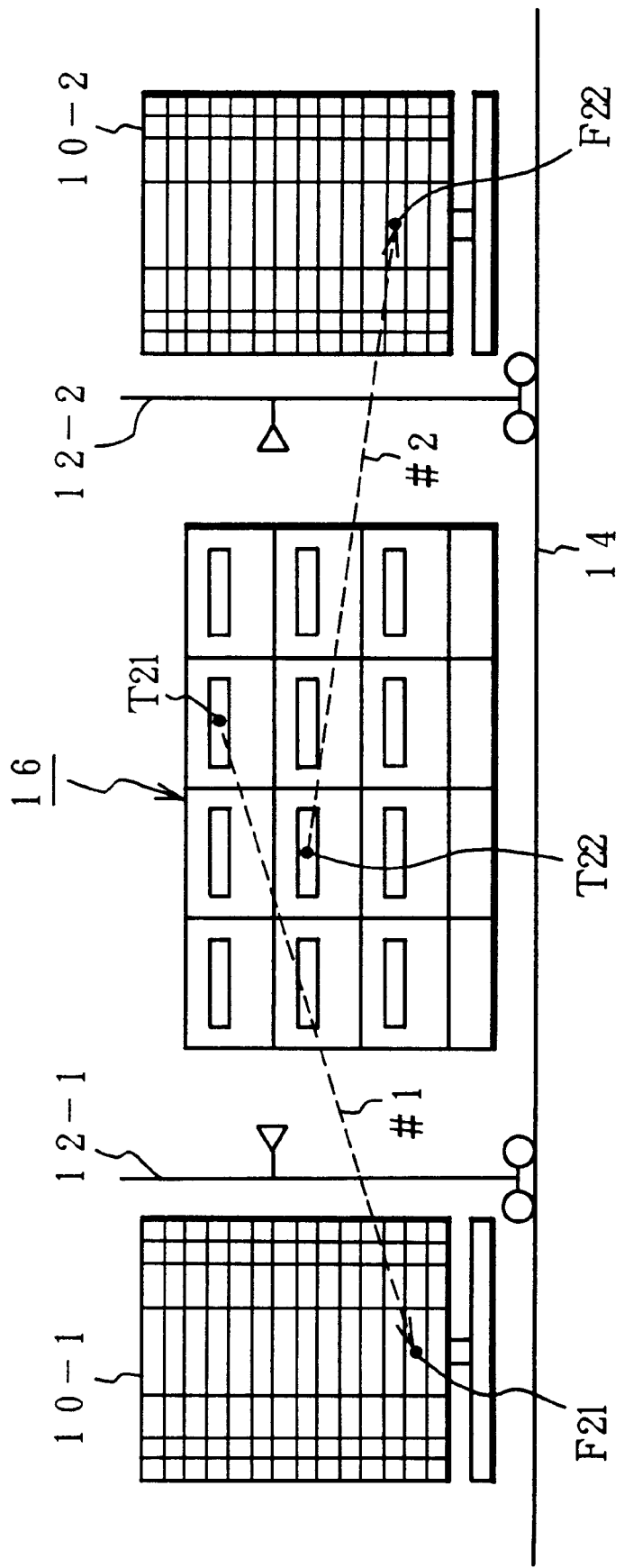
FIG. 17 is a diagram for illustrating the accessor simultaneous control operation to be partly performed with the result that a movement locus of FIG. 16 is obtained.

FIG. 16 illustrates an operation to be performed in the case where there is one moving command assigned to each of the accessors 12-1 and 12-2 in the queuing table of FIG. 18 and the movement loci of the media respectively corresponding to the moving commands #1 and #2 overlap with each other. In such a case, for example, when the accessor 12-1 executes the moving command #1, the accessor 12-2 should not execute the moving command #2, and but should retreat to a position where the accessor #2 does not interfere with the movement of the accessor 12-1. Consequently, the simultaneous control of the accessors 121 and 12-2 can not be achieved. The efficiency in performing the operation is degraded. Thus, the accessor controller 30 of the present invention causes the accessors 12-1 and 12-2 to simultaneously move positions corresponding to the origin addresses F21 and F22 of the moving commands #1 and #2, respectively, because there is no problem in the case where the accessors 12-1 and 12-2 are moved simultaneously to the positions corresponding to the origin addresses F21 and F22 as illustrated in FIG. 17. Regarding to the movement of the accessors to positions corresponding to the destination addresses T21 and T22, the accessor controller 30 causes the accessor 12-1 to execute a command having a higher priority obtained by performing the scheduling on the queuing table 80, for example, the moving command #1. Further, after the execution of the moving command #1 is finished, the moving command #2 is executed by moving the accessor 12-2 to a position corresponding to the destination address T22. Thus, even if the movement loci of the media respectively conveyed by the accessors 12-1 and 12-2 to the positions corresponding to the destination addresses of the moving commands overlap with each other, the simultaneous movement of the accessors to the positions corresponding to the destination addresses can enhance the efficiency in conveying the media for that.

Figure 19:
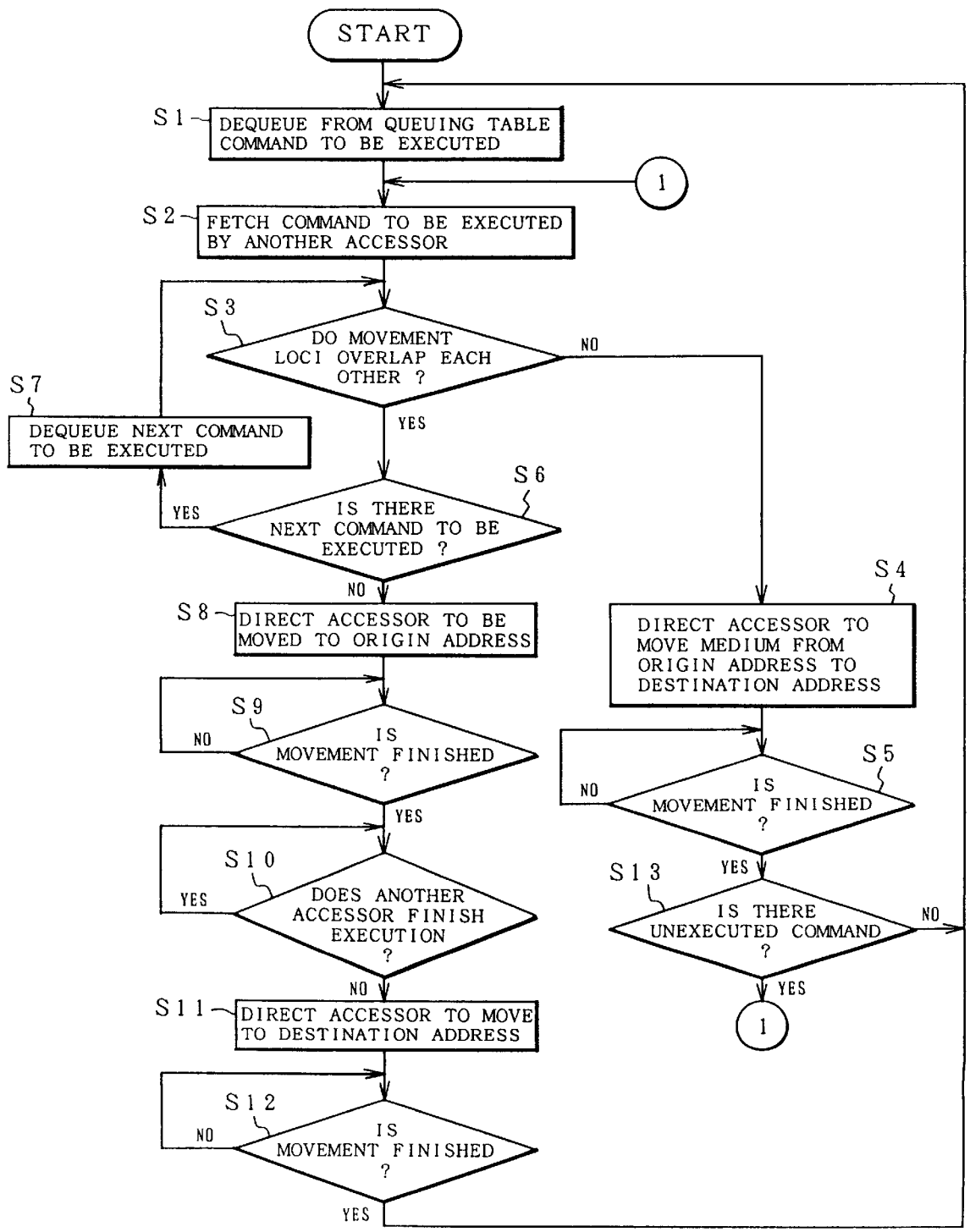
FIG. 19 is a flowchart for illustrating an accessor conveyance control operation, by which the simultaneous control operation of FIGS. 14 and 16 is realized.

FIG. 19 is a flowchart for illustrating the control operations of FIG. 14 and of FIGS. 16 and 17. First, in step S191, a (first) command to be executed by a first accessor is taken out of the queuing table. Subsequently, in step S192, another command to be executed by the other (or second) accessor is taken out therefrom. Then, it is checked in step S193 whether or not the movement loci of the media respectively corresponding to these accessors overlapped with each other. If not overlap, the accessors are instructed in step S194 to move from the position, which corresponds to the origin address, to the position corresponding to the destination address. If it is detected in step S195 that the movement is finished, this program returns to step S191. In contrast, if overlap exist, the program advances to step S196 whereupon it is checked whether or not there are other commands that can be executed. If there is another command to be executed, the program advances to step S197 whereupon that next command is taken out of the queuing table. Subsequently, it is checked in step S193 whether or not the movement loci of the media respectively corresponding to that accessors executing the next command overlap with the previous command. At that time, if the movement locus of the medium conveyed by one of the accessor executing the next command does not overlap with the movement locus of the medium conveyed by the other accessor similarly as in the case of executing the moving command #3, the accessors are instructed to move the media by executing such commands in steps S194 and S195. Then, if the movement of the media is finished, it is checked in step S203 whether or not there are unprocessed commands taken out of the queuing table. In this case, there is an unprocessed command. Thus, the program returns to step S192 whereupon a command to be executed by the other (namely, second) accessor at a current moment is taken from the table. Then, it is checked in step S193 whether or not the movement loci of the media respectively corresponding to the accessors overlap with each other. During that time, the other (or second) accessor has finished executing the command by which the movement loci of the media conveyed by the accessors overlapping with each other are obtained. Therefore, even when executing the unprocessed command, the movement loci of the media conveyed by the accessors do not overlap with each other. Thus, the program advances to step S194. Consequently, it becomes possible to instruct the accessors to move the media from the position corresponding to the origin address to the place corresponding to the destination address. Here, note that a waiting time is monitored concerning each of the unprocessed commands having been taken out from the table. If a timeout occurs, the unprocessed command is executed forcedly. In contrast, if it is found in step S196 that there is no command to next be executed, the operation illustrated in FIG. 17 is performed in steps S198 to S202. Namely, the accessors are instructed in step S198 to move to the positions corresponding to the origin addresses. Then, if it is detected in step S199 that the movement is finished, the control portion waits for the completion of the execution of the command by the other (or second) accessor. Upon completion of the execution of the command by the other (or second) accessor, it becomes possible to convey the media to the positions corresponding to the destination addresses. Thus, in step S201, the accessors are instructed to move the media thereto. Further, in step S202, the control portion waits for the completion of the conveyance of the media thereto. Thereafter, the program returns to step S191 again.

Positioning of Cell Drum And Accessors

Figure 20:
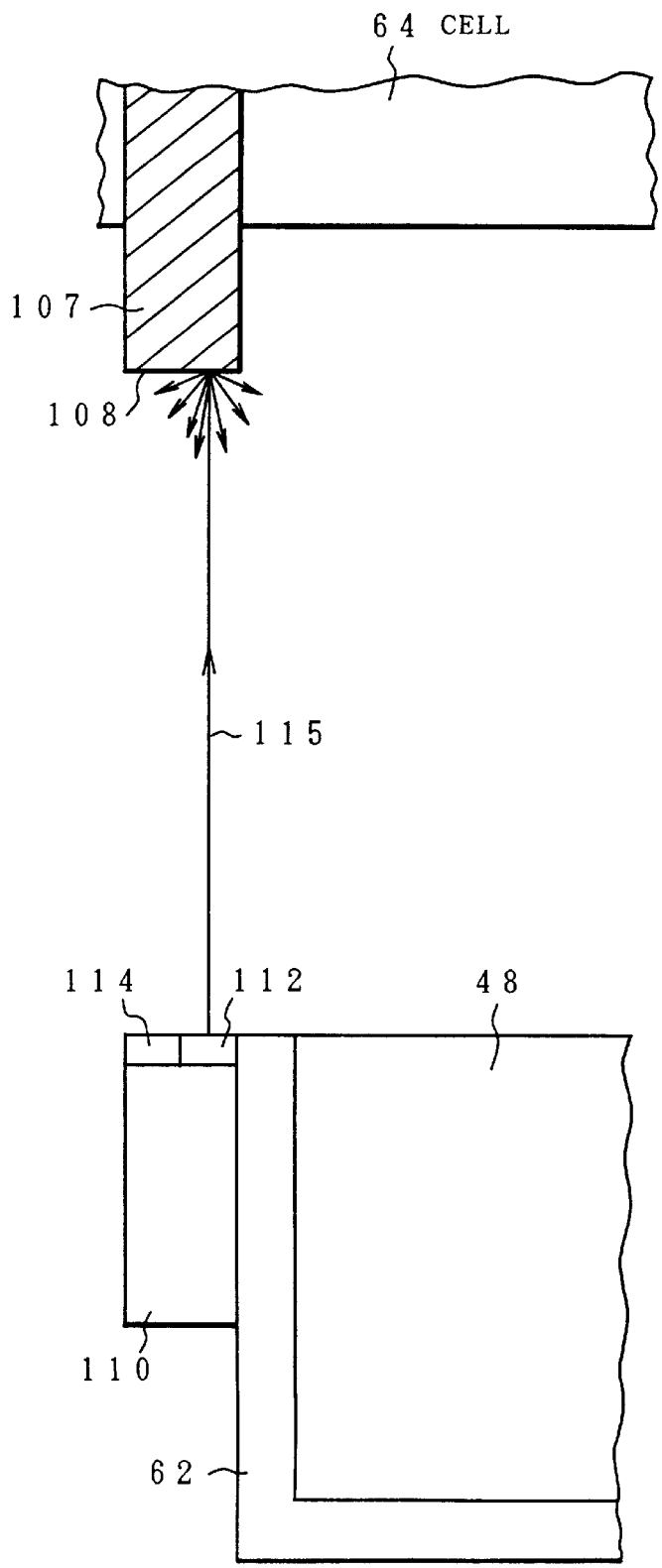
FIG. 20 is a diagram for illustrating a cell edge detecting operation to be achieved by utilizing scattered light.
Figure 21:
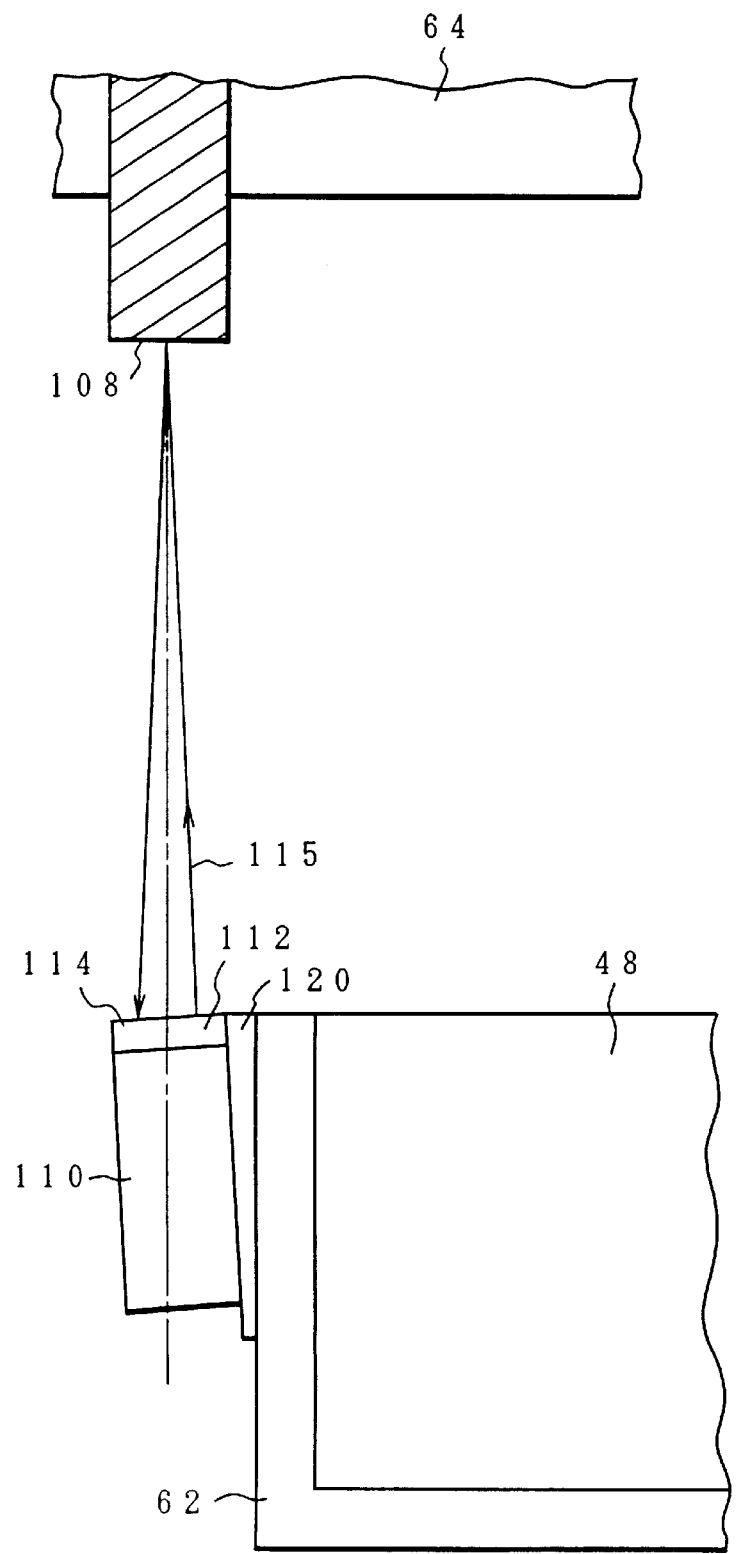
FIG. 21 is a diagram for illustrating a cell edge detecting operation of the present invention.

FIG. 20 illustrates how the robot hand 48 provided in the accessor of the present invention is positioned onto a cell of the cell drum by using a photodetector. As shown in this figure, a picker 62 is mounted on the robot hand 48. Further, a photodetector 110 is attached to, for example, the left side of the picker 62 as viewed from above. The photodetector 110 has a light emitting portion 112 and a light receiving portion 114 which face to a detecting direction and are laterally arranged on the side thereof. When the accessor is positioned onto the cell drum, a cell 64 is located in front of the robot hand 48. Further, an edge 108 of a partitioning wall 107 for partitioning off a cell 64 from an adjoining cell is located in front of the photodetector 110. Practically, the partitioning wall 107 has a structure as shown in a boundary portion of the cell 64 of the cell drum 10 of FIG. 5. Further, a light beam 115 is outputted from the light emitting portion 112 of the photodetector 110 provided on the left side of the picker 62, as indicated by an arrow and impinges upon the edge 108 and is then scattered therefrom. A part of the scattered light is incident on the light receiving portion 114, so that a light receiving signal indicating the presence of the edge 108 is obtained. However, in the case where the optical axis of the light emitting portion 112 of the photodetector 110 is set in such a manner as to be perpendicular to the edge 108, feeble scattering light is received. Thus the detection sensitivity of the photodetector 110 should be considerably high. However, when the detection sensitivity is enhanced, noises become noticeable. Thus the detecting performance of the edge 108 is degraded. Therefore, in the case of the apparatus of the present invention, the optical axis extending from the light emitting portion 112 of the photodetector 110 is slightly inclined to the edge 108 of the cell 64 as illustrated in FIG. 21. For example, the photodetector 110 is placed at the side of the picker portion 62 of the robot hand 48 by using a inclined mounting member 120 having a tapered face, the inclination of which is equal to that of the optical axis. The light beam 115 emitted from the light emitting portion 112 is incident on the edge 108 in such a manner as to slightly be inclined to a direction perpendicular to the edge 108. Thereby, the light beam is reflected therefrom in a reverse direction with the same inclination. Thus light of sufficient quantity can be incident to the light receiving portion 114. Consequently, the detection sensitivity can be considerably enhanced optically. As a result, the sensitivity of detecting the edge 108 of the cell 64 by the photodetector 110 can be enhanced considerably.

FIGS. 22A to 22C illustrate how the edge 108 of the cell 64 is detected by the photodetector 110 provided on the side surface of the robot hand 48 of the accessor. As stated in the description of the accessor running control operation of FIG. 10, the operation of detecting the cell edge by using the photodetector 110 is performed when the positioning of the accessor onto the cell drum is finished. When performing the operation of detecting the cell edge, the accessor is reciprocated in an infinitesimal range by alternately moving the photodetector 110 leftwardly and rightwardly from the edge 108 as viewed in FIG. 22A in the case of the apparatus of the present invention. FIG. 22B illustrates the waveform 116 of a detection signal outputted from the photodetector 110 when the photodetector 110 is moved from the right side of the edge 108 to the left side thereof. The photodetector 110 has sufficiently high sensitivity. The waveform 116 of the detection signal has a leading edge when the photodetector 110 is at the right side of a corner 108-1 of the edge 108 as viewed in this figure. Thereafter, when the photodetector passes the opposite corner 108-2, the level of the detection signal does not immediately falls. Namely, as indicated by the waveform 116, the level of the detection signal falls with a time lag, namely, the waveform 116 of the detection signal has a trailing edge. Here, let D2 denote the distance between a reference position and the leading edge of the waveform 116. Further, let D1 denote the distance between the reference position and the trailing edge of the waveform 116. FIG. 22C illustrates the waveform 118 of a detection signal outputted from the photodetector 110 when the photodetector 110 is moved from the left side of the edge 108 to the right side thereof. In this case, conversely, the waveform 118 of the detection signal has a leading edge when the photodetector 110 is at the left side of the corner 108-2 of the edge 108 as viewed in this figure. Thereafter, when the photodetector passes the opposite corner 108-1, the level of the detection signal falls with a time lag, namely, the waveform 118 of the detection signal has a trailing edge. Here, let D3 denote the distance between a reference position and the leading edge of the waveform 118. Further, let D4 denote the distance between the reference position and the trailing edge of the waveform 118. If the distances D1, D2, D3 and D4 are detected in relation to the rise and fall of each of the waveforms 116 and 118 of the detection signals, the essential distance D between the reference position and the center of the edge 108 can be accurately calculated as an average distance from the following equation:

$$D=(D1+D2+D3+D4)/4.$$

Further, the centering of the robot hand 48 onto the edge 48 of the cell 64 can be achieved with high accuracy by positioning the accessor at a position which is at the distance D1 calculated in this manner.

Figure 23:
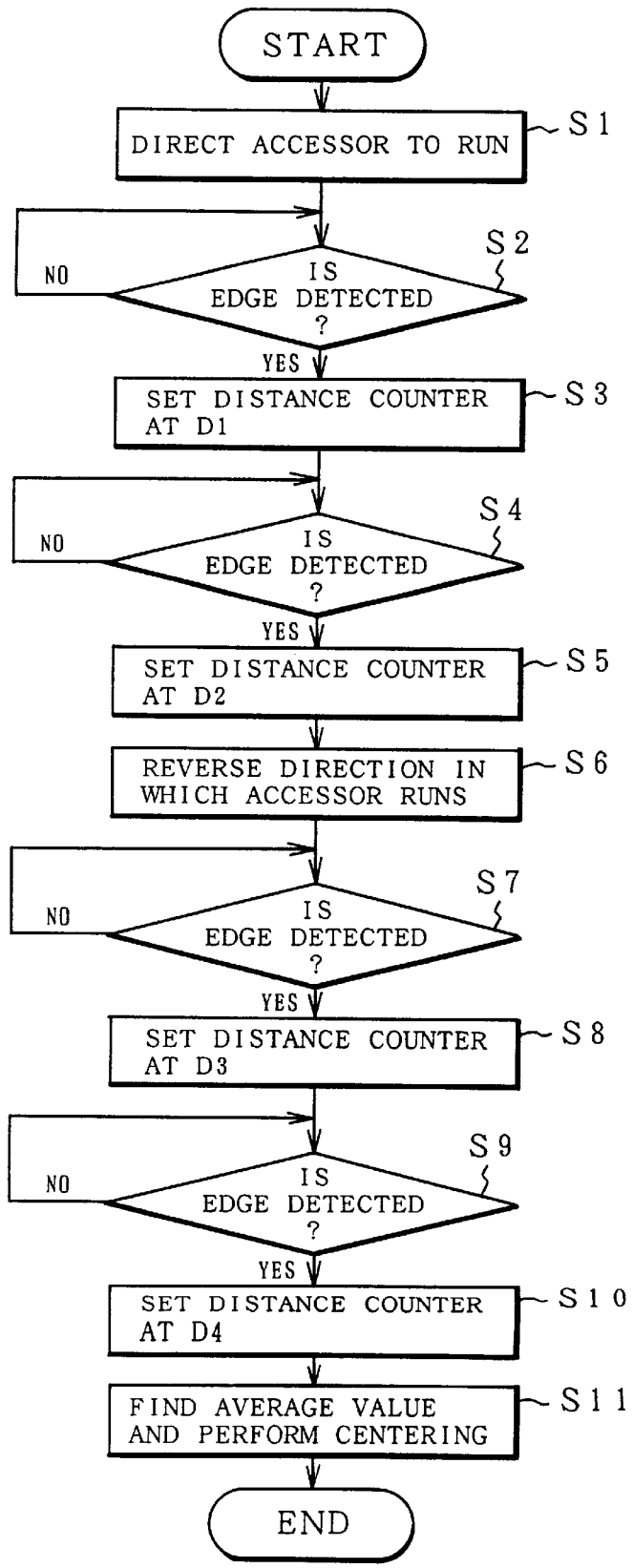
FIG. 23 is a flowchart for illustrating the cell edge position measuring operation of FIGS. 22A to 22C.

FIG. 23 is a flowchart for illustrating the edge detection operation of FIGS. 22A to 22C. First, in step S231, an accessor is instructed to run to and from an edge in a regular direction. If a rising portion of the edge is detected in step S232, the value indicated by a distance counter provided in the accessor is set at D1 in step 233. Subsequently, if a falling portion of the edge is detected in step S235, the value indicated by the distance counter provided in the accessor is set at D2 in step 235. Next, the accessor is moved in a reverse direction in step 236. If the rising portion of the edge is detected in step S237, the distance counter is set at D3. Subsequently, if the falling portion of the edge is detect ed in step S239, the distance counter is set at D4. Thereby, the detection operation consisting of a sequence of these steps is finished. Thus, finally, in step S241, the average of the values D1 to D4 set in the distance counter is found. Then, a centering operation of moving the accessor to a position corresponding to the obtained average is performed.

Figure 24:
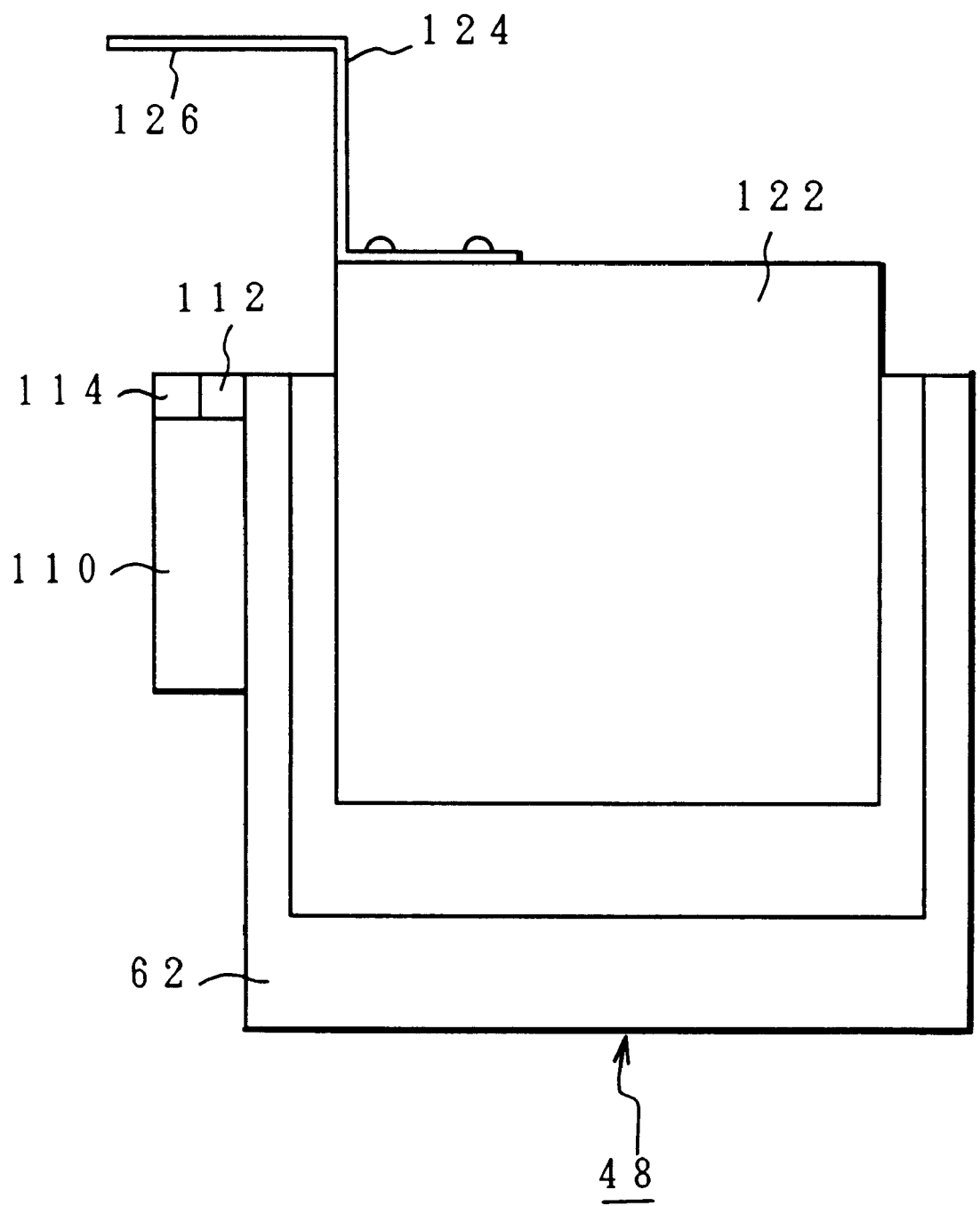
FIG. 24 is a diagram for illustrating a sensitivity regulating jig of a photodetector of the present invention.

FIG. 24 illustrates how the sensitivity of the photodetector provided in the robot hand of the accessor is regulated. As shown in this figure, the photodetector 110 is mounted on the side surface of the picker 62 provided in the robot hand 48 of the accessor. Usually, the regulation of the sensitivity of the photodetector 110 should be performed in a state in which the accessor is positioned onto the cell drum as illustrated in FIG. 20. However, it becomes necessary at the stage of installing the library apparatus that the sensitivity of the photodetector 110 is regulated by using the accessor simply. Thus, in the case of the apparatus of the present invention, a jig 122, which has the same cartridge shape as of the storage medium to be conveyed and can be held in the picker 62, is prepared as illustrated in FIG. 24. Further, a reflection member 124 is provided in the jig 122. The reflection member 124 is a member bent like a character "L" and is mounted in the jig 122 in such a manner that a reflecting face 126 thereof is located in front of the photodetector 110 of the picker 62. Thus, when regulating the sensitivity of the photodetector 110, the reflecting face 126 of the reflection member 124 can be located in front of the photodetector 110 only by fitting the jig 122 to the picker 62. Consequently, the sensitivity of the photodetector 110 can be regulated by using the accessor simply by making light, which is reflected from the light emitting portion 112, incident on the light receiving portion 114. Incidentally, FIG. 24 illustrates the regulation of the sensitivity of the photodetector 110, which is put into a mounted state of FIG. 20, by way of example. Moreover, even in the case of the photodetector 110 mounted on the picker portion 62 of FIG. 21 at an inclination angle, the sensitivity thereof can be regulated by using the accessor simply by means of the jig 122.

Measurement of Angle of Rotation of Drum

In the case of the accessor controller used in the library apparatus of the present invention, the angle θ of rotation of the cell drum, which is stored in the cell address translation table 82 as shown in FIG. 8, should be measured at a stage prior to the starting of an operation of the apparatus, the installation of which has been finished. For instance, in the case of the cell drum 10 of FIG. 5, the circumference of the rotating drum 66 is divided into 12 parts or arcs and further, the cells 64 are placed thereon. Thus, the angle of rotation corresponding to each cell is 30 degrees. Consequently, angles of rotation of the cells with respect to the reference position on the cell drum are uniquely determined as 0, 30 degrees, 60 degrees, 90 degrees, ..., 330 degrees and 360 degrees, respectively. Thus, in the cases of the cells aligned on the circumferential surface of the drum in the longitudinal direction thereof correspondingly to each angle of rotation, the angle of rotation designed as above described may be used. However, inevitably, there occurs an error between the designed angle of rotation of a cell and the actual angle of rotation of the center of the cell actually mounted on the installed cell drum 10, which is actually measured with respect to the accessor taking-out position thereon. Thus, in the case of the conventional apparatus, at a stage when the installation of the library apparatus is finished, a control or regulation operation of positioning the accessor in front of the cell drum is performed. Further, during the cell taking-out position in the vertical direction of the robot hand is determined, namely, during the positioning of the accessor in Y-direction is performed, the centering of the robot hand onto each cell is manually regulated. Moreover, the angle of rotation of each cell, which is obtained at that time, is used and stored in the cell address translation table 82. However, in the case of such a conventional apparatus, the manual measurement of the angle of rotation takes time and trouble. Accordingly, the apparatus of the present invention is adapted to perform the measurement of the angle of rotation automatically.

Figure 25:
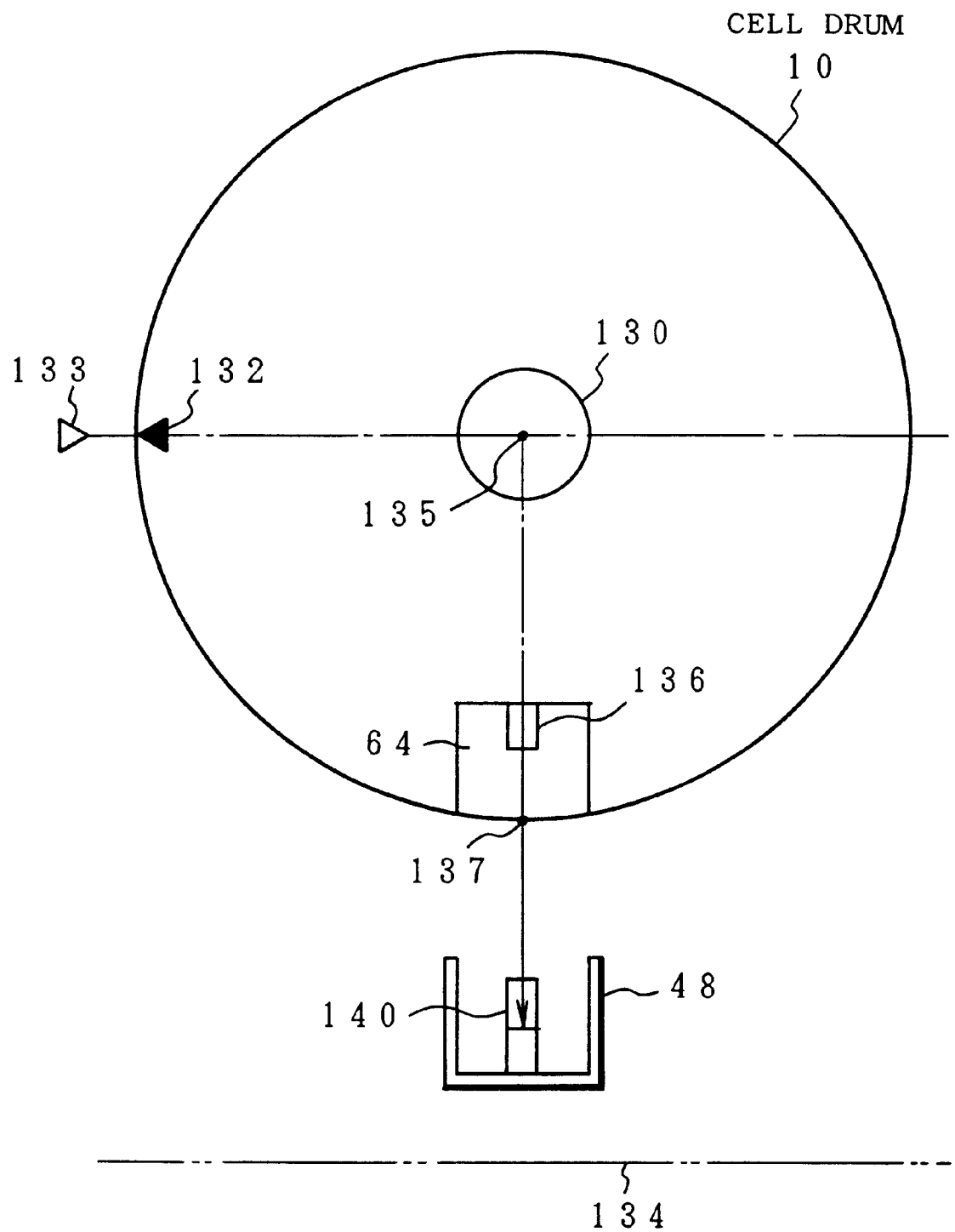
FIG. 25 is a diagram for illustrating how equipment used for performing a cell angle-of-rotation measuring operation according to the present invention is placed.
Figure 28:
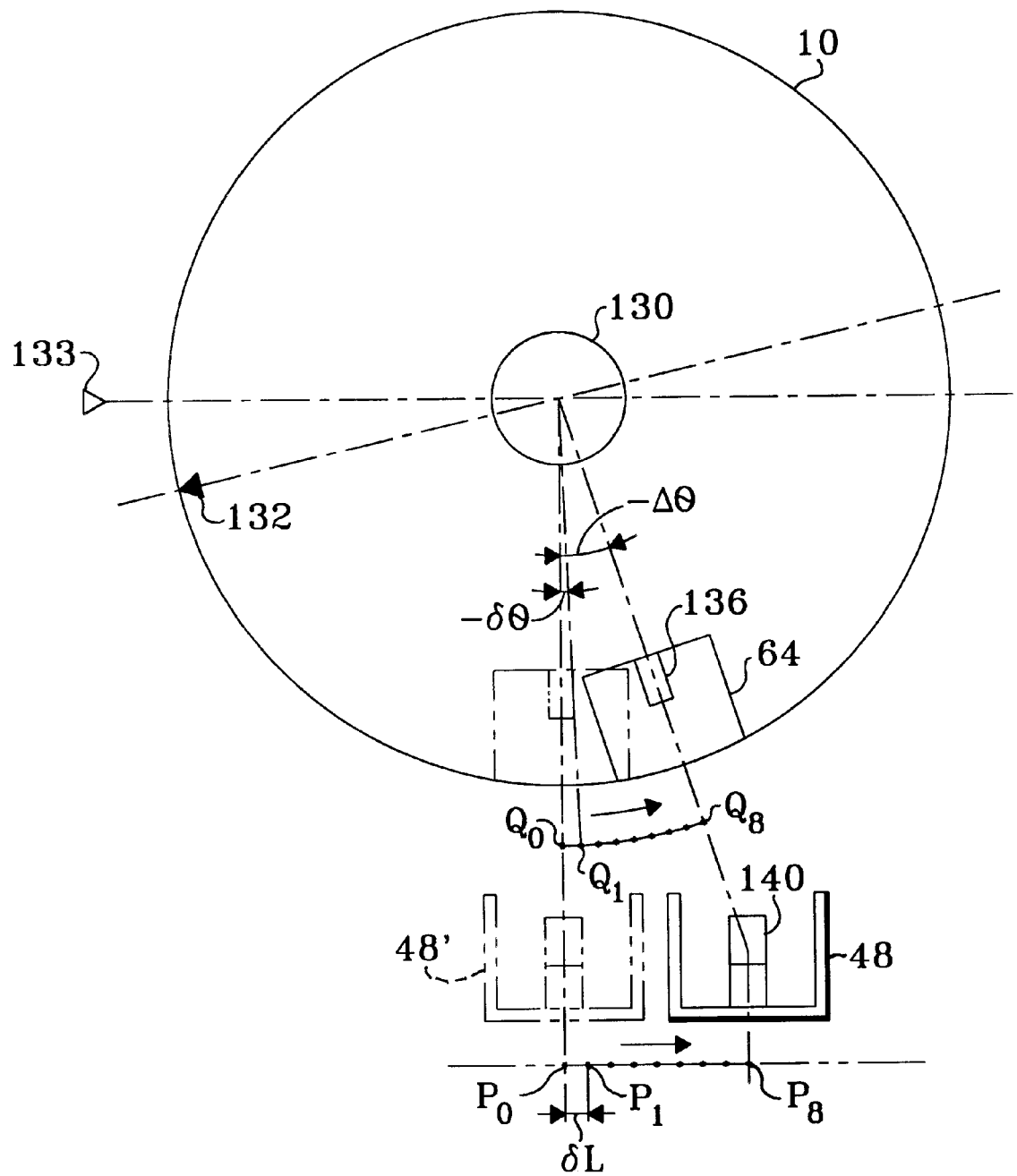
FIG. 28 is a diagram for illustrating a measuring operation by which the cell drum and the accessor are rightwardly driven.
Figure 29:
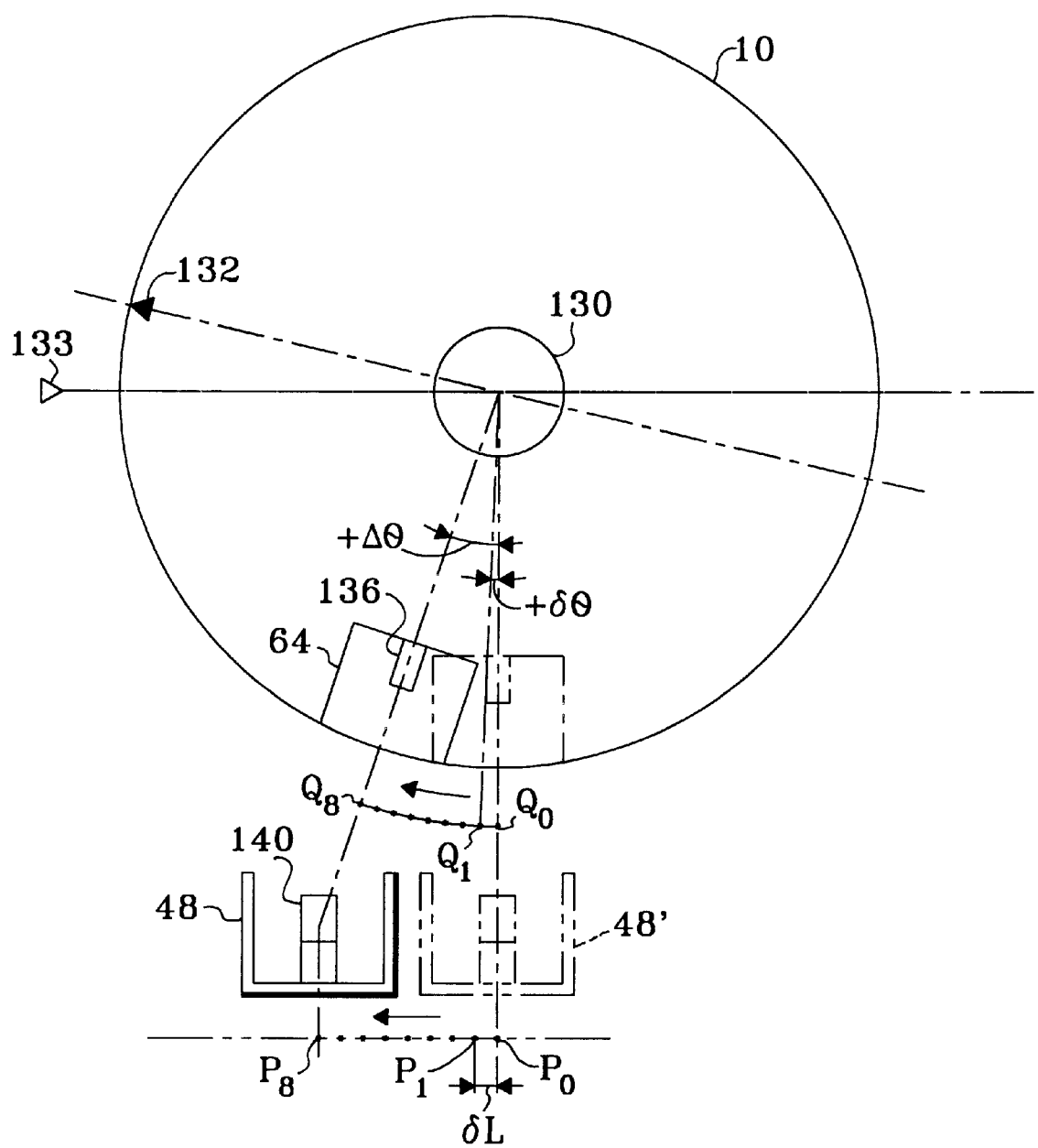
FIG. 29 is a diagram for illustrating a measuring operation by which the cell drum and the accessor are leftwardly driven.

FIG. 25 is a diagram for illustrating how the equipment used for performing a cell angle-of-rotation measuring operation according to the present invention is mounted in the apparatus. First, a light generation device 136 is placed in the cell 64 of the cell drum 10 to be measured, in such a manner that a central line drawn from the center 135 of rotation of the shaft 130 of rotation of the drum through the opening-side center 137 of the cell 64 becomes the optical axis of the light generation device 136. On the other hand, a photodetector 140 is placed in the robot hand 48 of the accessor. As shown in FIG. 26, the photodetector 140 contains a light receiving portion 144 in a cylindrical member 142 opened at an end thereof. As illustrated in FIG. 27, in the case of this photodetector 140, the angle of incidence of incident light 146 is measured in clockwise and counterclockwise directions with respect to the central axis of the cylindrical member 142. However, light, whose angle of inclination to this central axis is larger than that of incident light passing the edge of the opening of the cylindrical member 142, can not be incident on the light receiving portion 144. Thus, only incident light, the angle of incidence of which is within a range of a clockwise angle Δθ to a counterclockwise angle Δθ with respect to the central optical axis 146 can be detected. The angle of rotation of the cell drum is detected as illustrated in FIGS. 28 and 29 by utilizing the detection function of the photodetector 140, which can detect only incident light having such an angle of incidence.

First, as illustrated in FIG. 25, a reference position 132 on the cell drum 10 is adjusted to a fixed reference position 133. In this state, the cell 64 serving as an object to be measured is placed in front of the accessor and has an designed angle θ of rotation of 0. Thence, as illustrated in FIG. 28, the cell drum 10 is rotated counterclockwise by an infinitesimal angle δθ at a time from the rotational positioning state corresponding to the designed angle θ of rotation of 0 during light is emitted from the light generation device 136 provided in the cell 64. Namely, the cell drum is turned from an initial position $Q_0$ to a position $Q_1$ by the infinitesimal angle δθ. Further, the robot hand 48 of the accessor is moved by an infinitesimal distance δL at a time in synchronization with the rotation of this cell drum 10 by the infinitesimal angle δθ. First, the robot hand 48 of the accessor is moved from an initial position $P_0$ to another position $P_1$. When the cell drum is rotated by the infinitesimal angle δθ and the accessor is moved by the infinitesimal distance δL, it is checked whether or not an acceptance light output can be obtained by the photodetector 140 provide in the robot hand 48. If obtained, the infinitesimal rotation of the cell drum 10 and the infinitesimal movement of the accessor are performed again. Such a process is repeated until no acceptance light output is obtained by the photodetector 140. A detection signal is obtained from the photodetector 140 until the robot hand 48 is moved to a position P8 indicated in this figure. However, in the case where this robot hand is further moved by one step, the angle of incidence of light becomes larger than that of light ray 148-2 of FIG. 26B. Thus a detection output of the photodetector 140 is cut off or interrupted. Therefore, the angle rotation θ corresponding to the position $Q_8$, which is immediately prior to a position where the detection output of the photodetector 140 is interrupted, of the cell drum 10 is calculated by (N×δθ), namely, multiplying the number N of steps moved to the position $Q_8$ by the infinitesimal angle δθ of rotation. Next, as illustrated in FIG. 29, the accessors and the cell drum 10 are put back to the initial positions thereof shown in FIG. 25. Then, the accessor is moved leftwardly by the infinitesimal distance δL at a time in synchronization with the rotation of this cell drum 10 by the infinitesimal angle δθ. Similarly, when the acceptance light output of the photodetector 140 is obtained, the angle rotation e corresponding to the position $Q_8$, which is prior to a position where the acceptance light output of the photodetector 140 is obtained, of the cell drum 10 is calculated by $$\Delta\theta = (N \times \delta\theta).$$

Here, let the sign of the counterclockwise angle of rotation of the cell drum 10 be negative, but let the sign of the clockwise angle of rotation thereof be positive. Thus, the angle of rotation obtained by the measurement of FIG. 28 is $-\Delta\theta$. Conversely, the angle of rotation obtained by the measurement of FIG. 29 is $+\Delta\theta$.

Figure 30:
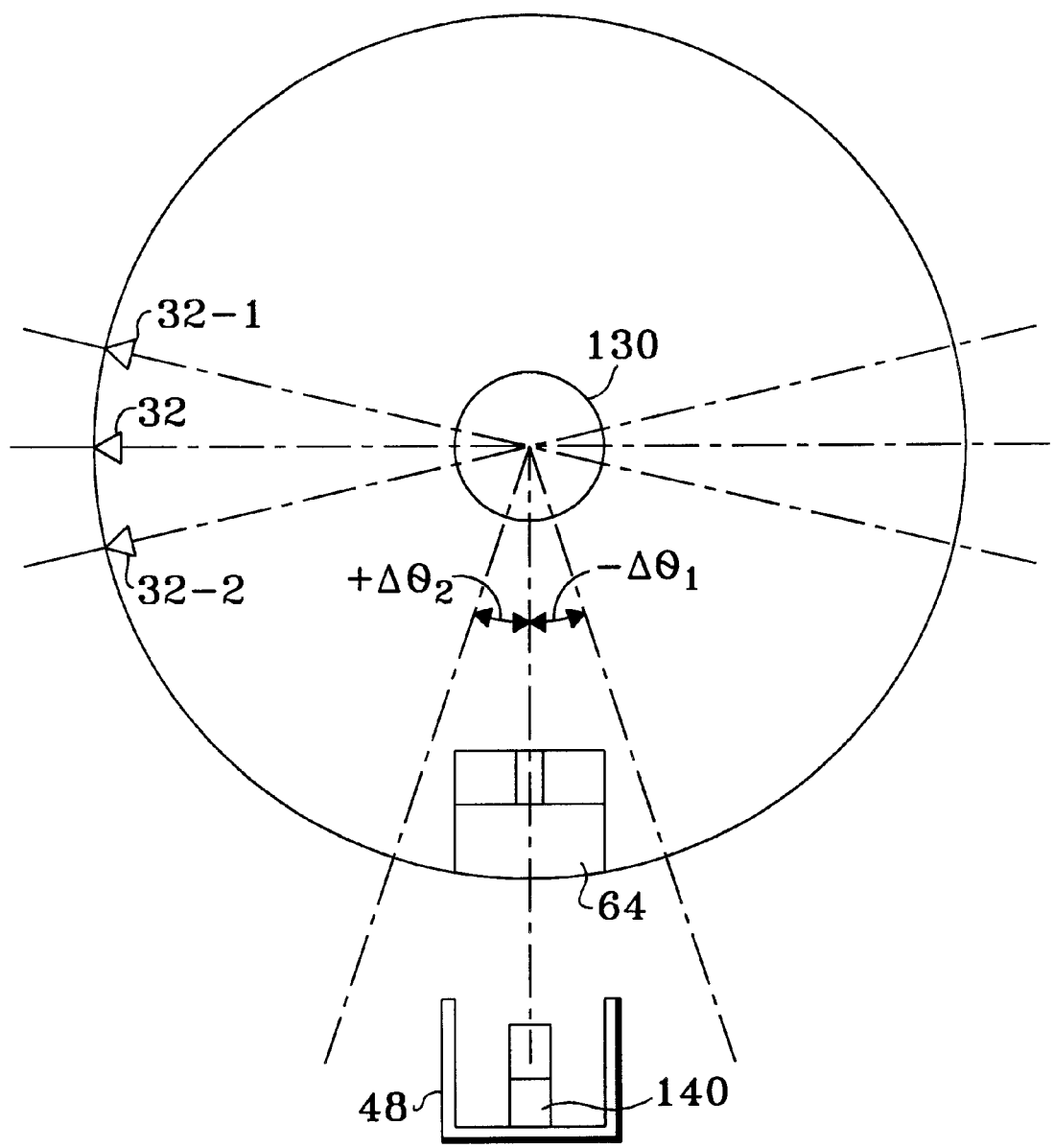
FIG. 30 is a diagram for illustrating angles measured in the operations of FIGS. 28 and 29.

FIG. 30 is a diagram for illustrating a result of the measurement in relation to the initial position of FIG. 25. An angle of rotation corresponding to the centering position, at which the cell 64 is located in front of the robot hand 48 of the accessor, is half the sum of absolute values of the measured clockwise and counterclockwise angles. Moreover, this angle of rotation is corrected by using the designed angle e of rotation corresponding to the reference position 132 on the cell drum 10 with respect to the fixed reference position 133 as follows:

$$\theta = \theta + (\Delta\theta_2 - \Delta\theta_1)/2.$$

Thus, the corrected angle θ, which is calculated from the result of the measurement, is employed as the angle θ of rotation to be stored in the cell address translation table 82 of the accessor controller 30.

Figure 31:
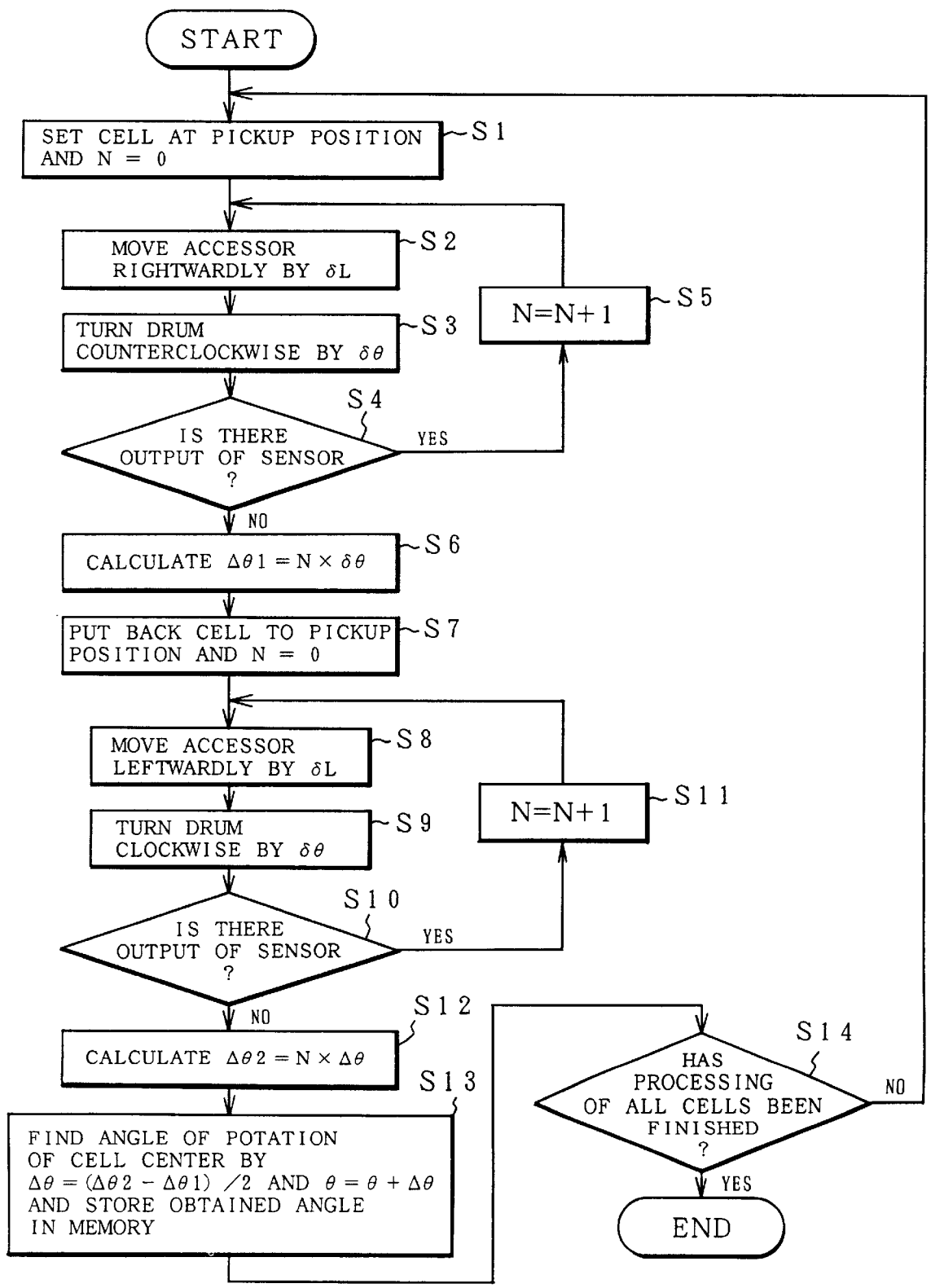
FIG. 31 is a flowchart for illustrating the cell angle-of-rotation measuring operation of the present invention.

FIG. 31 is a flowchart for illustrating the cell angle-of-rotation measuring operation of the present invention. First, in step S3101, a given cell is set at the picking-up position of the accessor. Moreover, the counter N is reset to 0. Then, in step S3102, the accessor is leftwardly moved by the infinitesimal distance δL. Subsequently, in step S3103, the cell drum is rotated counterclockwise by the infinitesimal angle δθ. Thereby, if it is found in step S3104 that there is an output of the photodetector, the counter N is incremented by 1 in step S3105. Then, the operations of step S3102 and S3103 are repeated. If the output of the photodetector is interrupted in step S3104, the value indicated by the counter N, namely, the number of steps prior to a position, at which the output of the photodetector is interrupted, by one step is multiplied by the infinitesimal angle δθ. Consequently, $\Delta\theta_1$ is calculated. Subsequently, in step 3107, the cell is put back to the picking-up position. Moreover, the counter N is reset to 0. Then, in steps S3108 to S3112, the measurement is performed by conducting the leftward movement of the accessor and the clockwise rotation of the cell drum. In step S3112, similarly, the measured angle $\Delta\theta_2$ is calculated. Subsequently, in step S3113, the angle θ of rotation corresponding to the centering state, in which the cell is placed in front of the accessor, is obtained and stored in the cell drum translation table 82. Subsequently, it is checked in step S3114 whether or not the processing of all of the cells has been finished. If not, the process consisting of steps S3101 to S3113 is repeatedly performed on all of the cells.

Cell Address Translation Table

In the cell address translation table 82 of FIG. 8, positional data and angular data are stored by performing the measurement before an operation of the library apparatus is started. Namely, regarding the cell drum, the angle θ of rotation thereof and two-dimensional coordinates X and Y representing the movement range of the accessor are measured correspondingly to each cell address. Further, regarding the cell addresses other than those of the cells on the drum cell, the coordinates X and Y are measured. This cell address translation table 82 is prepared in the ROM 76 of the accessor controller 30 of FIG. 7. The measured data are stored in this cell address translation table 82. Simultaneously, original data corresponding to the data stored in the cell address translation table 82 are stored in a floppy disk for an backup operation by using the floppy disk unit 104. When performing a power-on starting, the data contained in the table, which is stored in the ROM 76, are compared with the original data contained in the table, which is stored in the floppy disk, correspondingly to each cell address when the cell address translation table 82 is loaded into the DRAM 78. This is because the cell address translation table 82 has a very important mapping function for performing operations of the apparatus. Further, only in the case where the former data is matched with the latter data, the values, which are contained in the table stored in the ROM, are loaded into the cell address translation table 82 and then are utilized. If not matched correspondingly to a certain cell address, the values contained in the table are regarded as being abnormal. For example, the operation of measuring the angle of rotation of the cell drum and that of measuring the coordinates X and Y by positioning the accessor onto the cell drum are performed again. Thereafter, normal data to be contained in the table are loaded into the cell address translation table 82. However, if such measuring operations are performed by actually driving the accessor and the cell drum each time a mismatch occurs between the values, which are contained in the table stored in the ROM, and the values which are contained in the table stored in the floppy disk, it takes too long to start up the apparatus. From the beginning, the values contained in the table to be stored in the floppy are correct values measured at a regulation stage before starting up the apparatus. Therefore, it should be unnecessary to perform the measuring operations again.

Thus, in the case of the apparatus of the present invention, a mismatch message, which indicates that there is a mismatch between the value contained in the table stored in the ROM and the value contained in the table stored in the floppy is displayed on the screen of the display unit 98 provided on the CE panel 96, which is connected to the accessor controller 30 of FIG. 7 as an external device. Moreover, the values contained in the table stored in the floppy disk can be selected by operating the FD selection switch 100. Thus, effective values to be contained in the table can be loaded into the cell address translation table 82 stored in the DRAM 78 without actually driving the cell drum and the accessor so as to perform a measurement, by selecting the values contained in the table stored in the floppy disk, which are original data, even if there is a mismatch between the value contained in the table stored in the ROM and the value contained in the table stored in the floppy.

Figure 32:
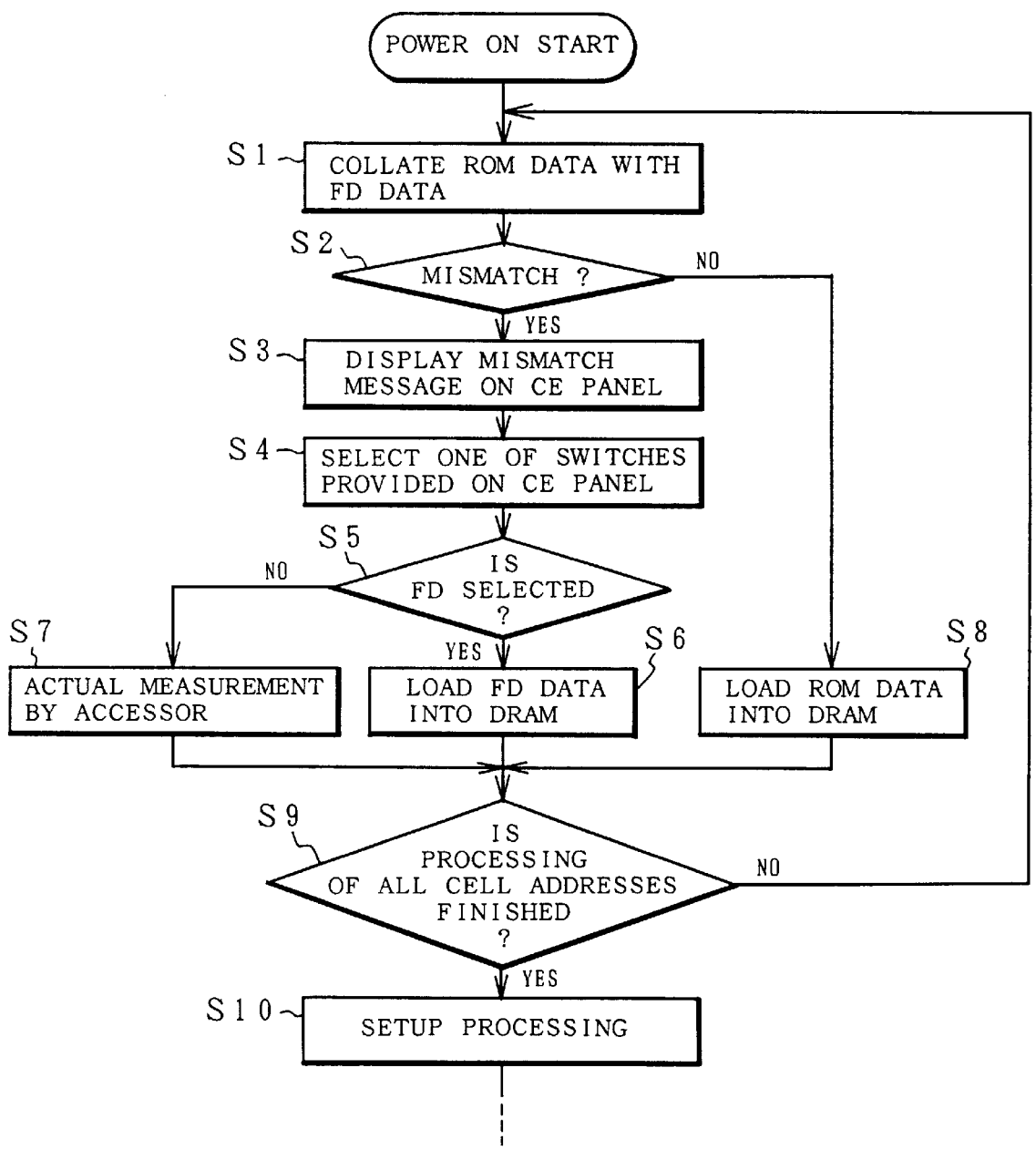
FIG. 32 is a flowchart for illustrating an operation to be performed according to the present invention in the case where there is a mismatch between table data stored in ROM and table data stored in a floppy disk when performing a power-on starting.

FIG. 32 is a flowchart for illustrating an operation of loading the cell address translation table 82 in the case where there is a mismatch between table data stored in ROM and table data stored in a floppy disk as the result of making a comparison therebetween when performing a power-on starting. The accessor controller reads the cell address translation table from the floppy disk when performing the power-on starting. Then, the accessor controller compares the values, which are contained in the table stored in the ROM 76, with the values contained in the predetermined cell address translation table in sequence. If it is not detected in step S3202 that there is a mismatch therebetween, the values contained in the table stored in the ROM are loaded into the RAM in step S3208 and are thereafter used. If not matched, a mismatch message is displayed on the CE panel 96 in step S3203. IF an operator operates the FD selection switch 100, this program advances from step S3205 to step S3206 whereupon the values contained in the table stored in the floppy disk are loaded into the DRAM. Furthermore, in the cases of some cell addresses, the values to be contained in the table should be obtained by actually measuring such values. Therefore, if the accessor is instructed from the CE panel 96 to perform such an actual measurement, this program advances to step S3207 whereupon the accessor is caused to actually perform such a measurement. The aforementioned processing is repeatedly performed until it is detected in step S3209 that the processing of all of the cell addresses is finished. If detected in step S3209, a setting-up operation is started.

2-Motor Accessor

Figure 33:
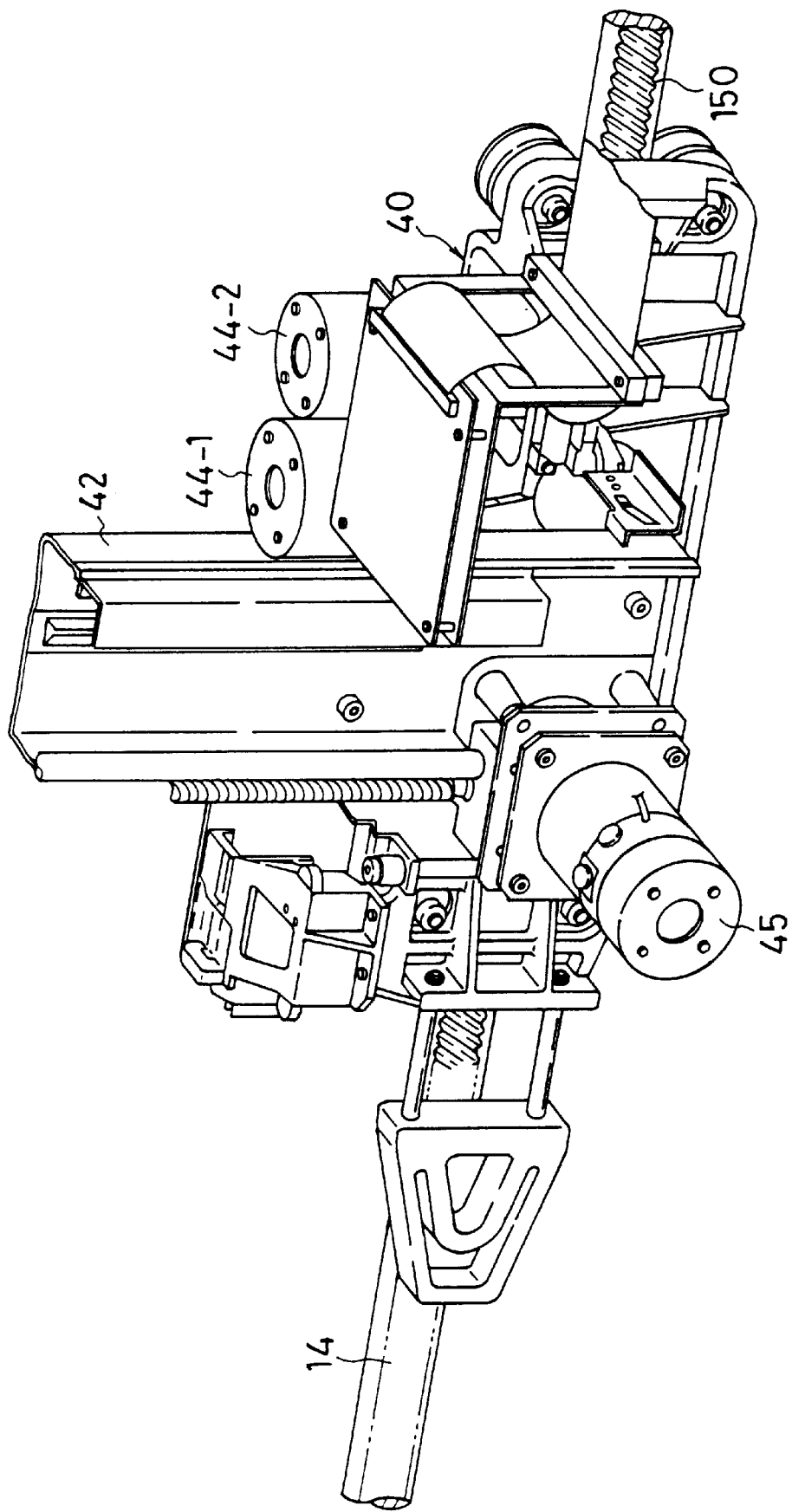
FIG. 33 is an external view of an accessor running portion on which two motors are mounted.

FIG. 33 is an external view of another example of the accessor running portion used in the library apparatus of the present invention. This accessor running portion is characterized by comprising two motors. The running portion 40 of the accessor is provided with two motors 44-1 and 44-2 for running. The running portion 40 is moved by rollers, between which the rail 14 is provided. Further, a rack gear 150 is formed on the side surface of the rail 14. A pinion gear provided on the shafts of rotation of the motors 44-1 and 44-2 is meshed with this rack gear 10. Thereby, the running portion 40 is made to run on the rail. 14.

Figure 34:
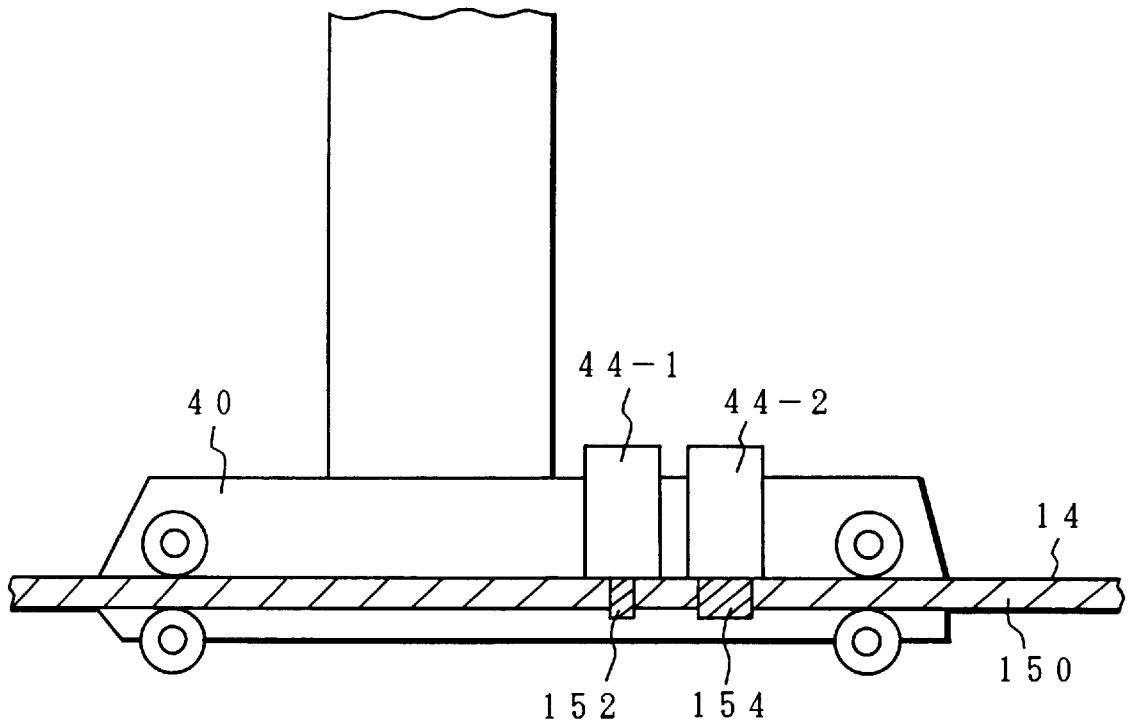
FIG. 34 is a diagram for illustrating the configuration of a mechanism of the accessor running portion on which the two motors are mounted.

FIG. 34 illustrates a state in which gears of the motors 44-1 and 44-2 provided in the running portion 44 meshes with the gear of the rail 14. Further, a pinion gear 152 having a small number of teeth is mounted on the shaft of rotation of the motor 44-1. In contrast, a pinion gear 154 having a large number of teeth is mounted on the shaft of rotation of the motor 44-2. Furthermore, motors having the same performance are used as the motors 44-1 and 44-2. Thus, the rotating speed of the motor 44-1 is equal to the rotating speed of the motor 44-2. The running distance corresponding to a turn of the motor 44-1 depends on the number Z1 of teeth of the pinion gear 152. Further, the running distance corresponding to a turn of the motor 44-2 depends on the number Z2 of teeth of the pinion gear 154. In this case, the number Z1 of teeth is smaller than the number Z2 of teeth. Thus, the running distance corresponding to a turn of the motor 44-1 is relatively short. Conversely, the running distance corresponding to a turn of the motor 44-2 is relatively long. Regarding the running speed, when the motors 44-1 and 44-2 are rotated at a same speed or rate, the running speed corresponding to the motor 44-1 is relatively low. In contrast, the running speed corresponding to the motor 44-2 is relatively high. Further, regarding the generated torque, the torque of the motor 44-1 having a smaller number of teeth is larger than that of the motor 442 having a larger number of teeth. Namely, the motor 44-1 is a low-speed high-torque motor. In contrast, the motor 44-2 is a high-speed low-torque motor. Incidentally, helical gears are employed as the rack gear 150 and the pinion gears 152 and 154 with the intention of eliminating an error due to backlash.

Figure 35:
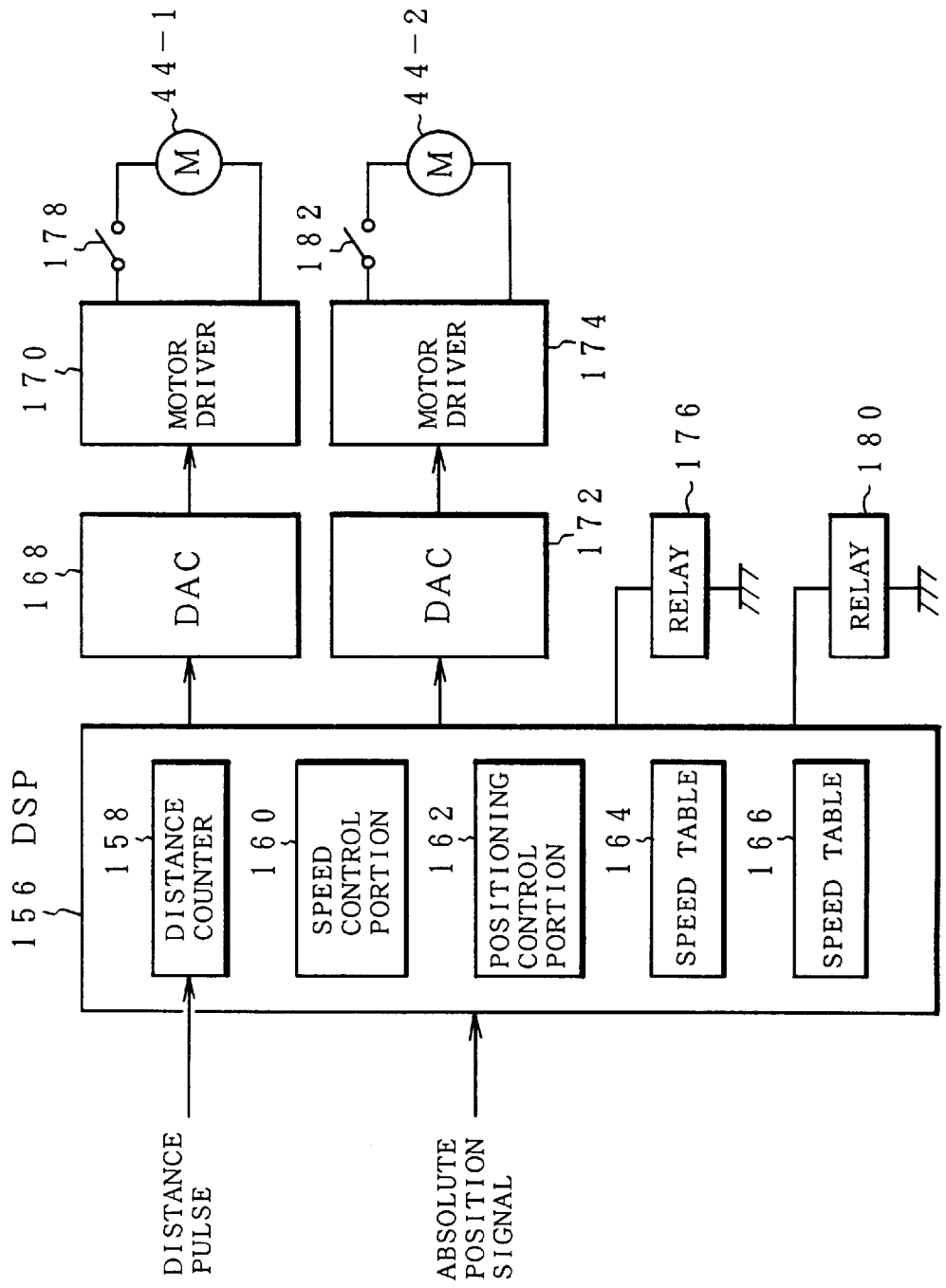
FIG. 35 is a diagram for illustrating a running drive operation performed by using the two motors of FIG. 34.

FIG. 35 illustrates a motor control circuit of each of the machine controllers 32-1 and 32-2 of FIG. 6 in the case where the two motors 44-1 and 44-2 are provided in the accessor running portion. Further, various control functions are realized under program control of a digital signal processor (DSP) 156. Moreover, a distance counter 158 for counting distance pulses sent from a rotary encoder, which are obtained when the accessor runs on the rail, is provided in the DSP 156. The distance counter 158 is preset to a predetermined initial value in response to an absolute position signal issued when the accessor passes a predetermined absolute position on the rail. Thereby, an accumulated error in the distance counter 158 is eliminated. Furthermore, a speed control portion 160, a positioning control portion 162 are provided in the DSP 156. Additionally, speed tables 164 and 166 are also provided therein correspondingly to the motors 44-1 and 44-2, respectively. Further, target speed information, acceleration information and deceleration information needed for the speed control and the positioning control of the motors are stored in each of the speed tables 164 and 166. Moreover, motor control data produced in the DSP 156 are converted into analog control voltages by a digital-to-analog (DA) converter 168 and 172. Then, the analog control voltages are supplied to motor drivers 170 and 174 to drive the motors 44-1 and 44-2, respectively. In the case of the apparatus of the present invention, when performing the speed control operation, one of the motors 44-1 and 44-2 is driven. The DSP 156 controls relays 176 and 180 so as to select one of the motors 44-1 and 44-2, which should be driven. A relay contact 178 of a relay 176 is connected in series to the circuit of the motor 44-1. Further, a relay contact 182 of a relay 180 is connected in series to the circuit of the motor 44-2. Therefore, the on-off control of the relays 176 and 180 is performed to thereby drive one of the motors 44-1 and 44-2 selectively.

Figure 36:
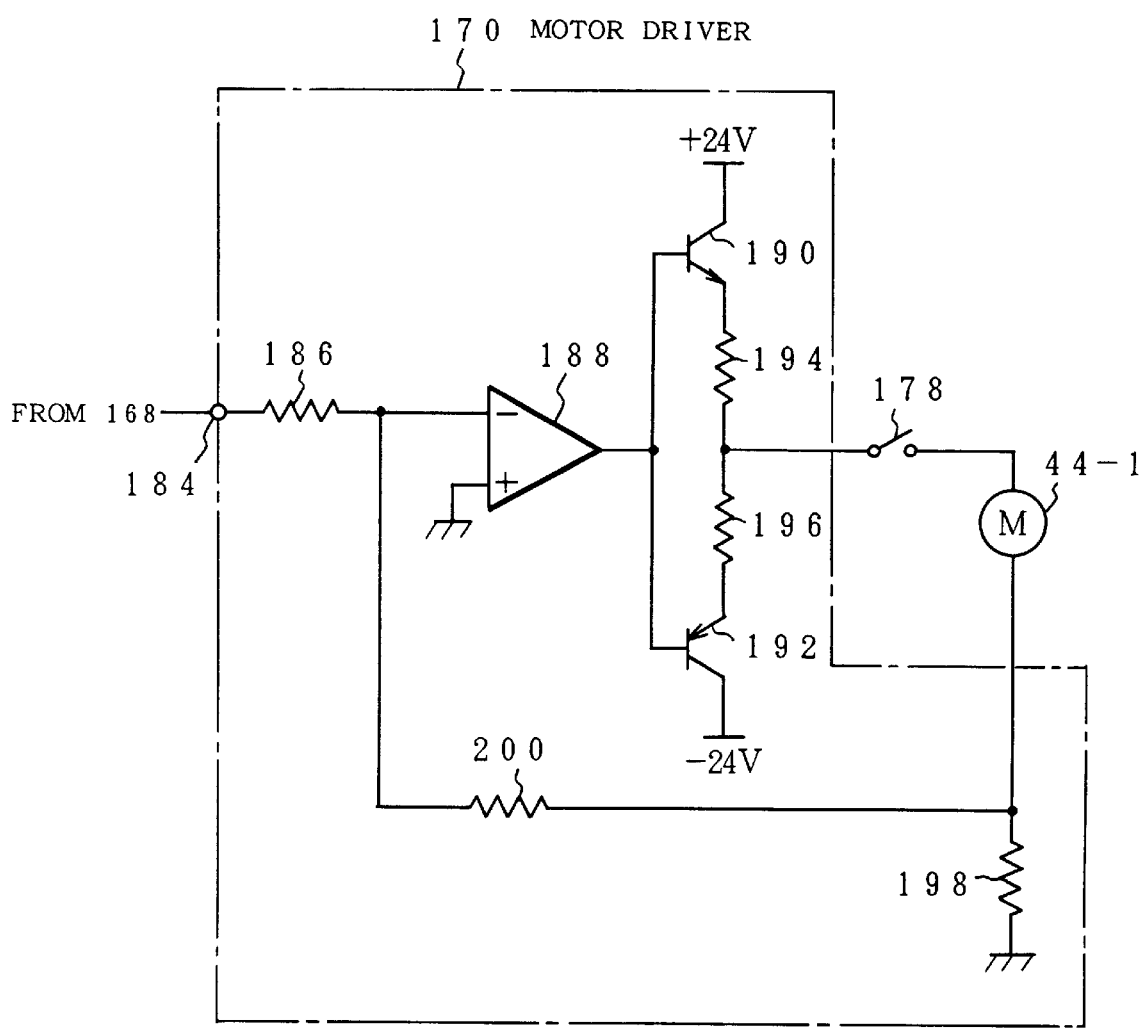
FIG. 36 is a block diagram for illustrating the configuration of a motor control portion mounted in a machine controller.

FIG. 36 illustrates the configuration of the motor driver 170 of FIG. 35. A control voltage is provided to an input terminal 184 from the DA converter 168 and is inputted to an operational amplifier 188 through a resistor 186. An output of the operational amplifier 188 is connected in common to the bases of transistors 190 and 192 connected in series to a power supply having a voltage of +24 volts and another power supply having a voltage of −24 volts, respectively. Further, the emitter of the transistor 190 is connected to the collector of the transistor 192 through resistors 194 and 196. Moreover, a signal line is connected from the connection between the resistors 194 and 196 to the motor 44-1 through the relay contact 178. The other terminal of the motor 44-1 is grounded through a current detecting resistor 198. A detection voltage supplied from the current detecting resistor 198 is fed back to an input terminal of the operational amplifier 188 through a resistor 200. A control voltage is inputted from the DA converter 168 to the input terminal 184 ranges from a negative voltage to a positive voltage. When the control voltage is negative, this voltage is inverted by the operational amplifier 188 to a positive voltage. Thereby, the transistor 190 is turned on. Further, a drive current flows through a path consisting of the power supply having a voltage of +24 volts, the transistor 190, the resistor 194, the relay contact 178, the motor 44-1 and the current detecting resistor 198. Thus the motor 44-1 rotates, for example, normally. In contrast, when a positive voltage is inputted to the input terminal, this positive voltage is inverted by the operational amplifier 188 to a negative control voltage. Thereby, the transistor 192 is turned on. Then, a reverse drive current is fed to the motor 44-1 through a path consisting of the current detecting resistor 198, the motor 44-1, the relay contact 178, the resistor 196, the transistor 92 and the power supply having a voltage of −24 volts. Thus the motor 44-1 is reversed.

Figure 37A:
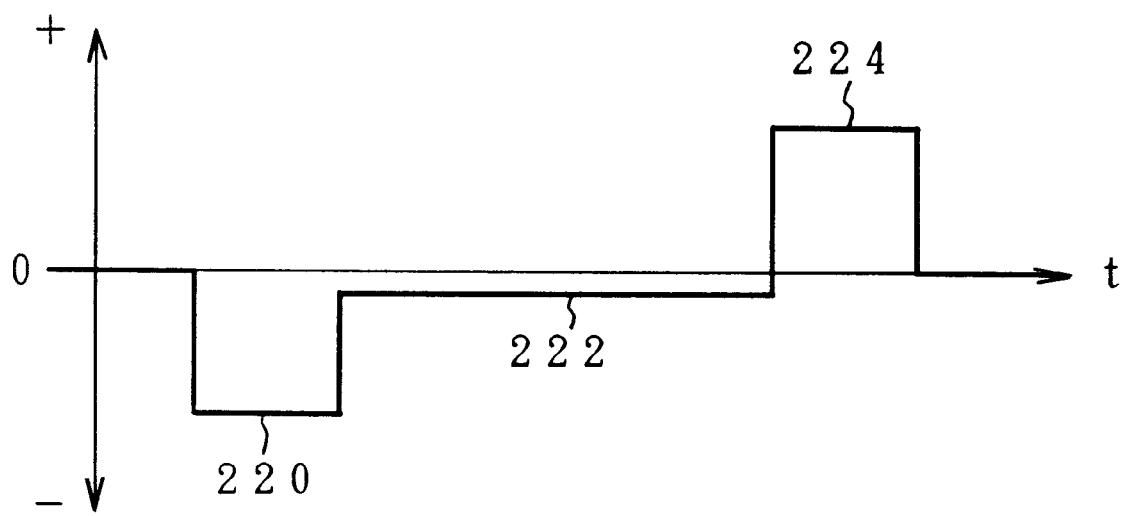
FIGS. 37A and 37B are circuit diagrams of a motor driver of FIG. 36.

FIG. 37A illustrates the waveform of a control voltage signal when the speed control is performed by rotating the motor 44-1 normally. FIG. 38A illustrates the waveform of a control voltage signal when the speed control is performed by rotating the motor 44-1 reversely. In the case of FIG.

37A, an acceleration voltage 220, which becomes a negative constant voltage, is first applied to the motor. Then, upon completion of the acceleration, a target voltage 222 is applied thereto for providing a constant target speed thereto. Finally, a positive deceleration voltage 224 is applied thereto. Further, regarding a reverse speed control of FIG. 37B, a positive constant acceleration voltage 226 is first applied to the motor. Then, upon completion of the acceleration, a target voltage 228 is applied thereto for providing a constant target speed thereto. Finally, a negative deceleration voltage 230 is applied thereto.

Figure 37B:
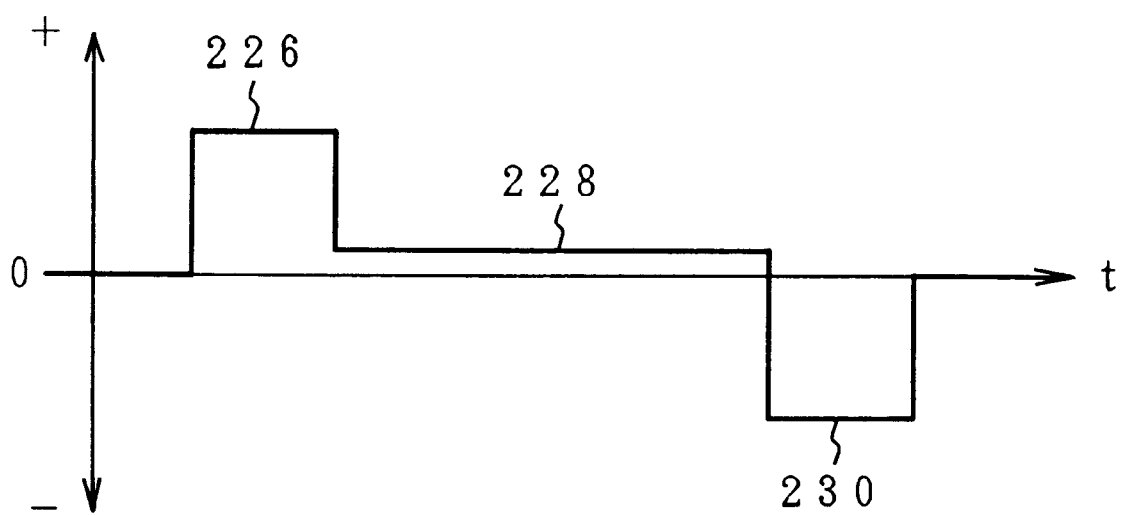

Incidentally, FIGS. 37A and 37B illustrate the waveforms of speed voltage signals in the case of performing a general speed control operation.

Figure 38:
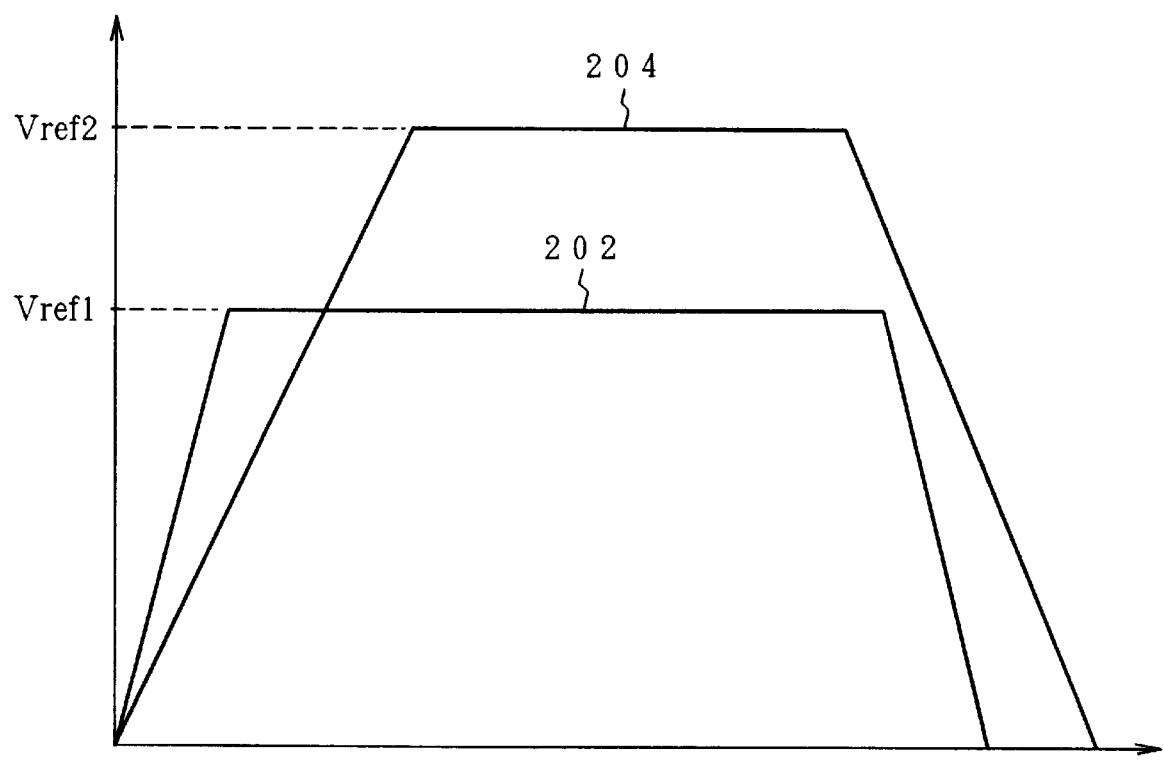
FIG. 38 is a diagram for illustrating a speed control pattern in the case of singly controlling each of the motors of FIG. 34.

FIG. 38 is a velocity diagram in the case where the speed control of one of the motors 44-1 and 44-2 is performed singly. A line graph 202 represents change in speed of the low-speed high-torque motor 44-1. In this case, the generated torque is large, so that both of the acceleration at the time of starting the running and the deceleration immediately before stopping the running are large. The target speed Vref1, however, is relatively low owing to a small number of teeth of the gear. A line graph 204 represents change in speed of the high-speed low-torque motor 44-2. In this case, the generated torque is small, so that the acceleration at the time of starting up the apparatus and the deceleration immediately before stopping are small, namely, the inclination of the graph is smaller in comparison with that of the graph 202 of the motor 44-1. In contrast, the target speed Vref2, however, is relatively high owing to a large number of teeth of the gear. In the case of the apparatus of the present invention, the line graphs 202 and 204 of the speeds of the motors 44-1 and 442 of FIG. 38 are effectively utilized. Thus, the speed control as illustrated in FIG. 39 is performed.

As illustrated in this figure, the low-speed high-torque motor 441 is selected at a point A when starting up the apparatus. Further, the running speed is increased quickly by performing an acceleration correction 206 at the acceleration represented by the line graph 202 of the speed of FIG. 38. Subsequently, when the running speed reaches the target speed Vref1 of the motor 44-1, the selected motor is switched to the high-speed low-torque motor 44-2. The speed is increased up to a point C when the running speed reaches the target speed Vref2 by utilizing the acceleration characteristics 208 of the line graph 204 of the speed of the motor 44-2 of FIG. 38. When reaching the point C, a constant-speed control is performed at the speed Vref2, so that the constant speed characteristics 210 are obtained. Then, the low-speed high-torque motor 44-1 is selected at a point D when the accessor reaches a predetermined deceleration starting point with respect to the target position. Thus the deceleration is performed at a large deceleration represented by the line graph 202 of the motor 44-1 of FIG. 38 according to the deceleration characteristics 212. As the result of selectively driving the low-speed high-torque motor 44-1 and the high-speed low-torque motor 44-2 as illustrated in FIG. 39 so as to make the most of the advantages of these motors, the movement of the accessor can be finished in a time shorter than a moving time taken by the accessor to move a same distance in the case of using each of the motors 44-1 and 44-2 simply as illustrated in FIG. 38.

Figure 39:
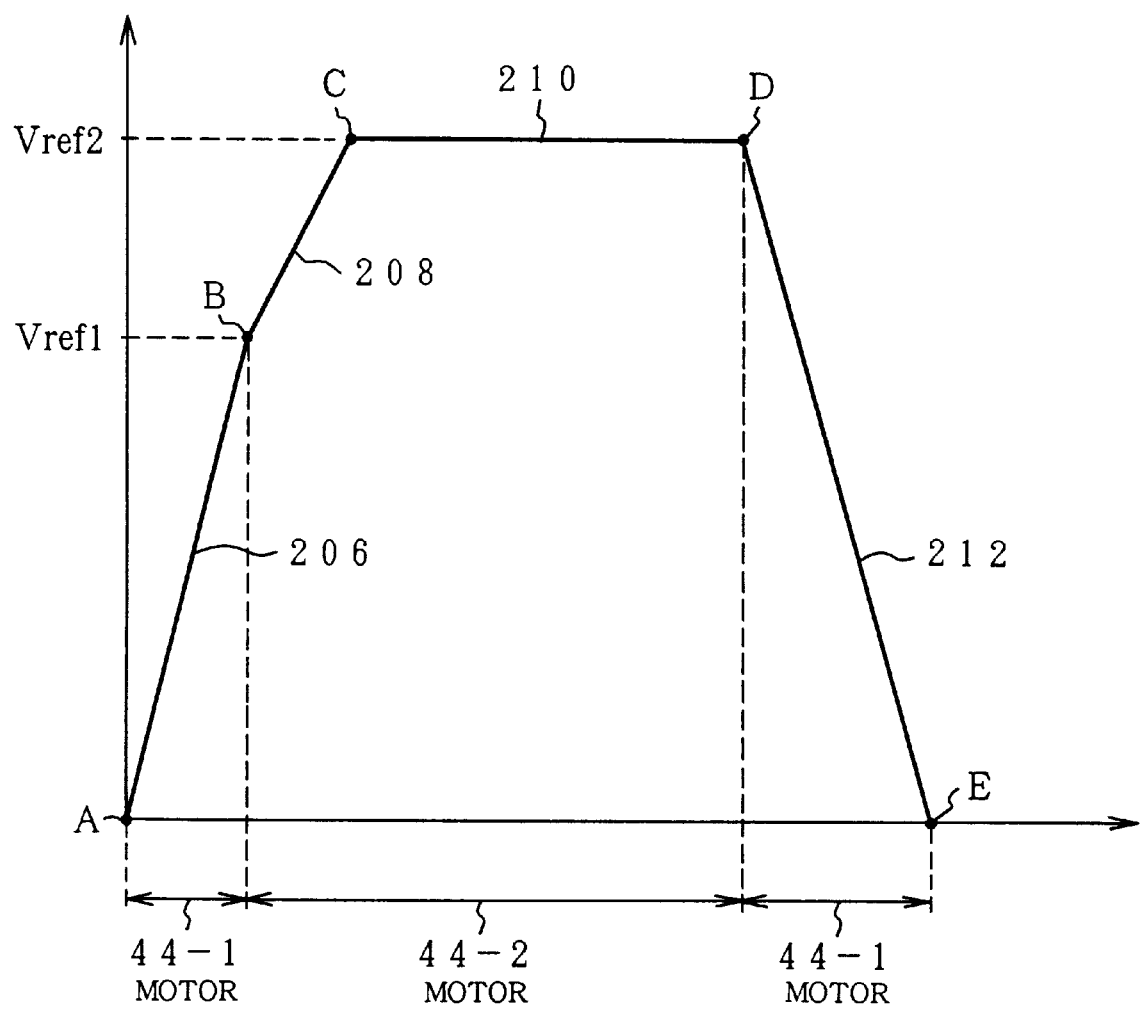
FIG. 39 is a diagram for illustrating an optimal speed (control) pattern of the present invention in the case where the two motors are selected.
Figure 40A:
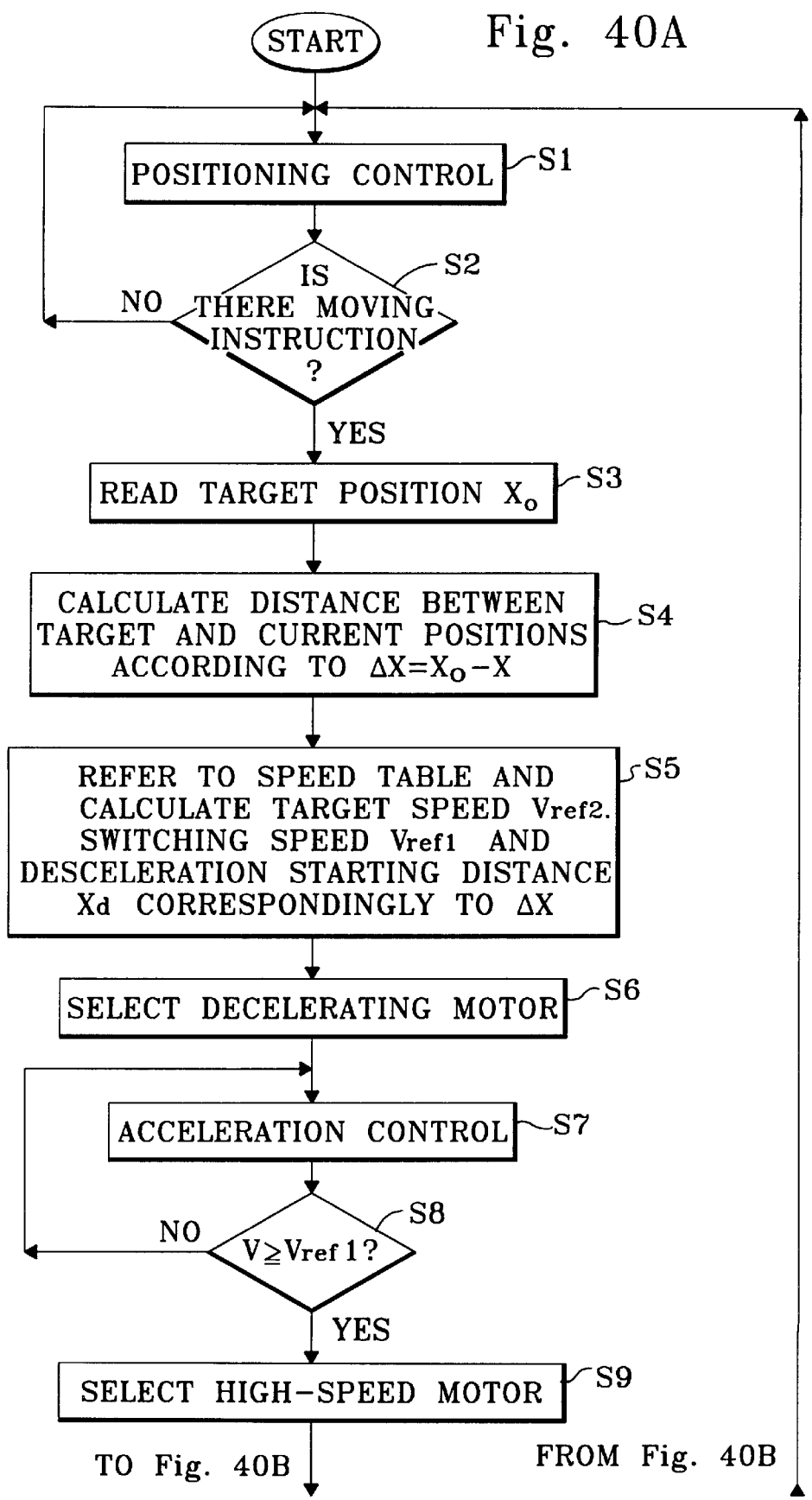
FIGS. 40A and 40B are a flowchart for illustrating an operation of controlling the speed of the accessor as shown in FIG. 39.
Figure 40B:
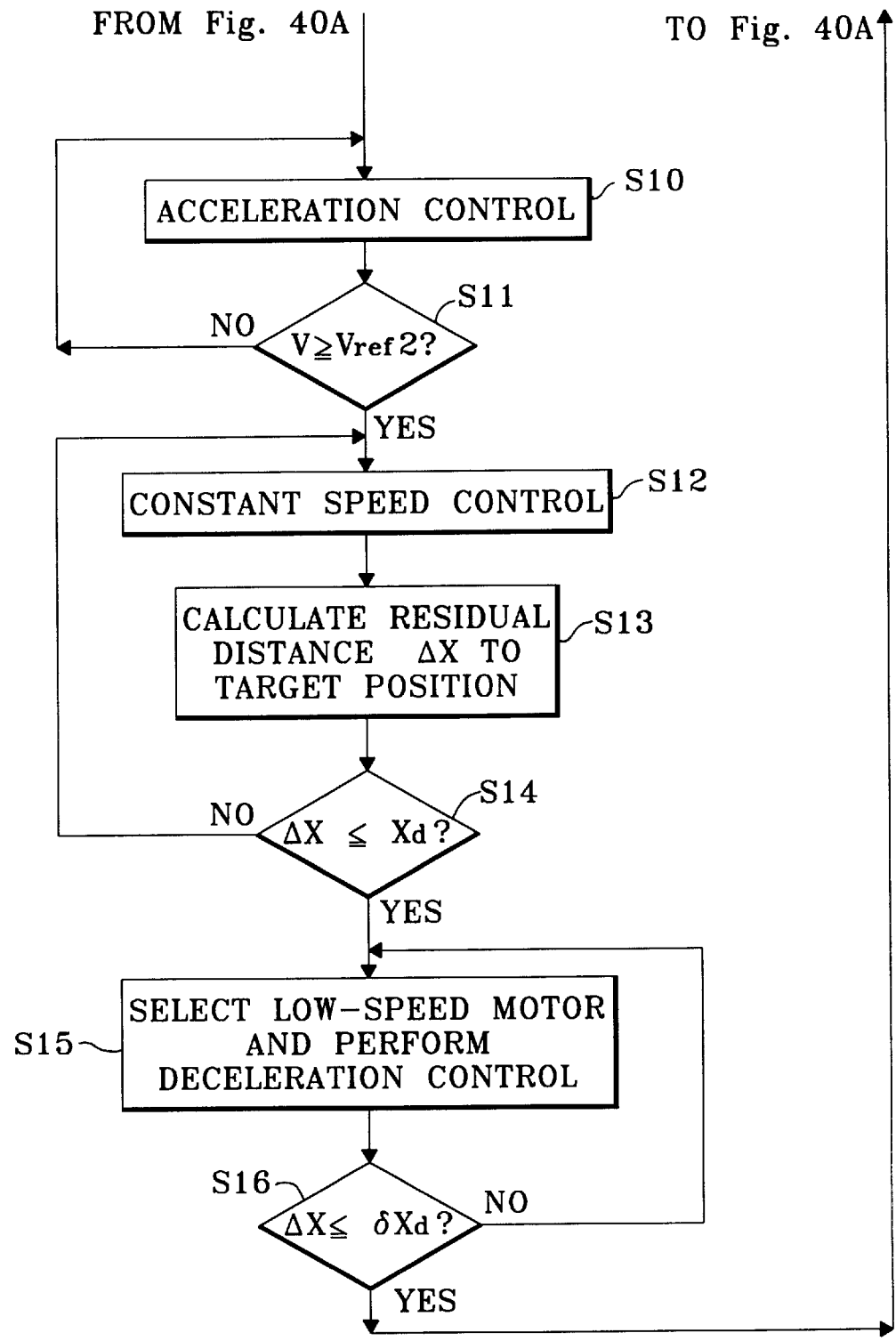

FIGS. 40A and 40B are a flowchart for illustrating an operation of controlling the running of the accessor by selectively switching the motors 44-1 and 44-2 as shown in FIG. 39. First, when the apparatus is in a state in which the accessor is halted, the positioning thereof onto a set position in step S401. If the host accessor controller 30 instructs the machine controller 32 in this state by designating the coordinates $X_0$ and $Y_0$ according to the cell address, the target position $X_0$ is read in step S403. Then, in step S404, the distance $\Delta\theta$ between a current position and the target position is calculated as $(X_0-X)$. Subsequently, in step S405, the target speed Vref2, the switching speed Vref1 and the deceleration starting distance Xd are calculated by referring to the speed table. Hereupon, the target speeds Vref1 and Vref2 of the motors 44-1 and 44-2 are determined according to the movement distance $\Delta X$ to the target position. Namely, in the case where the movement distance $\Delta X$ exceeds a distance corresponding to a maximum target speed attaining time based on the acceleration/deceleration characteristics of the motors, the prescribed maximum target speed is set as the target speeds Vref1 and Vref2. In contrast, in the case where the movement distance $\Delta X$ is shorter than the distance corresponding to the maximum target speed attaining time, the target speeds Vref1 and Vref2 are set as changing, for example, in proportion to the movement distance. Further, a distance calculated from characteristics of deceleration from the target moving speed set according to the movement distance $\Delta\theta$ is used as the deceleration starting distance. These parameters are usually prepared as data to be contained in the table and are uniquely obtained by being retrieved therefrom by using the distance $\Delta X$ as a key. Next, in step S406, the low-speed high-torque motor 44-1 is selected. Then, the acceleration control operation is performed in step S407. Subsequently, it is checked in step S408 whether or not the running speed reaches a speed Vc (=Vref2) for switching the motor. If reaches the switching speed Vref2, the high-speed low-torque motor 44-2 is selected in step S409. Then, an acceleration control operation is performed in step S410. Subsequently, if reaching the target speed Vref2 in step S411, a constant speed control operation is started in step S412. During the constant speed control operation, a residual distance $\Delta X$ up to the target position is calculated in step S413. Further, it is checked in step S414 whether or not the accessor reaches the position corresponding to the deceleration starting distance Xd. If reaches the position corresponding to the deceleration starting distance Xd, the low-speed motor 44-1 is selected and a deceleration control operation is performed in step S415. During the deceleration, it is checked in step S416 whether or not the residual distance $\Delta X$ up to the target position is within an allowable range $\delta Xd$ for the positioning control operation. If the residual distance AX is within the allowable range $\delta Xd$, an operation to be performed is changed into the positioning control operation of step S401 and further, the accessor is positioned at the target position.

Further, when controlling the running operation of the accessor using the two motors 44-1 and 44-2, in the case where a failure occurs in one of the motors during the running operation, the operation of controlling the running of the accessor by selectively changing the motors as illustrated in FIGS. 40A and 40B is switched to the operation of controlling the running thereof by using the normal one of the motors singly. Thus, even in the case of an occurrence of a failure in one of the motors, the running of the accessor can be controlled by using the remaining normal one of the motors. Thereby, the running performance is not degraded so much. Thus, countermeasures can be taken against the failure without stopping the operation of the apparatus. Further, necessary steps such as the repair and replacement of parts may be taken during a time period in which the operation of the apparatus can be stopped, for example, during the night. Moreover, in the aforementioned embodiment, motors having the same performance are used as the motors 44-1 and 44-2. Furthermore, these motors are respectively used as a high-speed motor and a low-speed motor, by changing the numbers of teeth of the pinion gears respectively attached thereto. Instead, motors, which are different in the rotating speed corresponding to an equal amount of drive current from each other, may be used. In this case, these motors are thus different in performance from each other, so that pinion gears of the same number of teeth are used for these motors. Furthermore, in the aforementioned embodiment, as the accessor runs, the unchosen motor is driven by the rail to rotate as a dynamo. Therefore, driving-power loss caused by rotating the unchosen motor as a dynamo may be eliminated by attaching an electromagnetic clutch to the motors and then activating the electromagnetic clutch attached to the unchosen motor to thereby detach the pinion gear from the unchosen motor. Additionally, in order to enhance the ability to brake, a regenerative braking circuit may be formed in such a manner that a regenerative brake is applied to the unchosen motor, which is driven as a dynamo, simultaneously with the deceleration control operation by means of the other motor.

As described above, the library apparatus of the present invention has the following effects and advantages.

First, the number of media per unit area can be considerably increased by placing the cell drums instead of the cell blocks. Moreover, the movement or travel distance of the accessor does not increase.

Further, in the case of the aforementioned embodiment, a recording/reproducing unit is placed in the central part thereof. Moreover, the cell drums are arranged in two rows which are placed on both sides of the recording/reproducing unit, respectively. Furthermore, the cell drum placed on the left side thereof and the cell drum placed on the right side are assigned to the two accessors, respectively. Thereby, the media can be efficiently conveyed by simultaneously operating the two accessors.

Further, when the apparatus is in a wait state in which the operation of taking out the media from the cell drum is finished during executing a current command, a rotation of the drum in accordance with the next command is performed in advance. Thereby, a waiting time, during which the accessor waits for waiting the rotation of the drum, can be shortened or eliminated. Further, when commands are executed by the two accessors simultaneously, the two accessors can be operated simultaneously as much as possible by avoiding selecting commands, the execution of which the accessors interfere with each other. Thereby, the efficiency in mounting the media can be improved substantially.

Meanwhile, in the aforementioned embodiment, light reflected by the cell edge can be securely received by the sensor or photodetector by mounting the photodetector to the robot hand in such a manner as to be inclined thereto. Thereby, the detection sensitivity of the photodetector can be improved. Further, a detection error can be eliminated by scanning the cell edge by moving the photodetector from both of the left and right sides of the cell edge and subsequently averaging the values of the position of the cell edge. Moreover, the sensitivity of the photodetector can be easily regulated by preparing the jig of the cartridge type and by attaching the jig to the robot hand of the accessor.

Further, the angle of rotation for correctly positioning each cell of the cell drum onto the accessor is measured by providing the light generation portion in a cell to be measured, and further providing the photodetector, the cylindrical member of which contains the light receiving portion, in the robot hand of the accessor, and then driving the cell drum and the accessor by an infinitesimal amount at a time, and finding the angles, at which the photodetector comes to be unable to detect light, on both sides of the cell, and actually measuring an error and finally correcting the prescribed angle of rotation by using this actually measured error. Thereby, the correct angle of rotation of each cell can be obtained. Consequently, the accuracy of positioning the cell by rotating the cell drum can be improved.

Moreover, values actually measured by performing a measuring operation by the accessor at the installation stage of the apparatus are used as values contained in the translation table for translating a cell address into an angle of rotation of the drum and moving coordinates of the accessor. Further, such values are stored in a floppy disk. Moreover, the original values stored in the floppy disk are selected in the case where the values stored in the floppy disk are not matched with those stored in the ROM when performing a power-on starting. Thereby, the time and trouble required to causes the accessor to actually perform a measurement can be saved.

Furthermore, the two motors, which are different in the maximum running speed from each other, are provided in the aforementioned embodiment. Further, the speed control operation is performed by selectively using these motors. Thereby, the moving time (or movement time) can be shortened. Moreover, an operation of the apparatus can be prevented from being stopped owing to an occurrence of a failure in the motor.

Incidentally, the present invention is not limited to the embodiment whose numerical limitations are described above.

Robot Hand Mechanism

Figure 41:
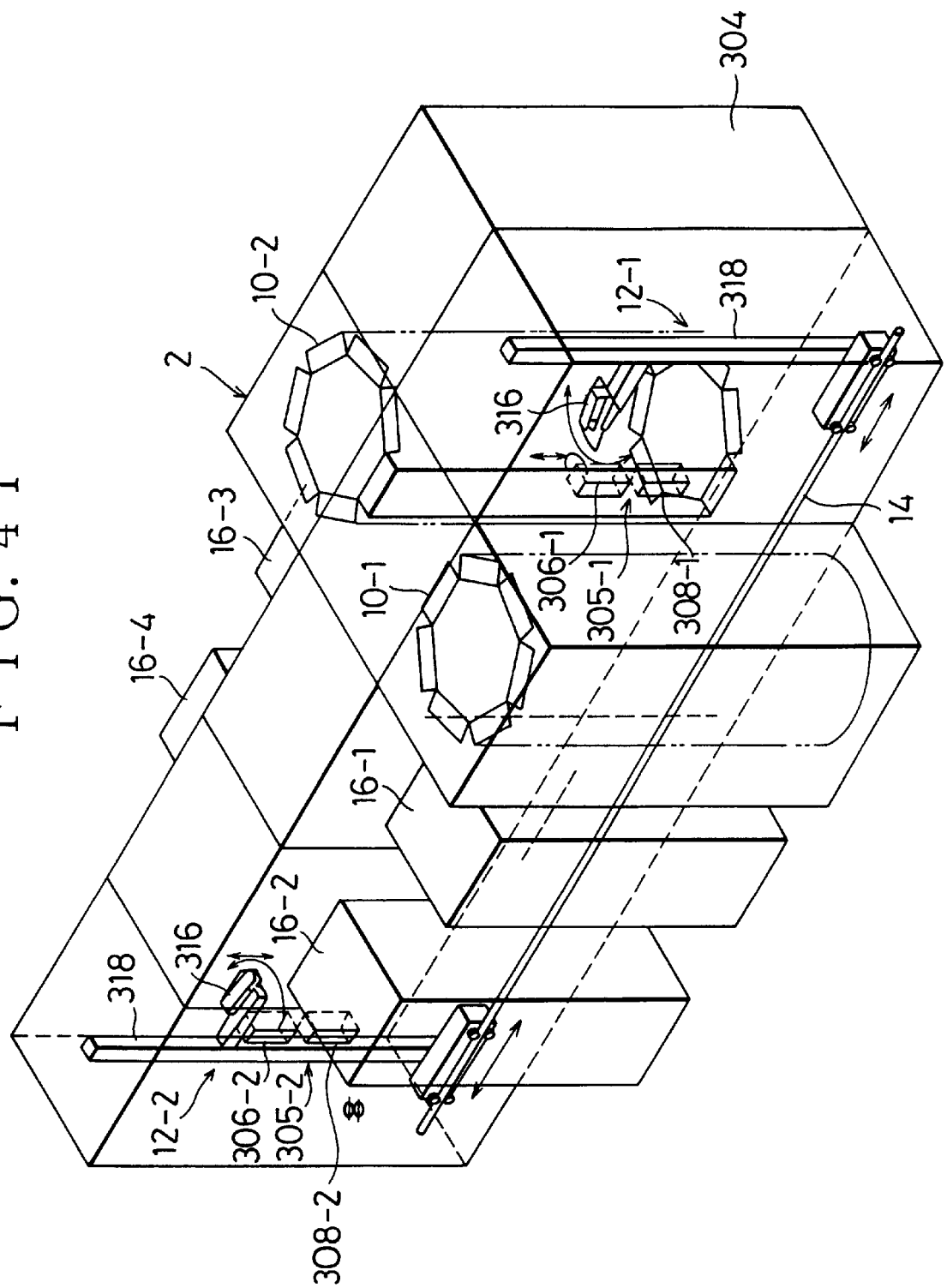
FIG. 41 is a schematic perspective diagram for illustrating the configuration of another library apparatus of the present invention.

FIG. 41 perspectively illustrates the configuration of another library apparatus embodying the present invention. As shown in this figure, cartridge access stations 305-1 and 305-2 are placed in a front portion of a housing 304 of this library apparatus. The cartridge access stations 305-1 and 305-2 have cartridge inlet ports 306-1 and 306-2 and cartridge outlet ports 308-1 and 308-2, respectively. Further, each of the cartridge access stations 305-1 and 305-2 can rotate around a vertical axis thereof 180 degrees. This library apparatus has two cell drums 10-1 and 10-2, around each of which seven segments are placed. Moreover, this library apparatus has four drive units 16-1 to 16-4. Furthermore, accessors 12-1 and 12-2 for conveying cartridges among the cartridge access stations 305-1 and 305-2, the cell drums 10-1 and 10-2 and the drive units 16-1 to 16-4 are provided in the housing 304. Each of the accessors 12-1 and 12-2 is provided with a robot hand mechanism 316 which can move vertically along a vertical column 318. Furthermore, each of the accessors 12-1 and 12-2 can move laterally along the rail 14.

Figure 42:
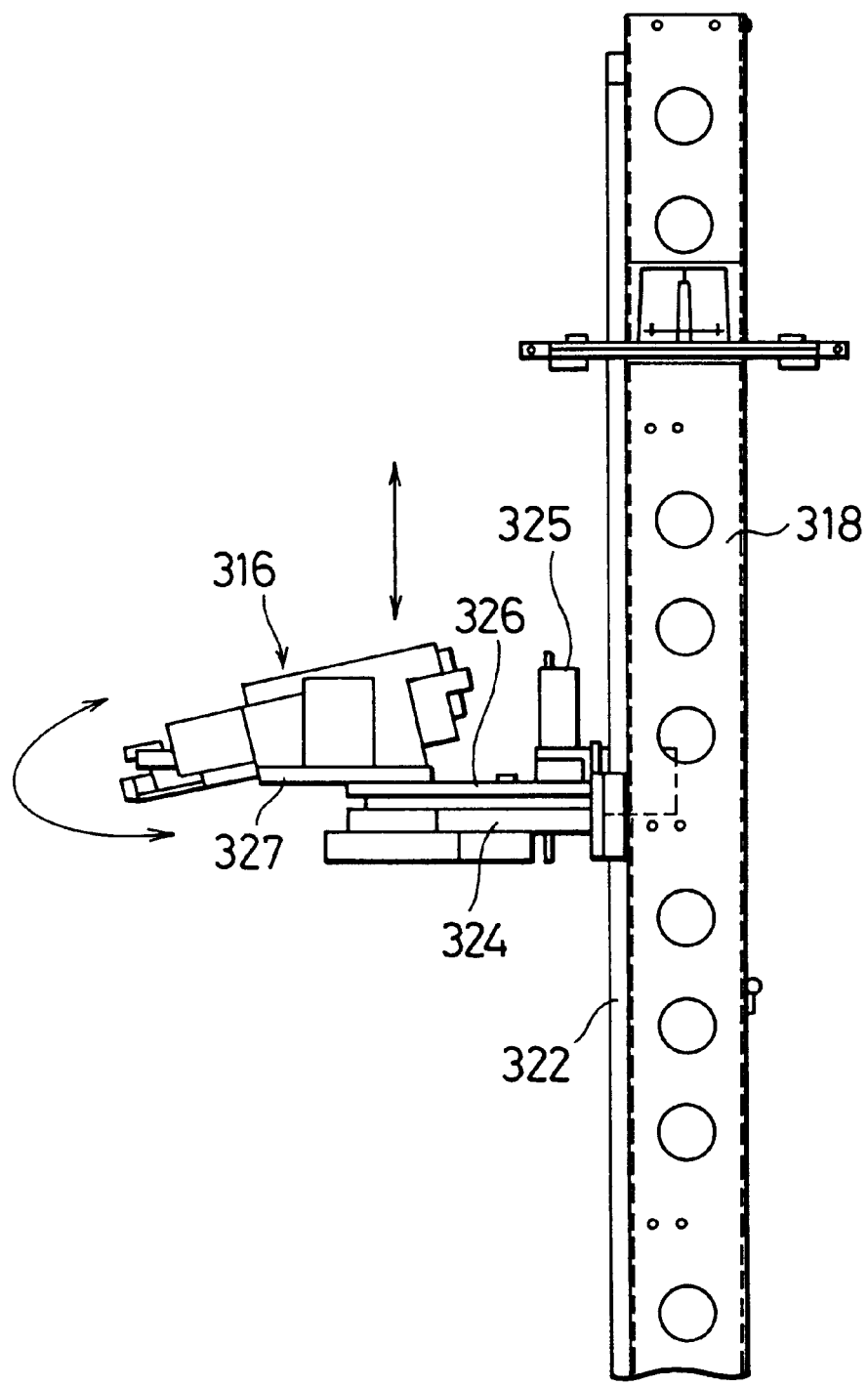
FIG. 42 is a side view of an accessor of this library apparatus.

FIG. 42 is a side view of the accessor of this library apparatus. The robot hand mechanism 316 is mounted on a supporting base 324 adapted to be moved vertically along a guide rail 322 formed on the supporting base 324. When driving a motor 325, the robot hand mechanism 316 rotate or whirl around the vertical axis thereof by means of a timing belt 326 connected to the output shaft of the motor 325.

Figure 43:
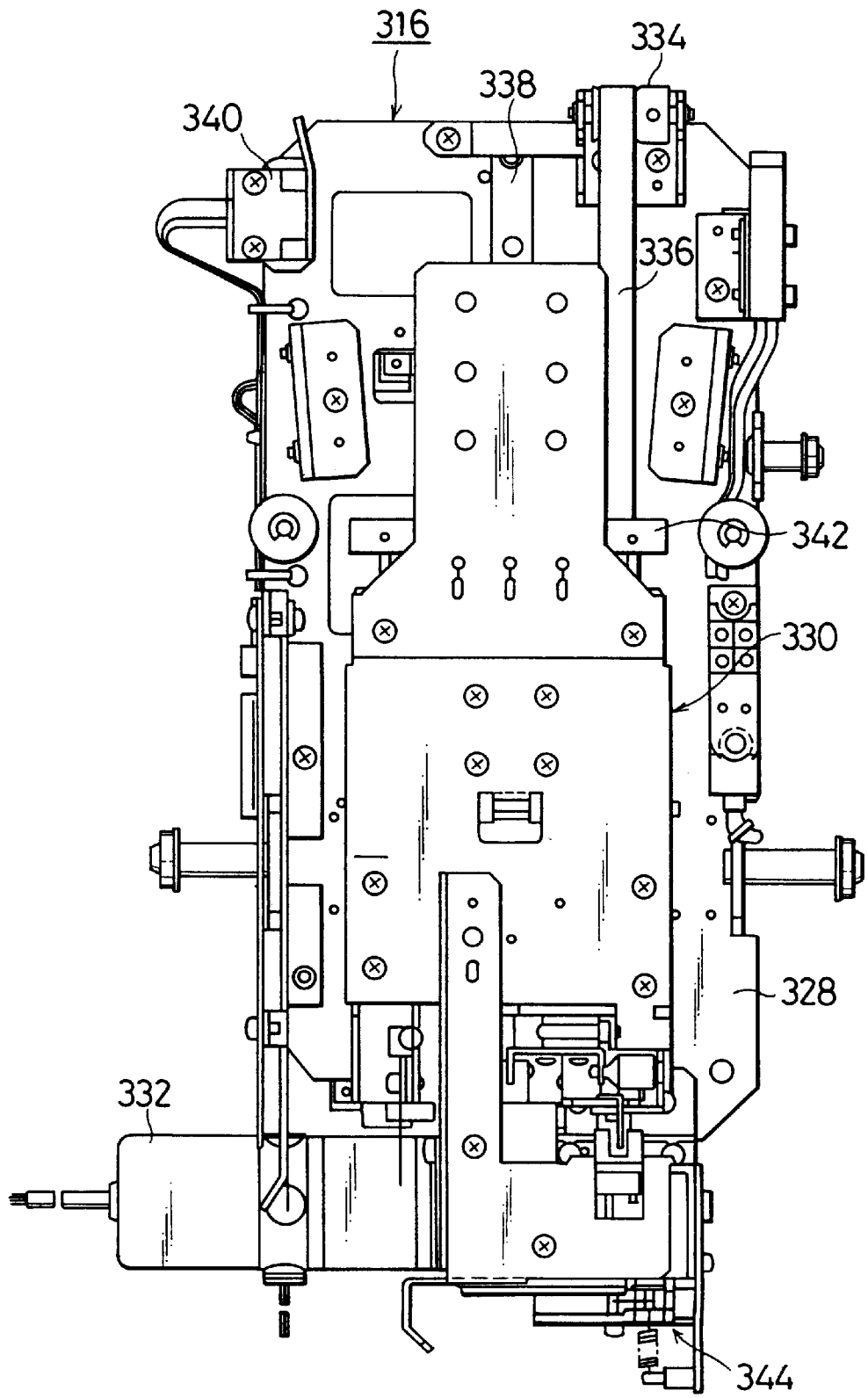
FIG. 43 is a plan view of a robot hand mechanism of this library apparatus.
Figure 44:
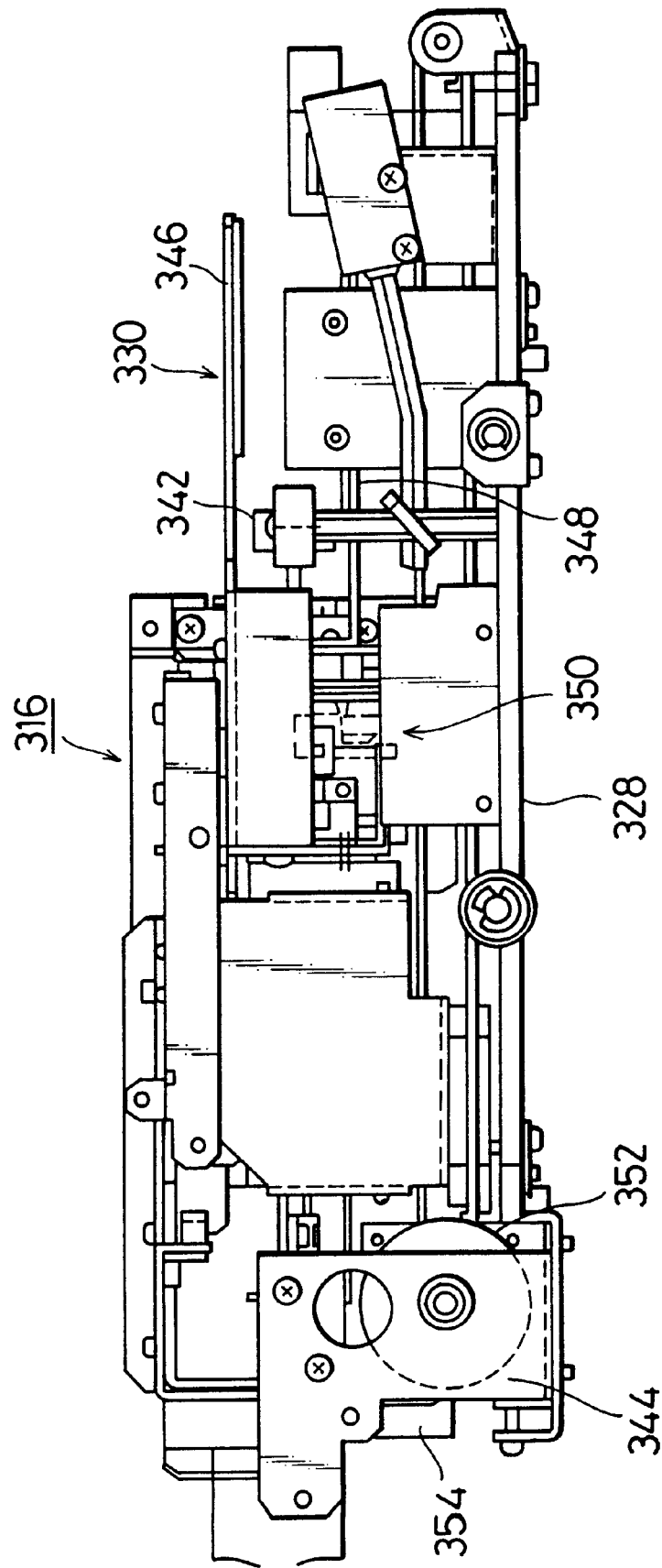
FIG. 44 is a side view of this robot hand mechanism.
Figure 58:
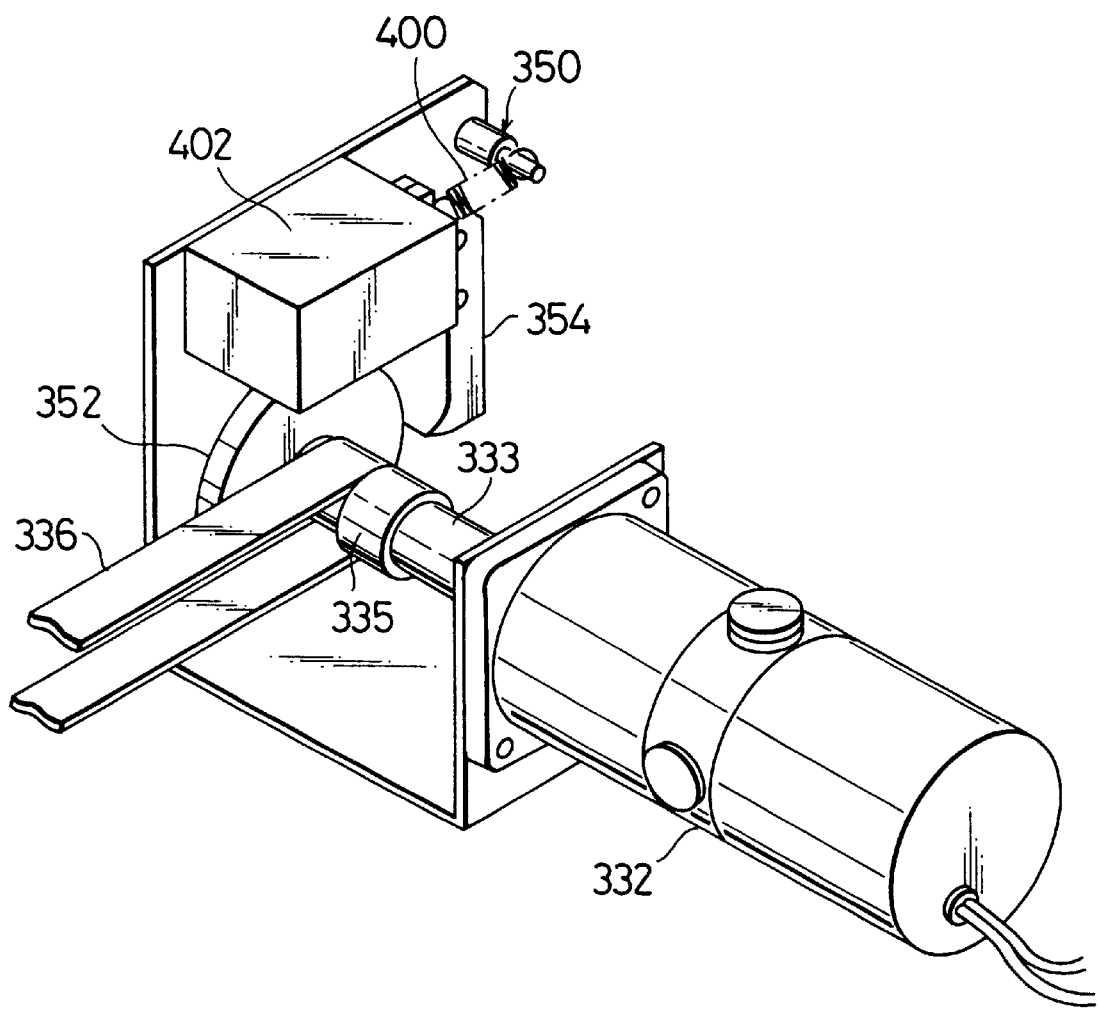
FIG. 58 is a perspective view of a slide locking mechanism of this library apparatus.

FIGS. 43 and 44 are a plan view and a side view of a hand assembly of the robot hand mechanism 316 of this library apparatus, respectively. As shown in these figures, a hand unit 330 having an upper hand 346 and a lower hand 348 is mounted on a base 328 in such a manner as to be able to move between an advancing position and a retreating position. Further, a motor 332 for moving the hand unit 330 is mounted on the rear end portion of the base 328. Moreover, as illustrated in FIG. 58, a timing belt 336 is looped over a pulley 335 fixed to the output shaft of the motor 332, and over a pulley 334 rotatably mounted on the front edge portion of the base. The timing belt 336 is connected to the hand unit 30. When the motor 332 is rotated, the driving force of the motor 332 is transmitted to the hand unit 330 through the timing belt 336. Thereby, the hand unit 330 is slid between the advancing position and the retreating position along the guide rail 338 provided on the base 328.

As shown in FIG. 43, a medium discriminating sensor 340 for discriminating an ordinary recording medium cartridge from a cleaning cartridge is attached to a side part of the front edge portion of the base 328. Further, a cartridge pushing mechanism 342 is provided on the base 328. The cartridge pushing mechanism 342 is operative to push a cartridge into a cell of the cell drum or into the drive unit. Furthermore, a slide locking mechanism 344, which is used for preventing the hand unit 330 from sliding owing to its own weight when the power supply for the motor 332 is interrupted, is provided in the rear edge portion of the base 328. The slide locking mechanism 344 includes a ratchet wheel 352 fixed to the output shaft of the motor 332, and a ratchet 345. Moreover, a hand opening/closing hand mechanism 350 for driving the lower hand 348 to come closer to and go away from the upper hand 346 is provided in the middle portion of the base 328.

Figure 45:
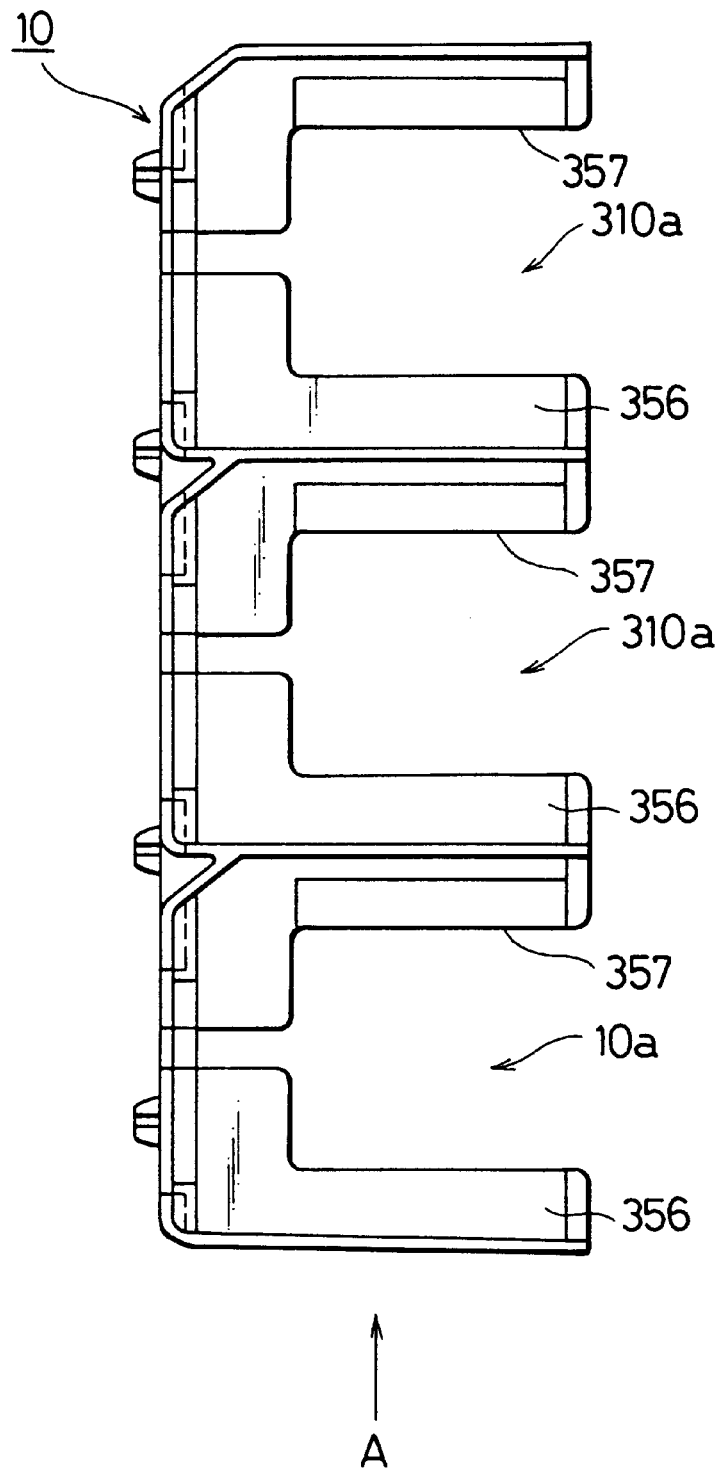
FIG. 45 is a plan view of one segment of a cell drum of this library apparatus.

FIG. 45 is a plan view of one segment of the cell drum 10.

Figure 46:
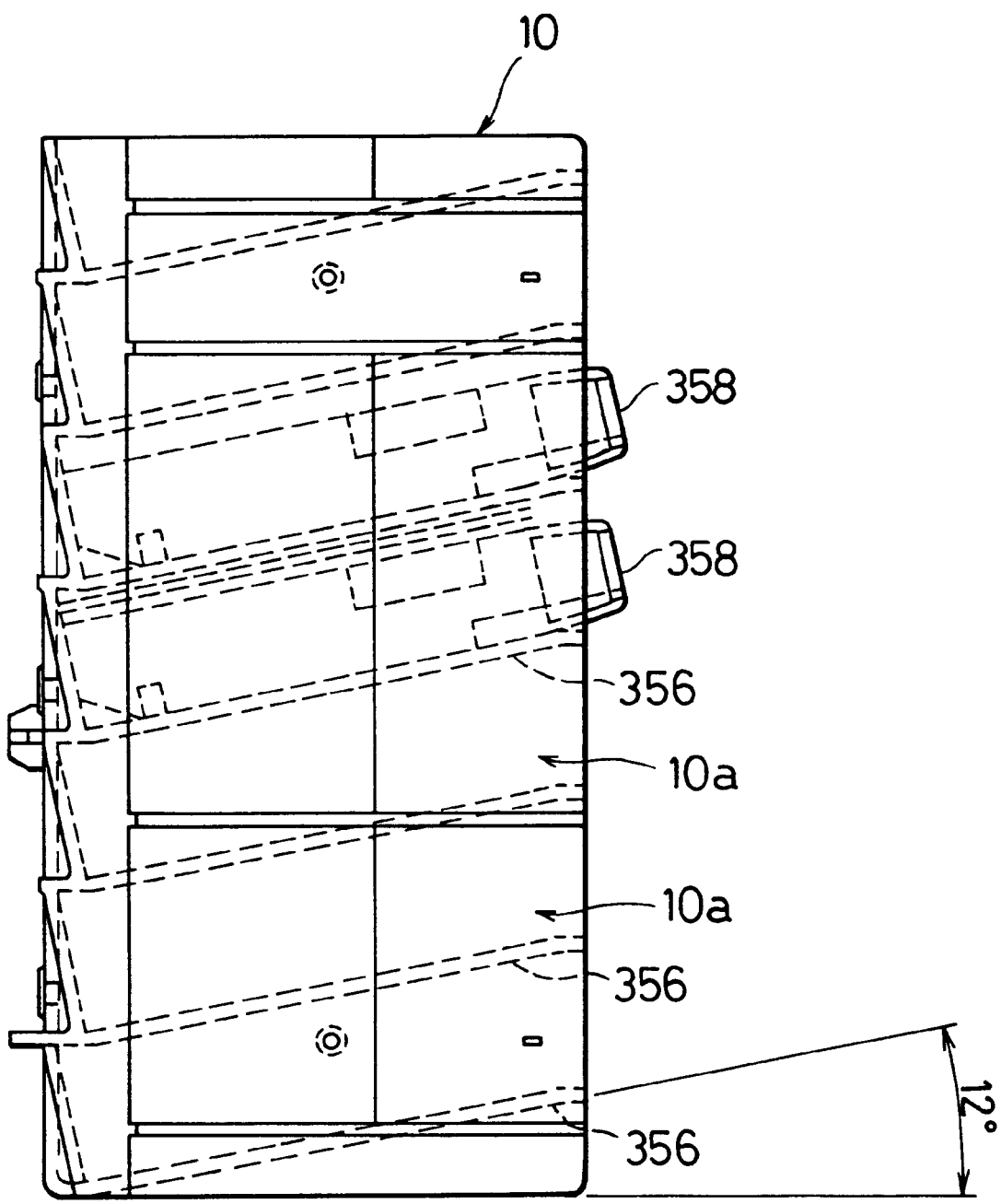
FIG. 46 is a view taken in the direction of an arrow A of FIG. 45.

FIG. 46 is a view taken in the direction of an arrow A of FIG. 45. One segment of the cell 10 has a multi-stage structure in which stages are vertically stacked. Further, each of the stages has three cells 10a. Moreover, the bottom wall 356 of each of the cells 10a is inclined at 12 degrees of to the horizontal plane. Furthermore, a large notch 357 is formed in the central portion of the bottom wall 356. Thus, a recording medium cartridge 358 inserted into the cells 10a can be prevented from popping out of the front portion of the cell 10a owing to the fact that the bottom wall 356 of each of the cells 10a is inclined at 12 degrees of to the horizontal plane.

Figure 47:
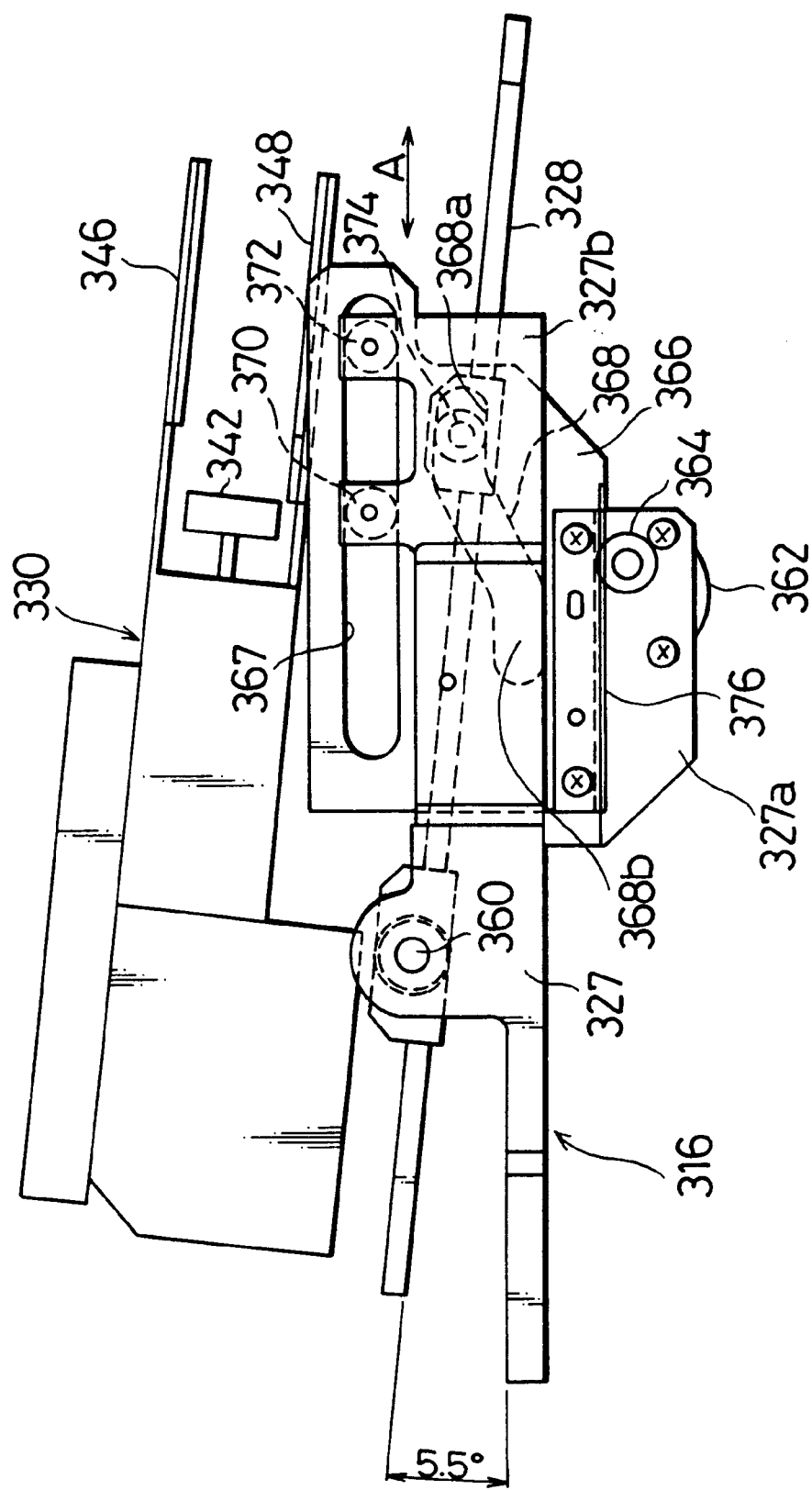
FIG. 47 is a side view of a tilting mechanism of this library apparatus in the case where a hand unit is inclined at 5.5 degrees to horizontal plane.
Figure 48:
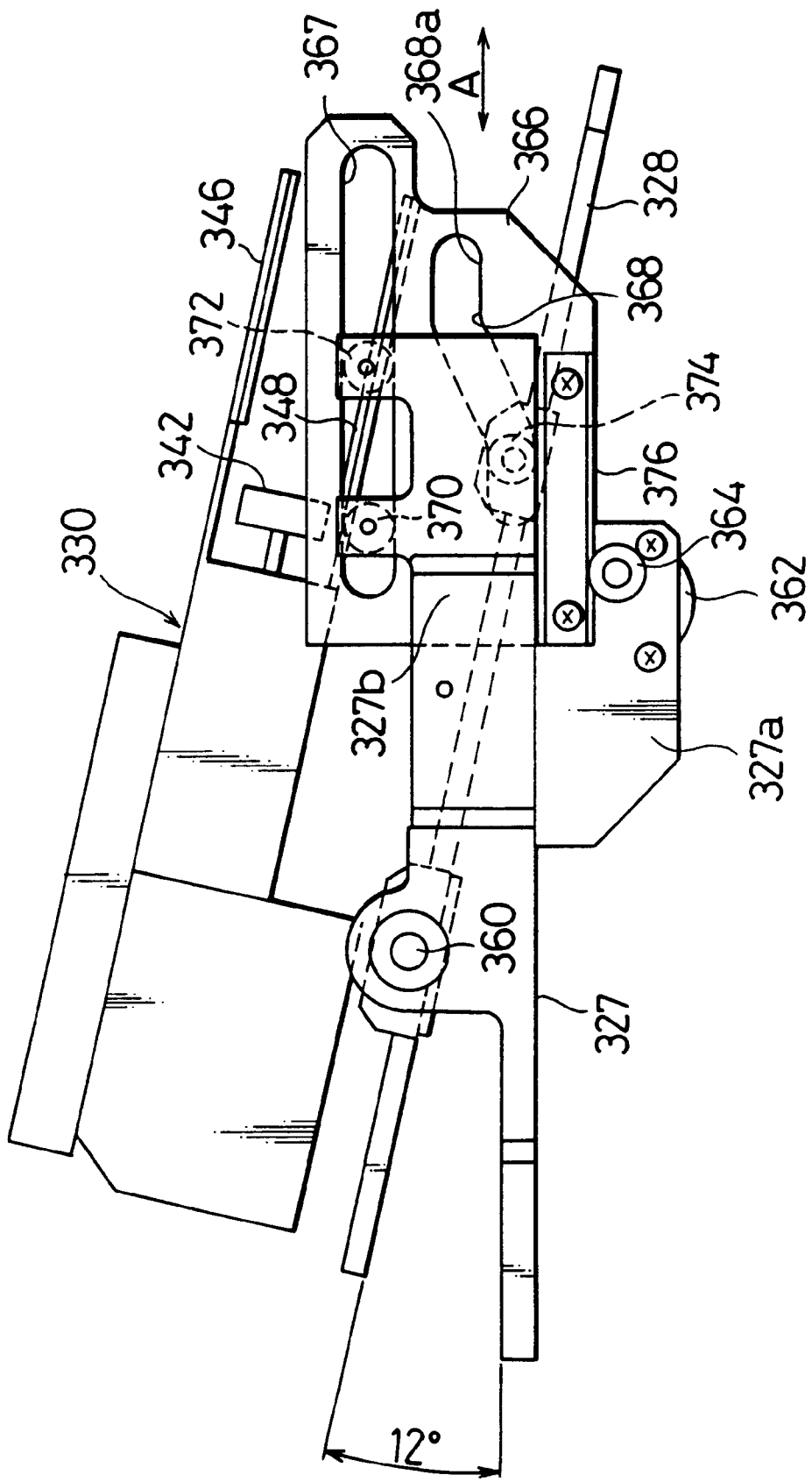
FIG. 48 is a side view of the tilting mechanism in the case where the hand unit is inclined at 12 degrees to horizontal plane.

FIGS. 47 and 48 illustrate tilting mechanisms for inclining the base 328 of the robot hand mechanism 316 at a predetermined angle to the horizontal plane. As illustrated in FIG. 46, the bottom wall 356 of each of the cells 10a is inclined at 12 degrees to the horizontal place so as to prevent the cartridge 358 from popping out of a cell. Similarly, cartridge insertion openings of the drive units 16-1 to 16-4 of FIG. 41 are formed as down-slopes, each of which is downwardly inclined at 5.5 degrees to the horizontal plane from this side to the inside. Thus it is necessary for inserting cartridges into the drive units 16-1 and 16-4 and the cell 10a to move the base, on which the hand unit 30 is mounted, between a first inclination position inclined at 5.5 degrees to the horizontal plane and a second inclination position inclined at 12 degrees to the horizontal plane. The base, on which the hand unit 330 is mounted, is attached to a base 327 in such a manner as to be able to rotate around a shaft 360. The base 327 is whirled around the vertical axis thereof by the motor 325 as illustrated in FIG. 42. Moreover, a motor 362, to the output shaft or spindle of which a pinion 64 is fixed, is attached to a bracket 327a of the base 327. A plate cam 366 has a horizontal groove 367 and a tilting groove 368 and is mounted on the base 327 in such a way as to reciprocate along a guide (not shown) in a horizontal direction indicated by an arrow A. The tilting groove 368 has an upper horizontal portion 368a and a lower horizontal portion 368b. Further, a rack 376 to be meshed with a pinion 364 is formed in the bottom end portion of the plate cam 366. Moreover, rollers 370 and 372 adapted to run in the horizontal groove 367 formed in the plate cam 366 are rotatably attached to a tip end portion of another bracket formed in such a manner as to be integral with the base 327. On the other hand, a roller 374 adapted to run in the tilting groove 368 formed in the plate cam 366 is rotatably attached to the base 328.

FIG. 47 illustrates a state of the tilting mechanism, in which the base 328 is inclined at 5.5 degrees to the base 327. When the tilting mechanism is in this state, a recording medium cartridge grasped by the upper hand 346 and the lower hand 348 of the hand unit 330 is inserted into one of the drive units 16-1 to 16-4. Further, if the motor 362 is driven when the tilting mechanism is in this state, the pinion 364 fixed to the output shaft of the motor 362 is rotated. Owing to the fact that the rack 376 and the pinion 364 are in mesh, the rotation of the pinion 364 causes the plate cam 366 to move rightwardly as viewed in FIG. 47. When the plate cam 366 is moved rightwardly, the rollers 370 and 372 run in the horizontal groove 367. On the other hand, the roller 374 runs in the tilting groove 368. When the plate cam 366 is moved to the very edge of the right-hand side of the moving range thereof, the roller 374 comes to be located in the lower horizontal portion 368b of the tilting groove 368 as illustrated in FIG. 48. The base 348 is inclined at 12 degrees to the base 327. While being in this state, the hand unit 330 inserts the recording medium cartridge grasped by the upper hand 346 and the lower hand 348 thereof into the cell 10a. When reversing the motor 362, the plate cam 366 is moved leftwardly as viewed in this figure. Further, the base 328 of FIG. 47 comes to be inclined to at 5.5 degrees to the base 327. Thus, the base 328 is turned or moved between the first tilting position, which is inclined at 5.5 degrees to the base 327, and the second tilting position, which is inclined at 12 degrees to the base 327, by rotating the motor 362 normally and reversely.

Figure 50:
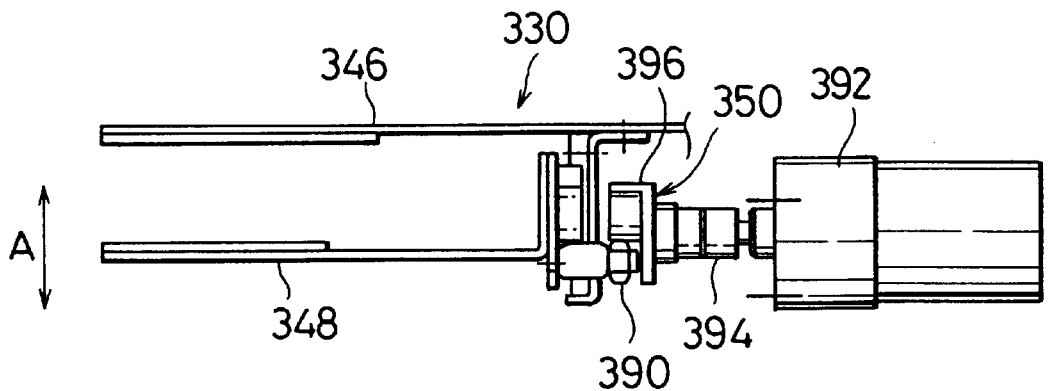
FIG. 50 is a side view of the hand opening/closing mechanism.
Figure 51:
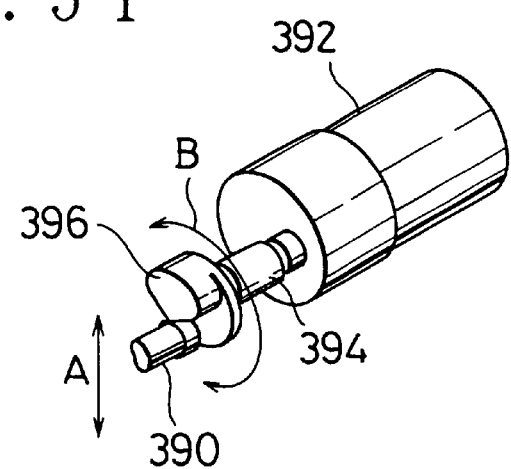
FIG. 51 is a perspective view of an eccentric cam portion of the hand opening/closing mechanism.
Figure 52:
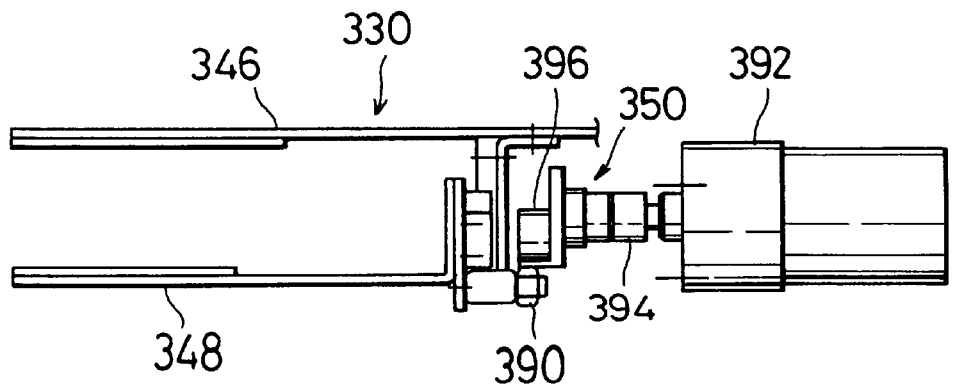
FIG. 52 is a side view of the hand opening/closing mechanism which is in a state in which the hand is opened.
Figure 53A:
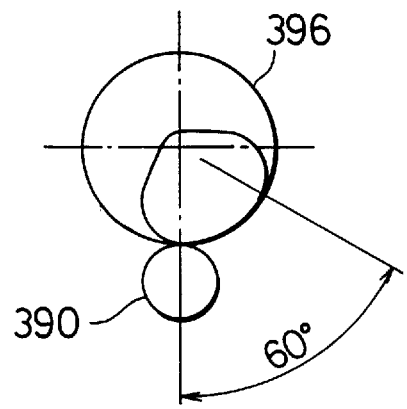
FIGS. 53A and 53B are diagrams for illustrating the range of an angle of rotation of the eccentric cam which is in the state in which the hand is opened.
Figure 53B:
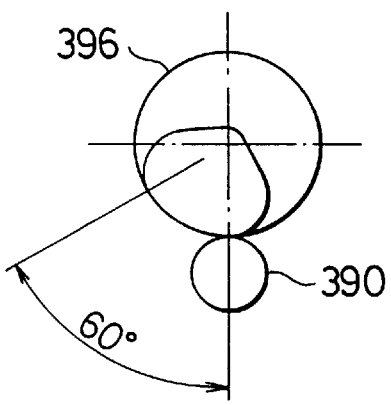
Figure 54:
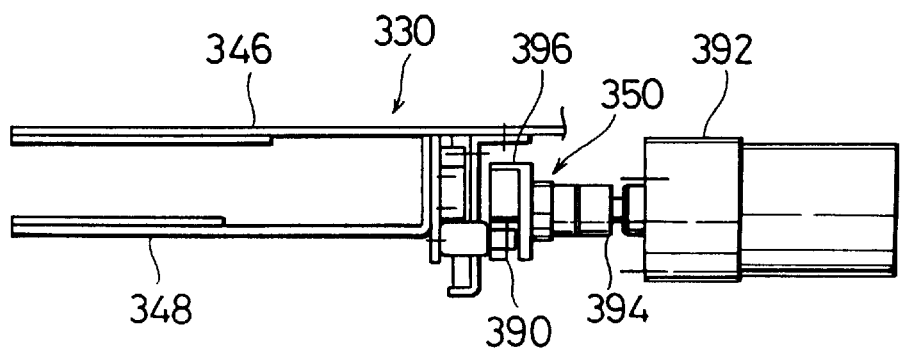
FIG. 54 is a side view of the hand opening/closing mechanism that is in a state in which the hand is closed.
Figure 55A:
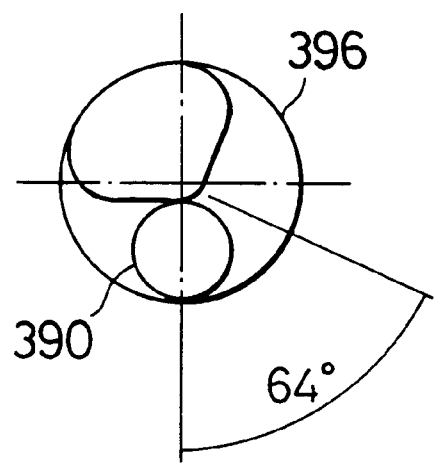
FIGS. 55A and 55B are diagrams for illustrating the range of an angle of rotation of the eccentric cam that is in the state in which the hand is closed.
Figure 55B:
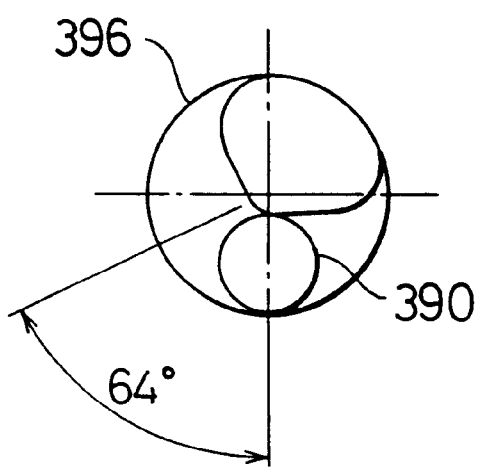

Next, the hand opening/closing mechanism 50 will be described hereinbelow in detail with reference to FIGS. 49 to 55. As shown in FIG. 49, the upper hand 346 is screwed to a mounting plate 380 which is fixed to the base 328. Further, a rail 382 is fixed to the mounting plate 380. Moreover, a shaft 388, on which a roller 390 is rotatably mounted, is protrusively attached to the lower hand 348. A direct-acting bearing 384 for guiding a sliding motion of the rail 382 is further attached to the lower hand 348. Furthermore, extension coil springs 386 are provided between the upper hand 346 and the lower hand 348 and pushes the lower hand 348 upwardly at all times, namely, in a direction in which the lower hand 348 is put onto the upper hand 346. As shown in FIGS. 50 and 51, an eccentric cam 396 is fixed to the output shaft 394 of the motor 392, which is securely mounted on the base 328, in such a manner as to be in contact with the roller 390. When the eccentric cam 396 is turned in the direction of an arrow B, the roller 390 is moved to the vertical direction indicated by an arrow A. FIG. 52 is a side view of the hand opening/closing mechanism that is in a state in which the hand is opened. As shown in this figure, the eccentric cam 396 pushes down the roller 390 to the very lowest position thereof. This hand is in an opened state during the eccentric cam 396 is rotated 120 degrees between the positions of FIG. 53A and FIG. 53B. FIG. 54 is a side view of the hand opening/closing mechanism that is in a state in which the hand is closed. When the mechanism is in this state, the coil spring 386 pulls up the lower hand 348. A recording medium cartridge can be firmly grasped by the upper hand 346 and the lower hand 348. This hand is in a closed state during the eccentric cam 396 is rotated 128 degrees between the positions of FIG. 55A and FIG. 55B. In the case of the hand opening/closing mechanism of this embodiment, only by rotating the motor 392 only in one direction, the roller 390 is moved vertically during the roller 390 is in contact with the eccentric cam 396 while rotating. Thus, the lower hand 348 and the upper hand 346 can be joined and unjoined. Thereby, in the case of this hand opening/closing mechanism, there is no necessity of normally rotating the motor and reversing the motor as in the case of conventional hand opening/closing mechanism. Consequently, the control of the motor 392 can be facilitated. Furthermore, the magnitude of an opening (or closing) angle of the hand depends on the accuracy of the eccentric cam 396 and can be controlled very accurately but thus is not affected largely by variation in components. Consequently, the hand can securely grasp a cartridge even in the case where a pitch, at which the cells are arranged, becomes small owing to increase in the number of cartridges, accommodated in the apparatus.

Figure 56:
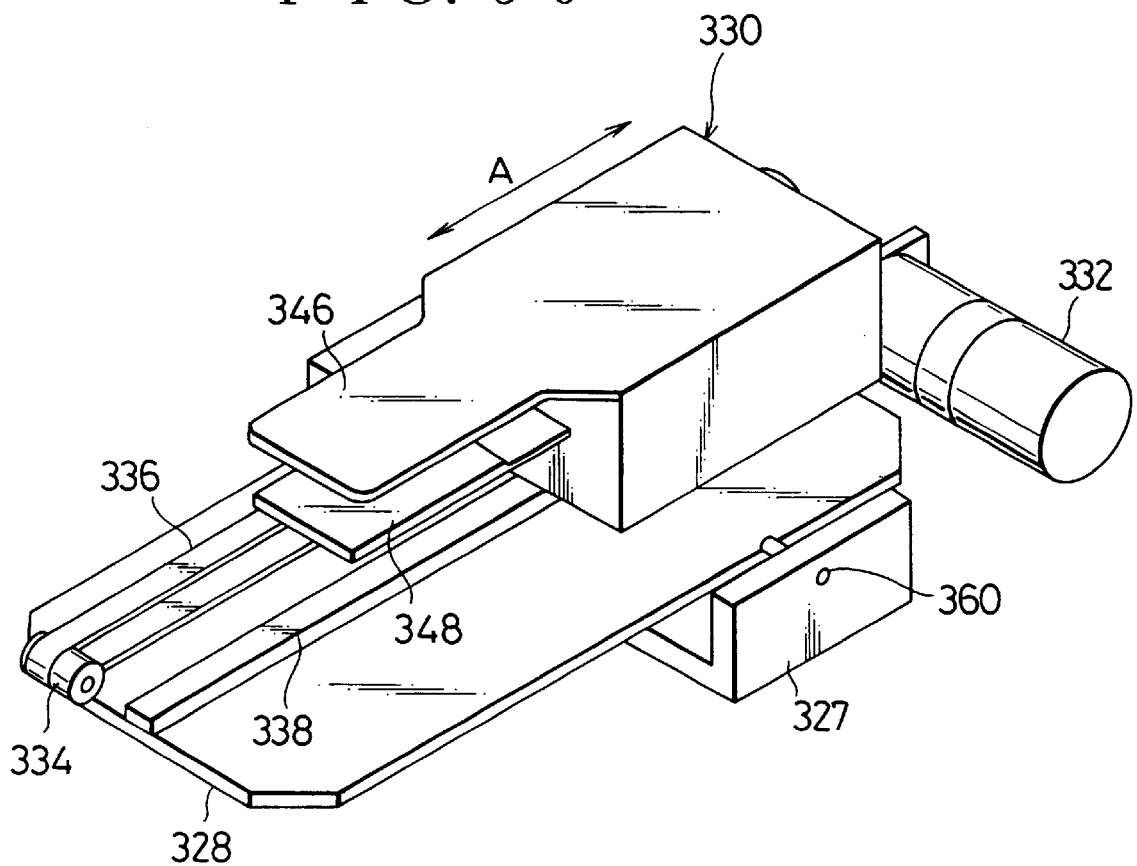
FIG. 56 is a perspective view of a robot hand mechanism of this library apparatus.
Figure 57:
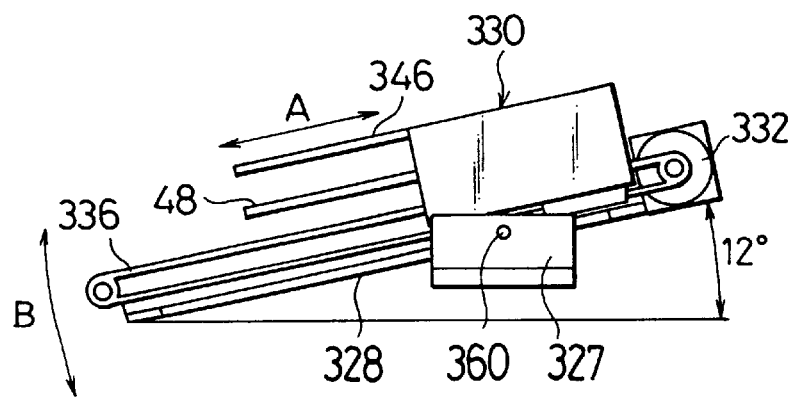
FIG. 57 is a side view of the robot hand mechanism.

Next, the slide locking mechanism of the hand unit will be described hereunder by referring to FIGS. 56 to 59B. FIG. 56 is a perspective view of the robot hand mechanism. FIG. 57 is a side view of this robot hand mechanism. As described with reference to FIGS. 47 and 48, the base 328, on which the hand unit 330 is mounted, is rotated around the shaft 360 between the first tilting position, at which the base 328 is inclined at 5.5 degrees to the base 327, and the second tilting position, at which the base 328 is inclined at 12 degrees to the base 327. Because the timing belt 336 is connected to the hand unit 330, the hand unit 330 is moved by being guided by the rail 38 between the advancing position and the retreating position as indicated by a double-headed arrow A, when causing the motor 332 to rotate. Moreover, when causing the motor 362 of FIGS. 47 and 48 to rotate, the base 328 is rocked or reciprocated between the second tilting position, at which the base 328 is inclined at 12 degrees to the horizontal plane, of FIG. 57 and the first tilting position, at which the base 328 is inclined at 5.5 degrees to the horizontal plane, as indicated by another doubleheaded arrow B in FIG. 57. In this way, the hand unit 330 is mounted on the base 327 in such a manner as to be inclined to the horizontal plane. Thus, there has been a fear that when the power supply for supplying electric power to the motor 332 is shut down by some cause during the accessors 12-1 and 12-2 move, the hand unit 330 might pop out to the front of the accessor owing to its own weight and interfere with peripheral equipment or the like. In the case of this embodiment, the slide locking mechanism 350 prevents the hand unit 330 from sliding.

Figure 59A:
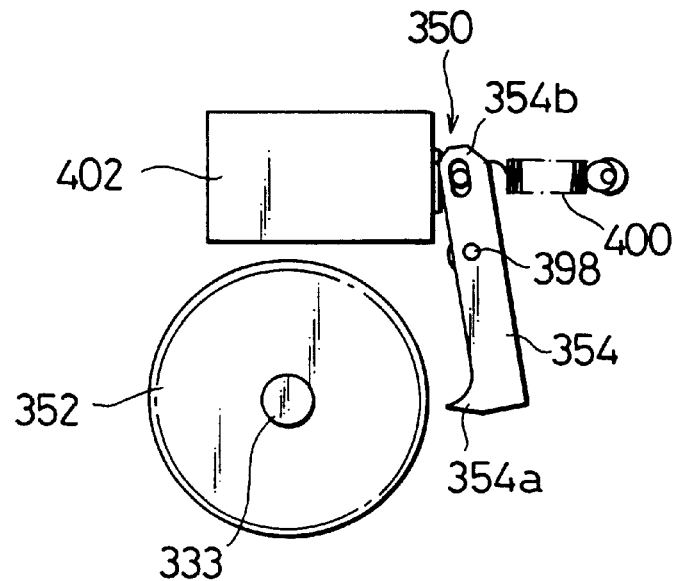
FIGS. 59A and 59B are diagrams for illustrating an operation of the slide locking mechanism.
Figure 59B:
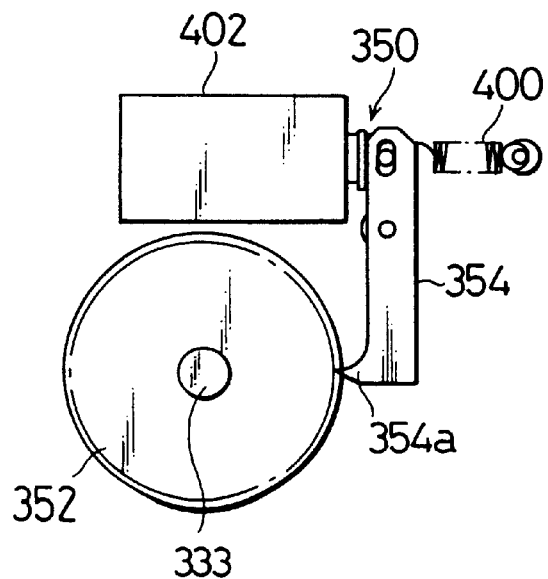

The slide locking mechanism 50 has a ratchet wheel 352 fixed to the output shaft 333 of the motor 332, as illustrated in FIG. 58. A ratchet 354 is mounted thereon in such a manner as to be able to turn around the shaft 398, as illustrated in FIGS. 59A and 59B. An end portion 354a of the ratchet 354 can engage with the ratchet wheel 352. The other end portion 354b of the ratchet 354 is connected to a coil spring 400 and a solenoid 402. Further, the solenoid 402 is driven by the power supply shared with the motor 332. When the motor 332 is thus rotated, the solenoid 402 is turned on. FIG. 59A illustrates an energized or magnetized state of the solenoid 402. As shown in this figure, the solenoid 402 pulls the ratchet 354 against the pushing force of the coil spring 400. Thus the engagement between the ratchet 354 and the ratchet wheel 352 is canceled. When the power supply for the motor 332 is turned off by some cause, the solenoid 403 is also turned off. Thereby, the ratchet 354 is pulled by the coil spring 400 and is thus rotated clockwise. As a result, the end portion 354a engages with the ratchet wheel 352. Consequently, the hand unit 330 can be prevented from sliding due to its own weight. Therefore, even if the inclination angle of a cell is set at a large angle for the purpose of preventing a cartridge from popping out of the cell when an earthquake occurs, the hand unit 330 does not slide owing to its own weight, for instance, upon the power-down of the library apparatus. Consequently, no collision between the hand unit 330 and the cell 10a occurs. Moreover, an occurrence of an accident, in which a cartridge falls from the hand unit 330, can be prevented. Furthermore, a recovering operation is facilitated.

Figure 60A:
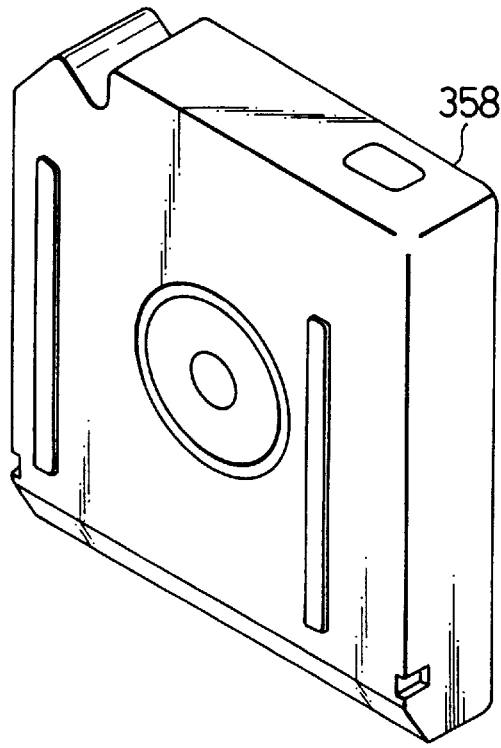
FIGS. 60A and 60B are perspective views of medium cartridges used in this library apparatus.
Figure 60B:
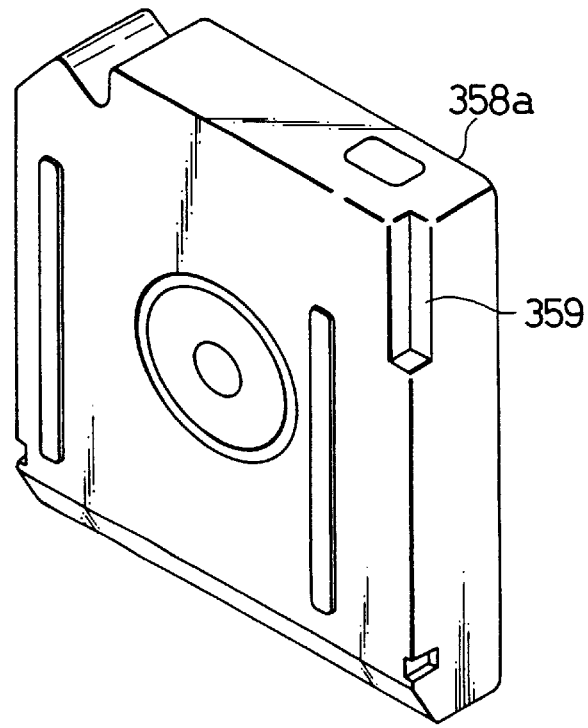
Figure 61:
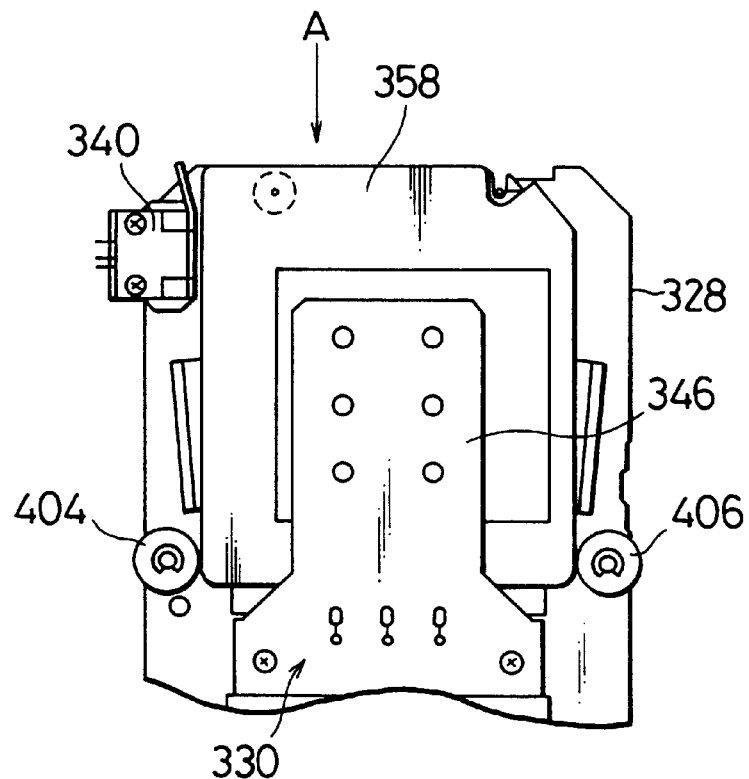
FIG. 61 is a plan view of a first example of a medium discriminating mechanism of this library apparatus at the time of grasping an ordinary medium.
Figure 62:
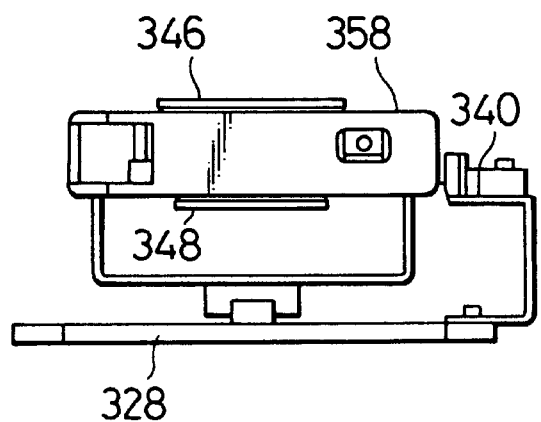
FIG. 62 is a view taken in the direction of an arrow A of FIG. 61.
Figure 63:
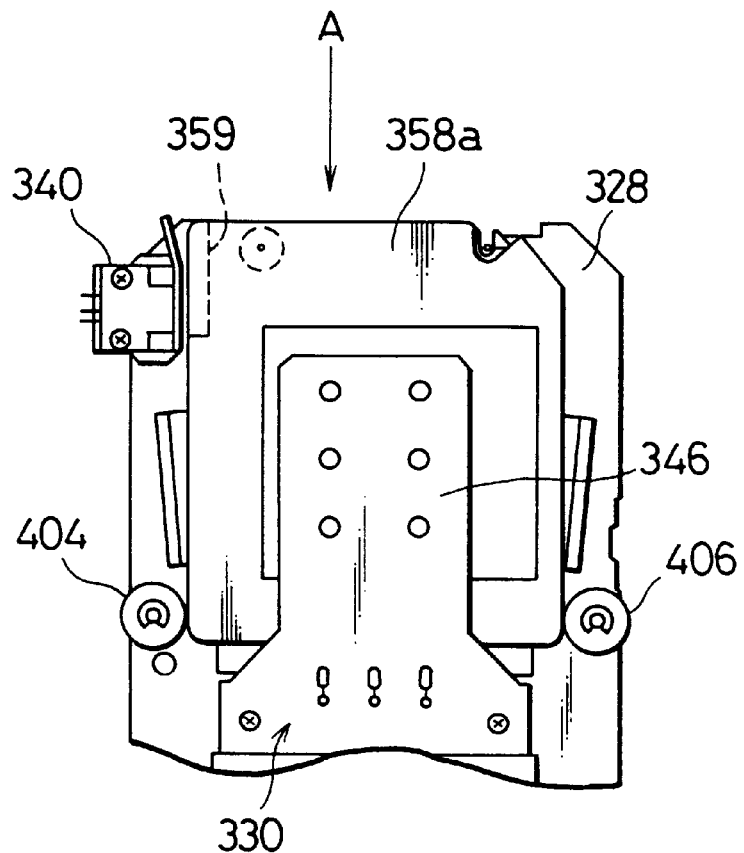
FIG. 63 is a plan view of the first example of the medium discriminating mechanism at the time of grasping a cleaning cartridge.
Figure 64:
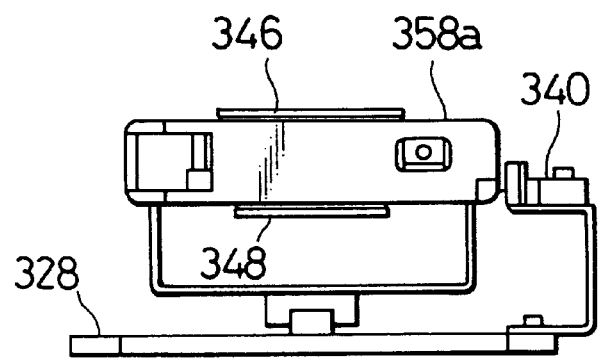
FIG. 64 is a view taken in the direction of an arrow A of FIG. 63.
Figure 65:
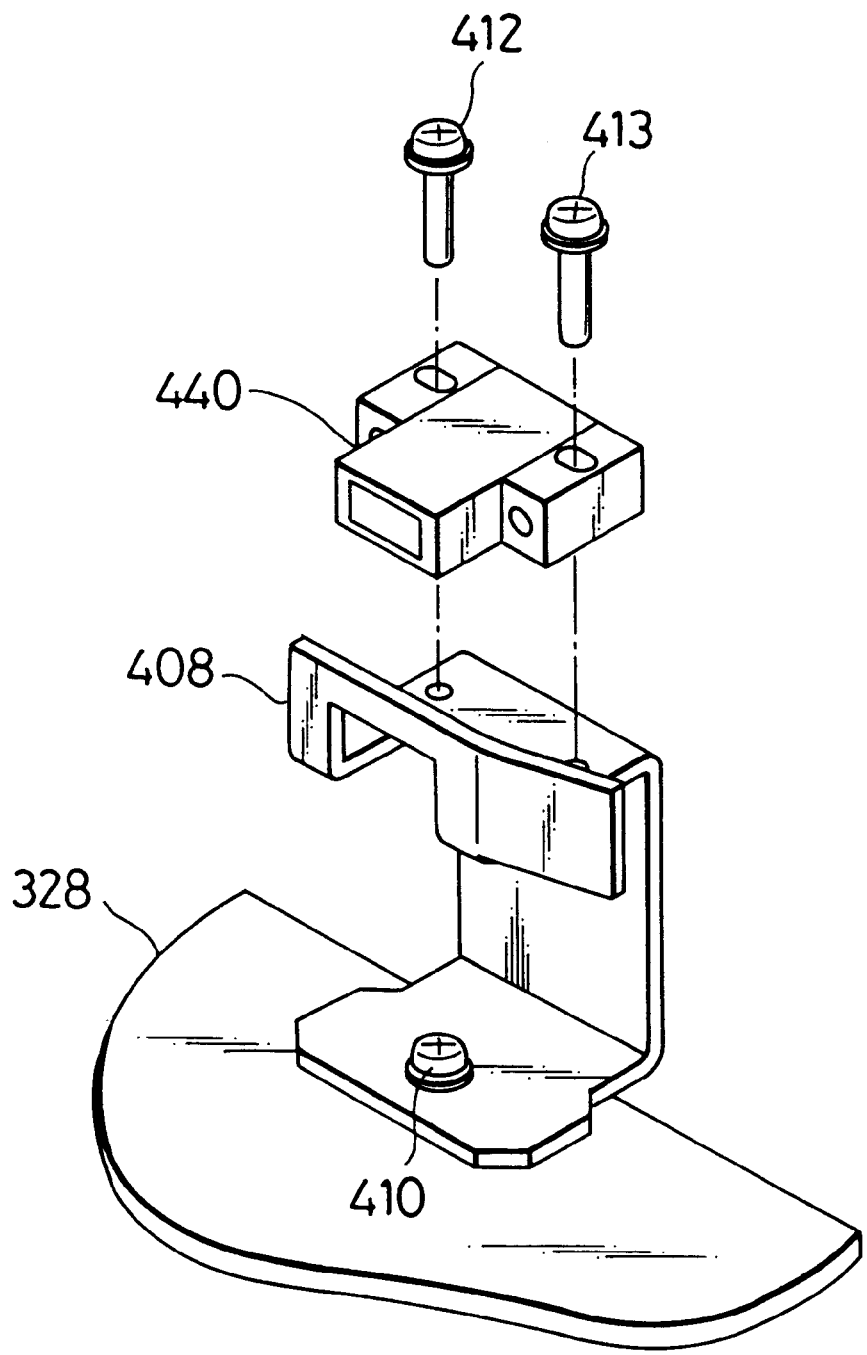
FIG. 65 is an exploded perspective diagram for illustrating how an optical sensor of the reflection type is mounted in this medium discriminating mechanism.
Figure 66:
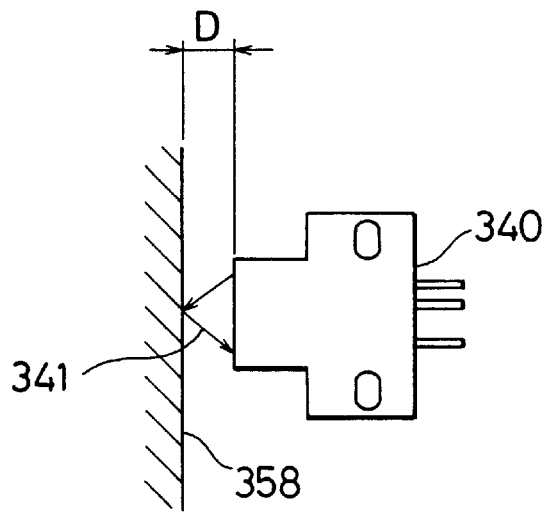
FIG. 66 is a diagram for illustrating a detection operation of this optical sensor of the reflection type.

Next, the medium discriminating mechanism for discriminating an ordinary cartridge from a cleaning cartridge will be described hereinbelow. FIG. 60A illustrates an ordinary recording medium cartridge. FIG. 60B illustrates a cleaning cartridge 358a which has a notch 359. The outside shape of the cleaning cartridge 358a is the same as of the ordinary recording medium cartridge, except for this notch 359. FIG. 61 illustrates a first example of the medium discriminating mechanism in the case where the hand unit 330 grasps an ordinary cartridge. FIG. 62 is a view taken in the direction of an arrow A of FIG. 61. Further, FIG. 63 illustrates the first example of the medium discriminating mechanism in the case where the hand unit 330 grasps a cleaning cartridge 358a. FIG. 64 is a view taken in the direction of an arrow A of FIG. 63. As shown in this figure, the first example of the medium discriminating mechanism employs the optical sensor 340 of the reflection type. As illustrated in FIG. 65, a mounting bracket 408 is fixed to the base 328 with a screw 410, and the optical sensor 340 of the reflection type is fixed to the mounting bracket 408 with screws 412 and 413. The optical sensor 340 of the reflection type contains a light emitting (or generating) element and a light receiving element. As shown in FIG. 66, when a light beam 341 reflected by the cartridge 358 is detected by the light receiving element, the optical sensor 340 is turned on. When the distance D between the optical sensor 340 of the reflection type and the cartridge 358 is not more than 6 mm, the reflected light beam 341 can be detected by the light receiving sensor. Thus the optical sensor 340 is turned on. In contrast, when the distance D is longer than 6 mm, the reflected light beam 341 can not be detected by the light receiving sensor. Thus the optical sensor 340 is turned off. Therefore, in the case where the hand unit 330 of FIGS. 61 and 62 grasps the ordinary cartridge 358, the distance D is not more than 6 mm and thus the optical sensor 340 is turned on. In contrast, in the case where the hand unit 330 grasps the cleaning cartridge 358a as illustrated in FIGS. 63 and 64, the notch 359 is 6 mm in depth and thus the distance D is about 9 mm. Consequently, the optical sensor 340 is turned off. In this way, the ordinary medium cartridge 358 is discriminated from the cleaning cartridge 358a according to whether the optical sensor 340 of the reflection type is turned on or off.

Figure 67:
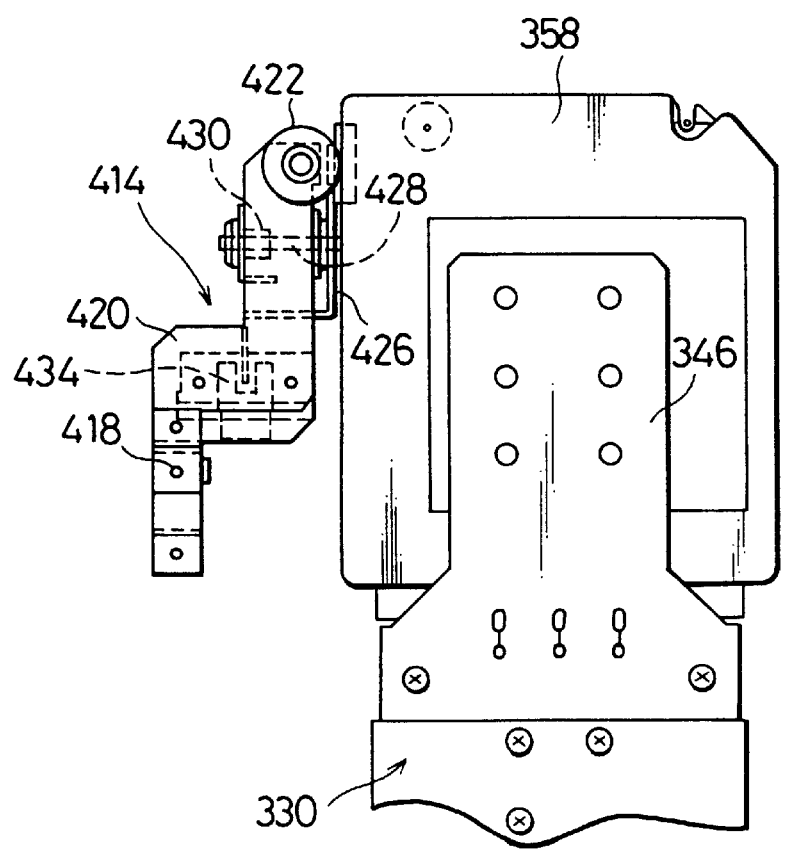
FIG. 67 is a plan view of a second example of the medium discriminating mechanism at the time of grasping an ordinary cartridge.
Figure 68:
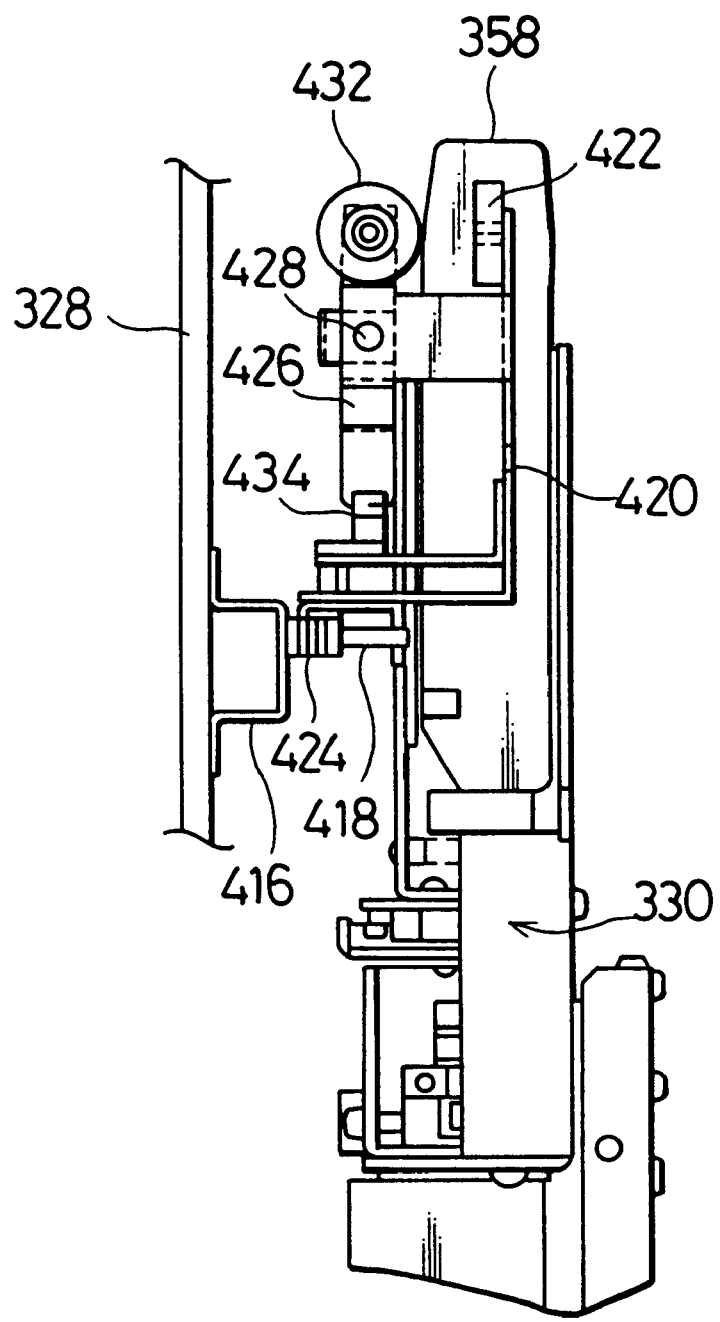
FIG. 68 is a side elevation of the second example of the medium discriminating mechanism of FIG. 67, which is viewed from left.

Next, a second embodiment of the medium discriminating mechanism will be described hereinbelow by referring to FIGS. 67 to 71. FIG. 67 illustrates the medium discriminating mechanism 414 in the case where the hand unit 330 grasps an ordinary cartridge. FIG. 68 is a side elevation of the medium discriminating mechanism 414, which is viewed from left. As shown in this figure, a shaft 418 is erected on the bracket 416 fixed onto the base 328. Further, a first lever 420 is mounted on the shaft 418 in such a manner as to be able to rotate thereabout. Moreover, a roller 422 is rotatably mounted on a tip end portion of the first lever 420 which is pushed clockwise as illustrated in FIG. 67 by a spring 424 placed on the shaft 418. Furthermore, a shaft 428 is attached to the first lever 420. In addition, a second lever 426 is mounted upon this shaft 428 in such a way as to be able to rotate thereabout. Further, a roller 432 is rotatably mounted at an end portion of the second lever 426. The other end portion of the second lever 426 is adapted to selectively be inserted into a space between the light emitting element and the light receiving element of an optical sensor of the transmission type. As described above, the first lever 420 is pushed clockwise by the coil spring 424 as viewed in FIG. 67. Thus the roller 422 is pushed against a side surface of the cartridge 358. Further, the second lever 426 is pushed counterclockwise by a coil spring 430 placed on the shaft 428 as viewed in FIG. 68. Thus the roller 432 is pushed against the bottom surface of the cartridge 358. When the hand unit 330 grasps the ordinary cartridge 358, the second lever 426 is inserted into a space between the light emitting element and the light receiving element of the optical sensor 434 as illustrated in FIGS. 67 and 68. Consequently, the optical sensor 434 is turned off, and the ordinary cartridge 358 is detected.

Figure 69:
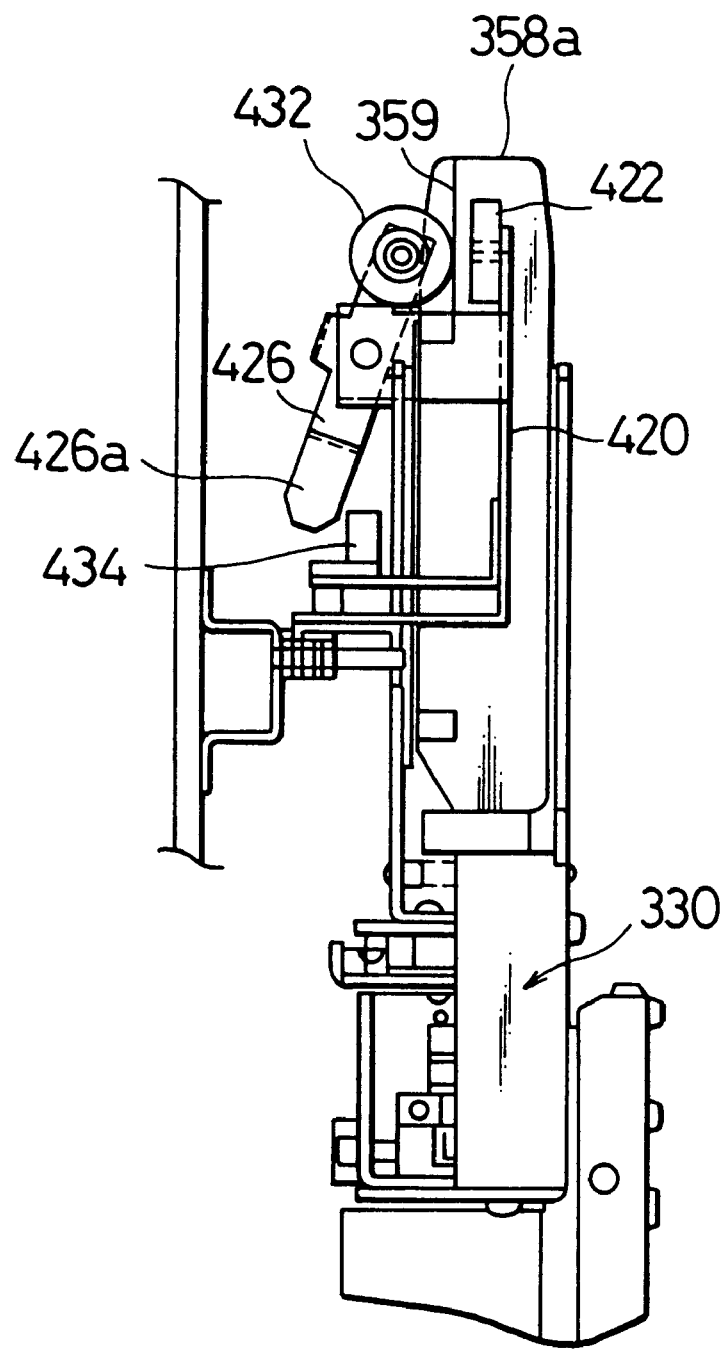
FIG. 69 is a side elevation of the medium discriminating mechanism of FIG. 67, which is viewed from left.

When the hand unit 330 grasps the cleaning cartridge 358, the roller 432 falls into the notch 359 as illustrated in FIG. 69. Thus the second lever 426 is rotated clockwise as viewed in this figure. Thereby, a tip edge portion 426a of the second lever 426 comes away from the optical sensor 434. Consequently, the optical sensor 434 is turned on and detects the cleaning cartridge 358a.

Figure 70:
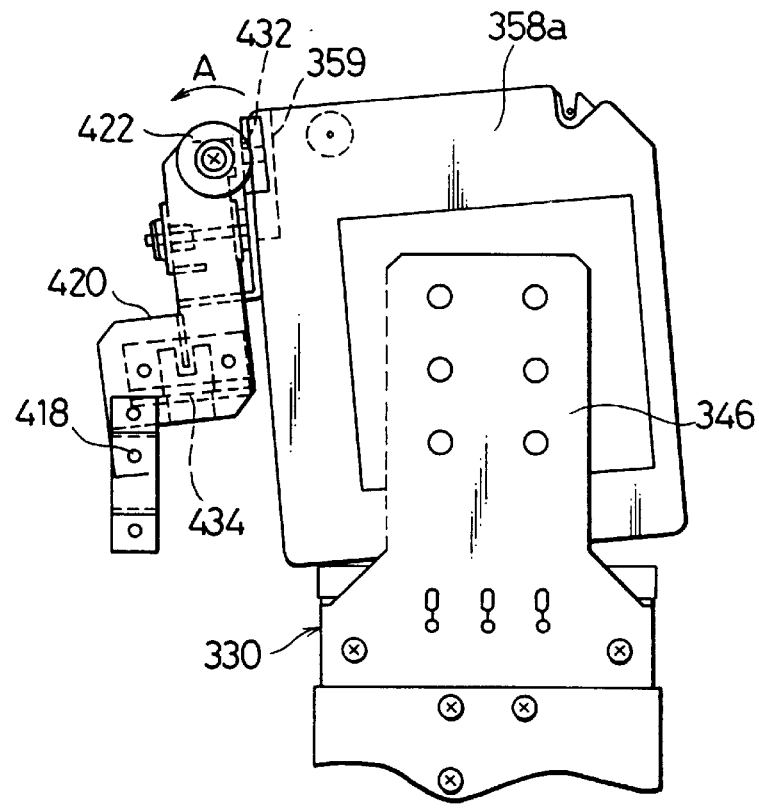
FIGS. 70 and 71 are diagrams for illustrating a detection operation in the case where a cartridge is grasped by the hand unit.
Figure 71:
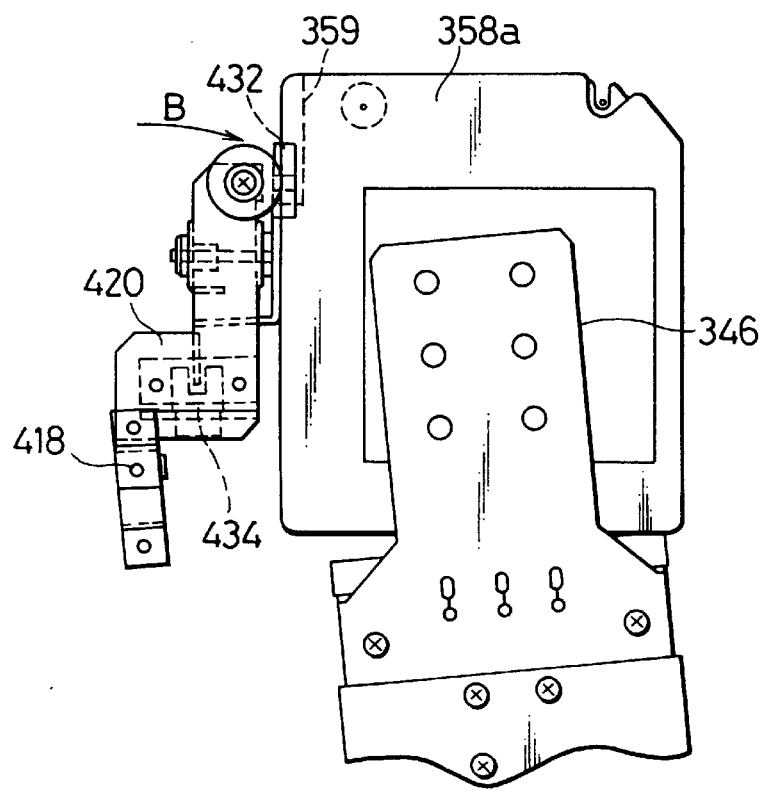

FIGS. 70 and 71 illustrate a detection operation in the case where a cartridge is grasped by the hand unit in a slanting direction. As shown in these figures, the first lever 420 is mounted on the shaft 418 in such a manner as to be able to rotate thereabout. Therefore, the first lever 420 is pushed by the cleaning cartridge 358a and is thus rotated in the direction of an arrow A as illustrated in FIG. 70. In contrast, the first lever 420 is rotated by the pushing force of the coil spring 424 in the direction of an arrow B as illustrated in FIG. 71. Hence, even in the case where the cleaning cartridge 358a is grasped by the hand unit 330 in a slanting direction, the roller 422 is brought into abutting engagement with a side surface of the cleaning cartridge 358a at all times. As a result, the roller 432 comes to fall into the notch 359 of the cleaning cartridge 358a. Thereby, the cleaning cartridge 358a grasped by the hand unit 330 is correctly detected by the optical sensor 434. Consequently, this obviates the necessity of providing inlet ports used only for inserting cleaning cartridges in the cartridge access stations 305-1 and 305-2 in addition to the inlet ports 306-1 and 306-2 thereof. Thus the downsizing of the library apparatus can be achieved. Further, it is unnecessary for an operator to input to the library apparatus an instruction for inserting a cleaning cartridge thereinto. Consequently, the speeding-up of the insertion of the cleaning cartridge 358a can be achieved.

As above described, in accordance with the present invention, there can be provided a robot hand mechanism which can achieve the opening and closing of the hand with a high degree of accuracy by utilizing a simple configuration and performing a simple control operation on the motors. Further, the accessor of the library apparatus of the present invention can discriminate an ordinary cartridge from a cleaning cartridge. Thereby, the discrimination of an ordinary cartridge from a cleaning cartridge can be performed speedily. Moreover, a load on the host computer connected to the library apparatus can be reduced. Furthermore, in the case of the library apparatus of the present invention, even when the power supply for the motor used to move the hand unit back and forth is interrupted by some cause, the hand unit can be locked by the slide locking mechanism. Thereby, the hand unit can be prevented from sliding owing to its own weight.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A library apparatus comprising:
   a recording/reproducing unit for reading data from and writing data to a portable storage medium;
   an inlet/outlet unit through which a storage medium is inputted from and outputted to the exterior of the apparatus;
   a plurality of rotatable cell drums each having a cylindrical surface providing a plurality of cells respectively used for containing storage media;
   at least two accessors, each of which has a robot hand which is used for picking up the storage medium and conveying the storage medium between the cell drums and the recording/reproducing unit and between the inlet/outlet unit, and the cell drums;
   a queuing table for storing medium conveying information for a control operation, which contains an origin address and a destination address received in response to moving commands issued from a host unit or computer;
   an accessor controller for instructing the cell drums to rotate and for instructing one of the at least two accessors to convey a medium according to the origin address and the destination address of a moving command, which is dequeued from the queuing table;
   a drum controller for turning a selected cell, which is located at an indicated address on the cell drum, to an accessor take-out position according to a rotation instruction issued from the accessor controller; and
   a machine controller for moving the robot hand to a position having coordinates according to a conveying instruction issued from the accessor controller,
   wherein said plurality of cell drums are divided into two groups of cell drums aligned on the left and right side of the recording/reproducing unit, respectively, rails are placed in a direction along which the cell drums and the recording/reproducing unit are arranged, the conveying of media which are contained in the cell drums placed on the left side of the recording/reproducing unit is only assigned to the accessor placed on the left side thereof, the conveying of media which are contained in the cell drums placed on the right side of the recording/reproducing unit is only assigned to the accessor placed on the right side thereof, and
   wherein said queuing table further includes a plurality of moving commands including overlapping commands that are commands which were assigned to said two accessors that cannot be completely simultaneously executed because moving loci of the media are overlapped, said accessor controller continues operating both overlapping commands for performing as much of said overlapping commands as is possible to complete simultaneously, by at least simultaneously making said two accessors operative up to two separate medium take-out positions of said cell drums which do not create overlapping moving loci.

2. The library apparatus according to claim 1, wherein the accessor controller schedules execution priorities of said moving commands contained in said queuing table, wherein concurrently with the execution of a current moving command, the accessor controller instructs the drum controller to rotate a cell drum according to a moving command to be executed next.

3. The library apparatus according to claim 2, wherein when the accessor finishes picking up the medium from the cell drum in response to the moving command which is currently being executed, the accessor controller instructs the drum controller to rotate a cell drum on the basis of a moving command to be executed next.

4. The library apparatus according to claim 1, wherein when the queuing table contains two or more moving commands, one moving command to be executed by one of the accessors, and another moving command to be executed by the other of the accessors, the accessor controller selects moving commands in such a manner that when the selected moving commands are executed, a movement loci of the media conveyed by simultaneous operations of the accessors overlap with each other.

5. The library apparatus according to claim 1, wherein the robot hand of the accessor has a photodetector for detecting positions of a plurality of cells, which are formed on a cylindrical surface of a cell drum, said photodetector detects an edge of a wall partitioning the adjoining cells, wherein a light emitting portion and a light receiving portion of the photodetector are placed in a front part of said photodetector, and the photodetector is mounted in the robot hand in such a manner that an optical axis of the light emitting portion is inclined only by an infinitesimal angle to a direction in which the edge of the wall partitioning the cells is detected.

6. The library apparatus according to claim 1, wherein the robot hand of the accessor has a photodetector for detecting positions of a plurality of cells which are formed on a cylindrical surfaced of a cell drum, said photodetector detecting an edge of a wall partitioning the adjoining cells, wherein a light emitting portion and a light receiving portion of the photodetector are placed in a front part thereof; and when the robot hand is positioned at an indicated cell, the accessor controller makes the photodetector pass the edge from a left side of the edge to thereby measure the position of the edge and the accessor controller makes the photodetector pass the edge from a right side of the edge to measure the position of the edge again, wherein an average of the measured two values of the position of the edge is determined as an actually measured value of the position of the edge.

7. The library apparatus according to claim 1, wherein the robot hand of the accessor has a photodetector for detecting positions of said plurality of cells which are formed on a selected said cylindrical surface of a cell drum, said photodetector detecting an edge of a wall partitioning the adjoining cells, wherein a light emitting portion and a light receiving portion of the photodetector are placed in a front part thereof, wherein the robot hand has a jig of a same cartridge shape as of a storage medium, which is provided with a reflection member having a reflection face to be located in front of the photodetector when picked up by the robot hand, whereby the photodetector of the robot hand can be regulated by using the jig.

8. A library apparatus according to claim 1, wherein said accessor controller further includes:

a ROM for storing a translation table of actual measurements which contains the angle of rotation of the cell drum and two dimensional coordinates representing the positions of the moving accessors by using cell addresses as entries;

a floppy disk for storing same said translation table of said actual measurements as said translation table stored in said ROM as a back-up copy; and a table value selection portion for comparing said actual measurements that are contained in the translation table of the floppy disk with said actual measurements that are contained in the translation table of the ROM corresponding to each cell address when turning on a power supply;

wherein said actual measurements which are contained in the translation table of the ROM are loaded into a RAM as being available if said actual measurements of said floppy disk and said actual measurements of said ROM match, and a mismatch message is displayed to an external system or an operator if said actual measurements of said floppy disk and said actual measurements of said ROM do not match, and thereafter loading the actual measurements which are contained in the translation table of the floppy disk, in accordance with a selection instruction inputted from the external system or the operator into the RAM as being available.

9. The library apparatus according to claim 8, wherein the table value selection portion displays on a maintenance panel a message indicating the mismatch between the values contained in the tables of the ROM and the floppy disk, wherein the table value selection portion loads into the RAM the values contained in the translation table, which is stored in the floppy disk, as being available in accordance with the selection instruction, which is inputted by operating a selection switch provided on the maintenance panel.

10. A library apparatus comprising:

a recording/reproducing unit for reading data from and writing data to a portable storage medium;

an inlet/outlet unit through which a storage medium is inputted from and outputted to the exterior of the apparatus;

a plurality of rotatable cell drums each having a cylindrical surface providing a plurality of cells respectively used for containing storage media;

at least two accessors, each of which has a robot hand which is used for picking up the storage medium and conveying the storage medium between the cell drums and the recording/reproducing unit, and between the inlet/outlet unit and the cell drums;

a queuing table for storing medium conveying information for a control operation, which contains an origin address and a destination address received in response to a moving command issued from a host unit or computer;

an accessor controller for instructing the cell drum according to the origin address and the destination address of a moving command, which is dequeued from the queuing table, to rotate and for instructing the accessor to convey a medium;

a drum controller for turning a cell, which is located at an indicated address on the cell drum, to an accessor take-out position according to a rotation instruction issued from the accessor controller;

a machine controller for moving the robot hand to a position having coordinates according to a conveying instruction issued from the accessor controller;

wherein said plurality of cell drums are divided into two groups aligned on the left and right side of a recording/reproducing unit, respectively, rails are placed in a direction along which the cell drums and the recording/reproducing unit are arranged, the conveying of media which are contained in the cell drums placed on the left side of the recording/reproducing unit is assigned to the accessor placed on the left side thereof, the conveying of media which are contained in the cell drums placed on the right side of the recording/reproducing unit is assigned to the accessor placed on the right side thereof;

a cell drum measuring portion for measuring an angle of rotation, by which the cell drum is rotated so as to move each of the cells thereof to a medium take-up position determined with respect to the accessor, provided in the accessor controller;

a light emitting portion which is attached to a cell to be measured, for irradiating light whose rays are drawn from the center of rotation of the drum to the center of a cell opening portion; and a photodetector that has a light receiving portion which is placed in a cylindrical member thereof in such a manner that the cell drum is oriented toward the center of the robot hand, wherein the cell drum is rotated counterclockwise by an infinitesimal angle $\delta\theta$ at a time from the position thereof corresponding to an angle $\delta$ of rotation of the cell; simultaneously, the accessor is moved by an infinitesimal distance $\delta L$ at a time, by following and in synchronization with rotation of the cell drum, an angle $\delta\theta 1$ of rotation of the cell drum, at which the photodetector comes to obtain no reception signal is measured; the cell drum is similarly rotated clockwise by an infinitesimal angle $\delta\theta$ at a time from the position thereof corresponding to an angle $\delta$ of rotation of the cell; simultaneously, the accessor is moved by an infinitesimal distance $\delta L$ at a time, by following and in synchronization with the rotation of the cell drum, an angle $\Delta\theta 2$ of rotation of the cell drum, at which the photodetector comes to obtain no reception signal, is measured; finally, the angle $\theta$ of rotation of the cell is corrected on the basis of the angles $\Delta\theta 1$ and $\Delta\theta 2$, whereby an angle of rotation of the cell, at which the cell is faced to the front of the robot hand of the accessor, is measured.

11. The library apparatus according to claim 10, wherein the angle $\theta$ of rotation of each cell, which has been measured by the cell drum measuring portion, is stored in a translation table which uses a cell address indicated by the accessor controller as an entry.

* * * * *